Figure 1:
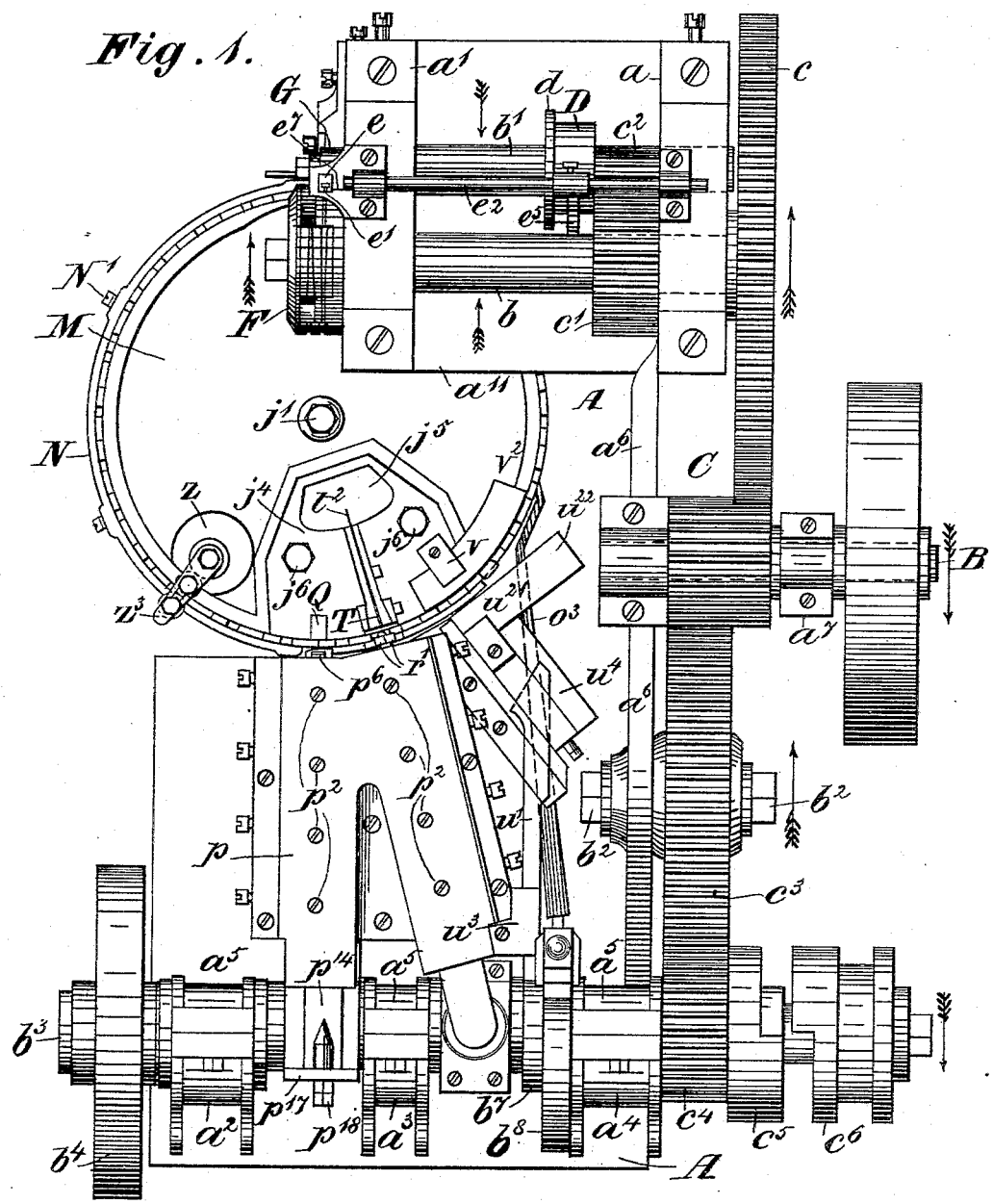

(No Model.) 26 Sheets—Sheet 1.

W. M. MOONEY & H. ESTES.
MACHINE FOR MAKING HORSESHOE NAILS.

No. 339,574. Patented Apr. 6, 1886.

Witnesses.
A. A. Simpson.
A. Irwin.

Inventors.
W. M. Mooney
H. Estes
Per Charles G. C. Simpson
Attorney (No Model.) 26 Sheets—Sheet 4.

W. M. MOONEY & H. ESTES.
MACHINE FOR MAKING HORSESHOE NAILS.

No. 339,574. Patented Apr. 6, 1886.

Witnesses
A. A. Simpson
H. Irwin

Inventors.
W. M. Mooney
H. Estes
Per Charles G. C. Simpson
Attorney (No Model.) 26 Sheets—Sheet 5.
W. M. MOONEY & H. ESTES.
MACHINE FOR MAKING HORSESHOE NAILS.
No. 339,574. Patented Apr. 6, 1886.
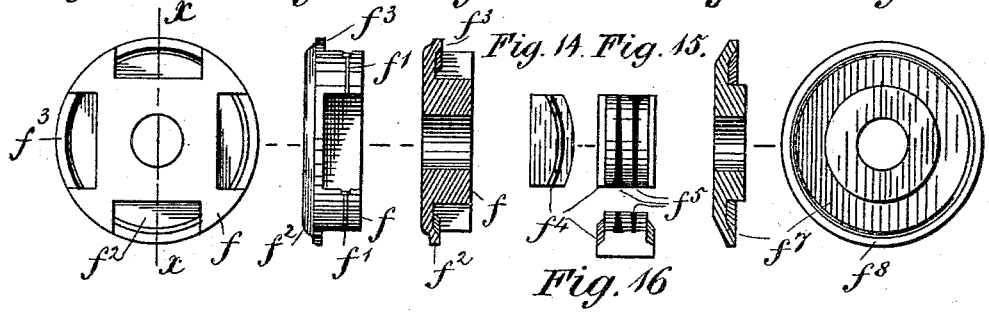
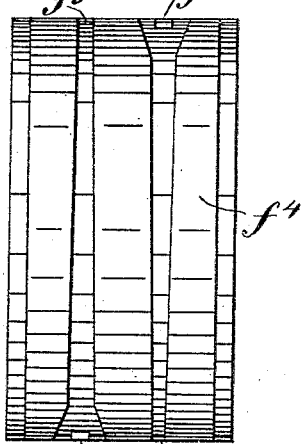
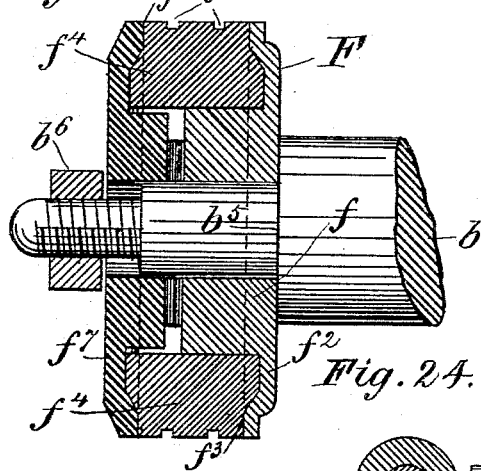
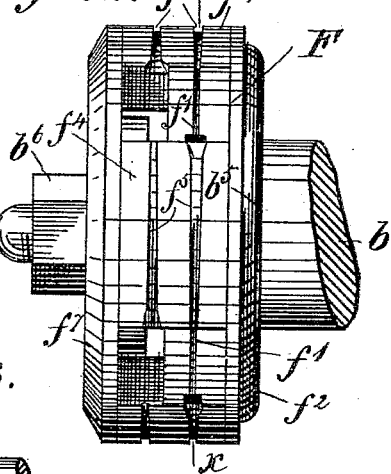
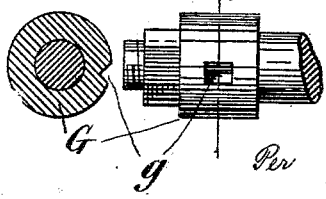
Witnesses.
A. A. Simpson.
H. Irwin.
Inventors.
W. M. Mooney
H. Estes
Per Charles G. C. Simpson Atty.
N. PETERS, Photo-Lithographer, Washington, D. C.

(No Model.) 26 Sheets—Sheet 6.
W. M. MOONEY & H. ESTES.
MACHINE FOR MAKING HORSESHOE NAILS.
No. 339,574. Patented Apr. 6, 1886.
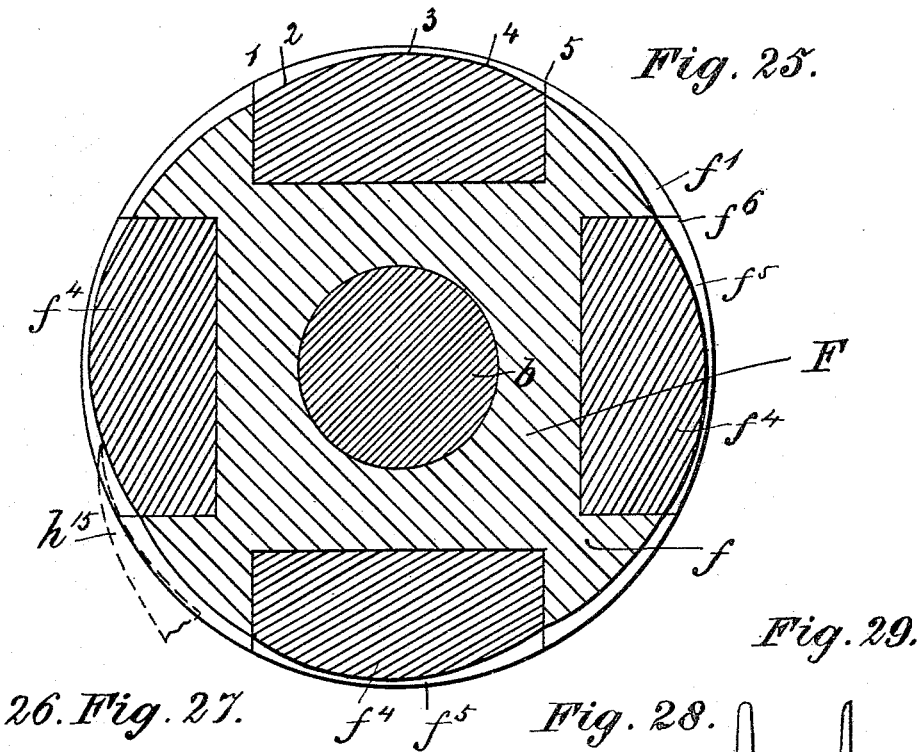
Witnesses.
A. A. Simpson.
H. Irwin.
Inventors.
W. M. Mooney
H. Estes
Per
Charles G. C. Simpson
Attorney (No Model.) 26 Sheets—Sheet 7.
W. M. MOONEY & H. ESTES.
MACHINE FOR MAKING HORSESHOE NAILS.
No. 339,574. Patented Apr. 6, 1886.
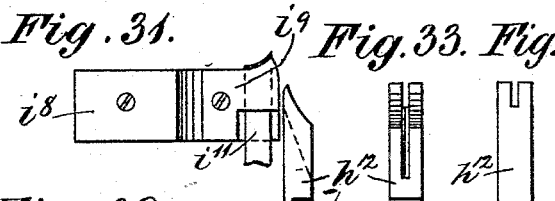
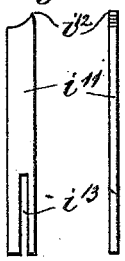
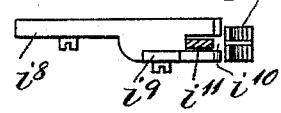
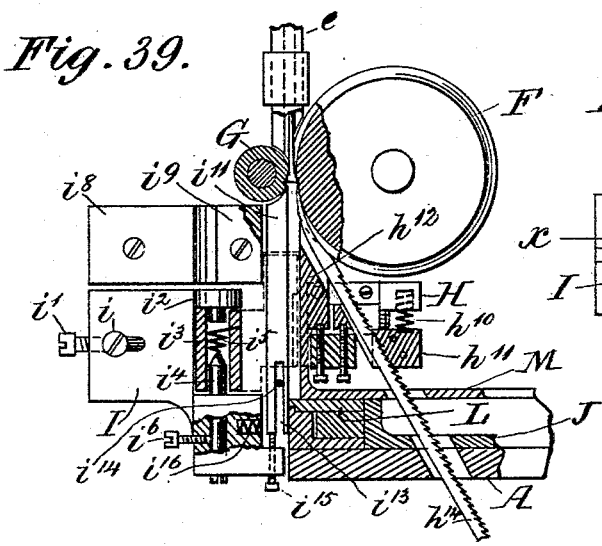
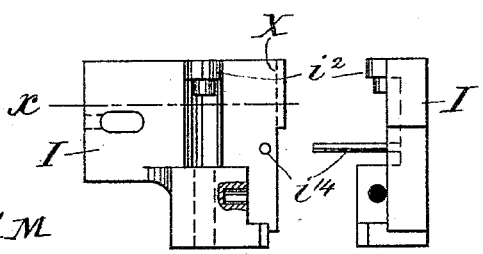
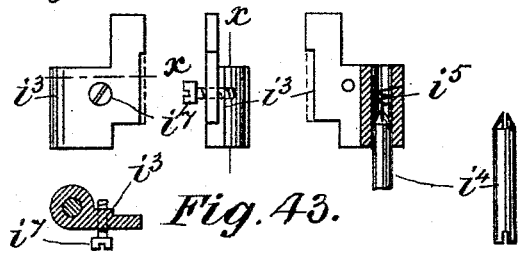
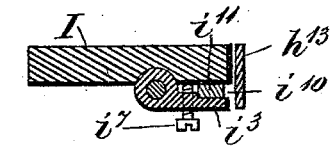
Witnesses.
A. A. Simpson
H. Irwin
Inventors.
W. M. Mooney
H. Estes
Per Charles G. C. Simpson
Attorney (No Model.) 26 Sheets—Sheet 8.
W. M. MOONEY & H. ESTES.
MACHINE FOR MAKING HORSESHOE NAILS.
No. 339,574. Patented Apr. 6, 1886.
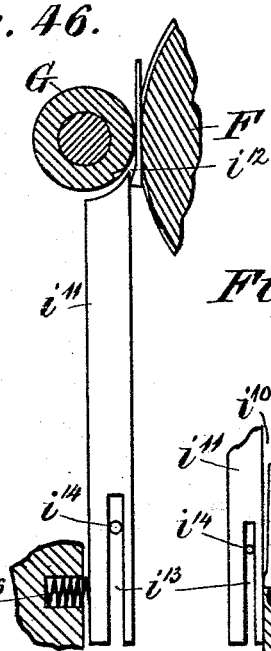
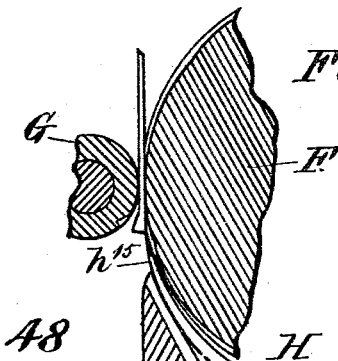
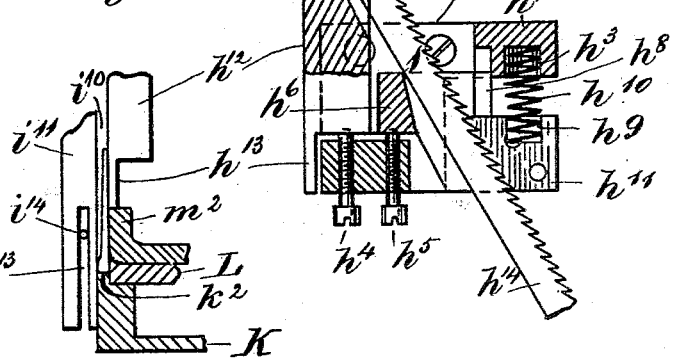
Witnesses.
A. A. Simpson.
H. Irwin.
Inventors.
W. M. Mooney
H. Estes
Per Charles G. C. Simpson (No Model.) 26 Sheets—Sheet 9.

W. M. MOONEY & H. ESTES.
MACHINE FOR MAKING HORSESHOE NAILS.

No. 339,574. Patented Apr. 6, 1886.

Witnesses.
A. A. Simpson
H. Irwin

Inventors.
W. M. Mooney
H. Estes
Per Charles G. L. Simpson
Attorney (No Model.) 26 Sheets—Sheet 10.
W. M. MOONEY & H. ESTES.
MACHINE FOR MAKING HORSESHOE NAILS.
No. 339,574. Patented Apr. 6, 1886.
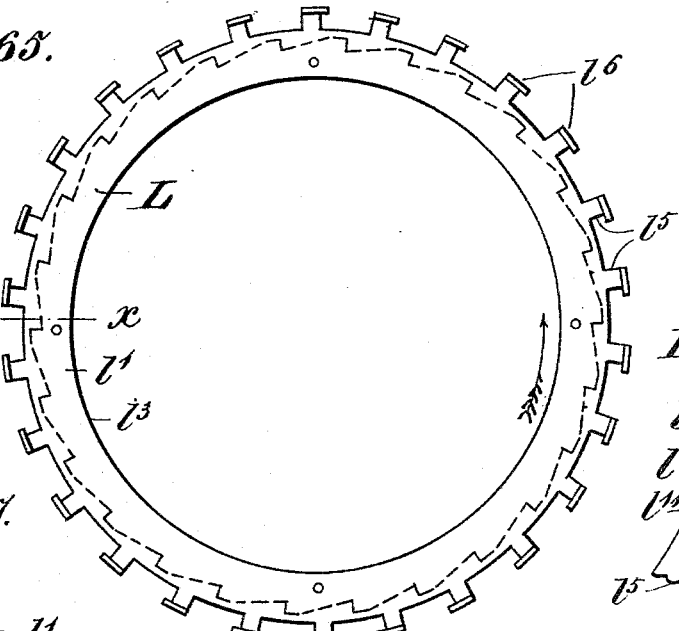
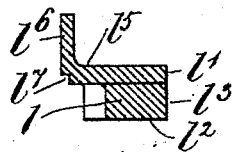
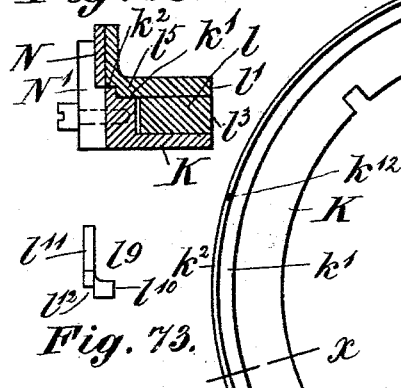
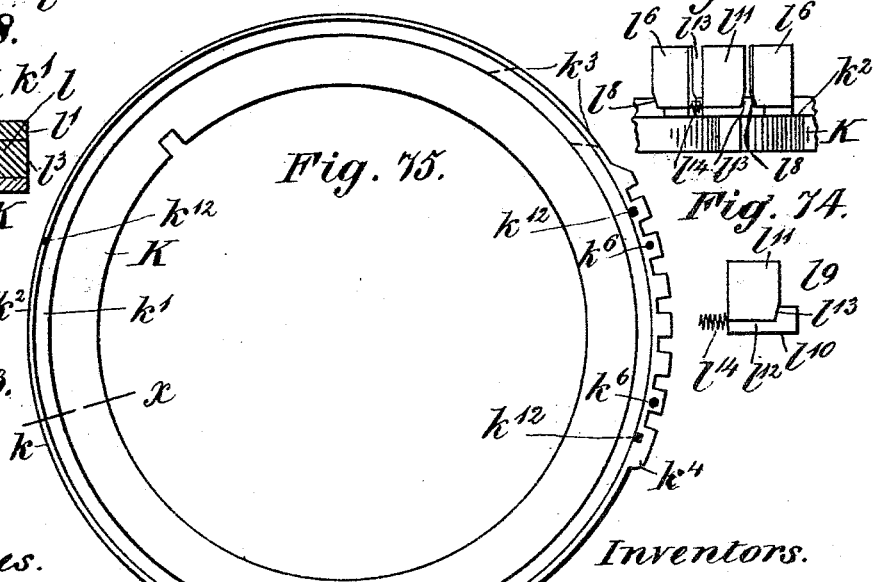
Witnesses.
A. A. Simpson.
H. Irwin.
Inventors.
W. M. Mooney
H. Estes
Per Charles G. C. Simpson
Attorney (No Model.) 26 Sheets—Sheet 11.
W. M. MOONEY & H. ESTES.
MACHINE FOR MAKING HORSESHOE NAILS.
No. 339,574. Patented Apr. 6, 1886.
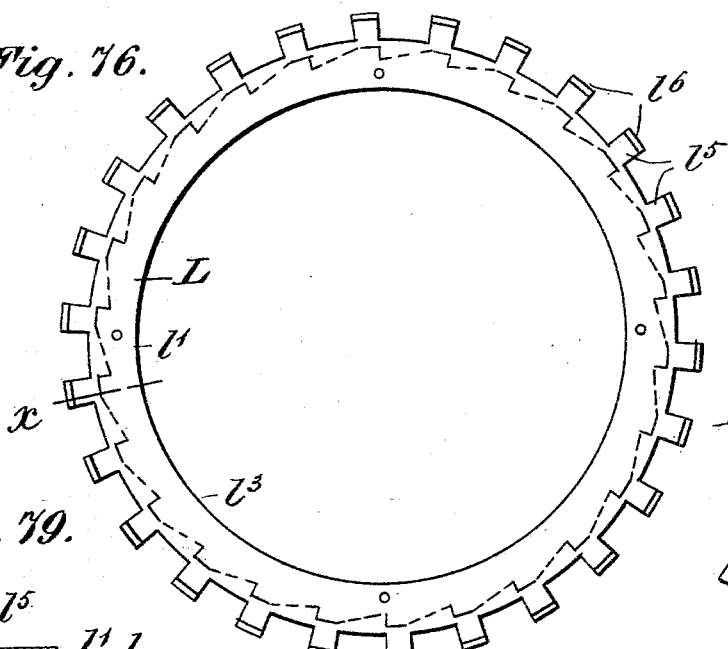
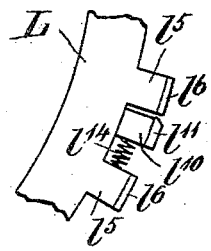
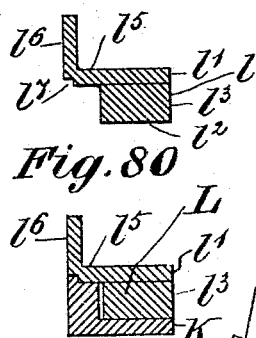
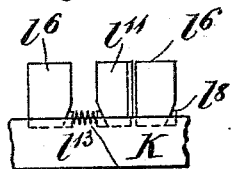
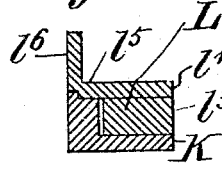
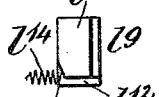
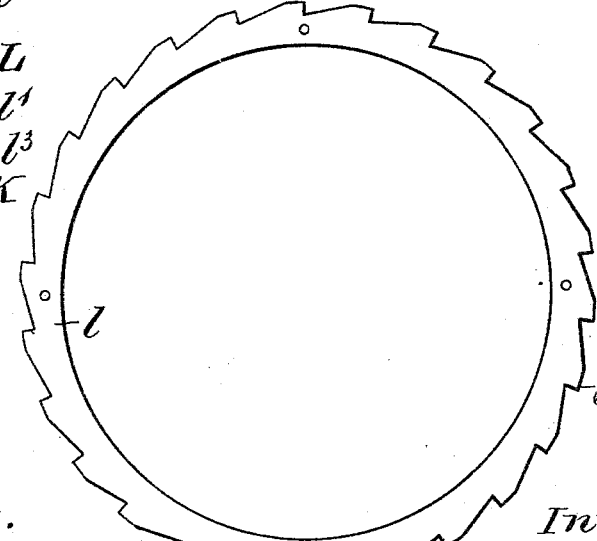
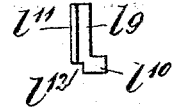
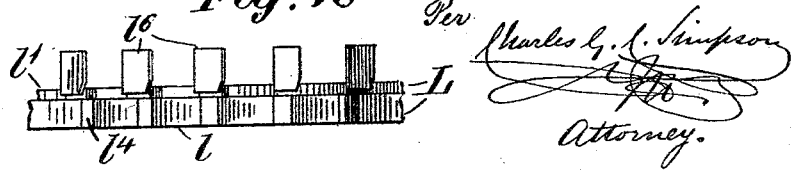
Witnesses.
A. A. Simpson.
A. Irwin.
Inventors.
W. M. Mooney
H. Estes
Per Charles G. C. Simpson
Attorney.

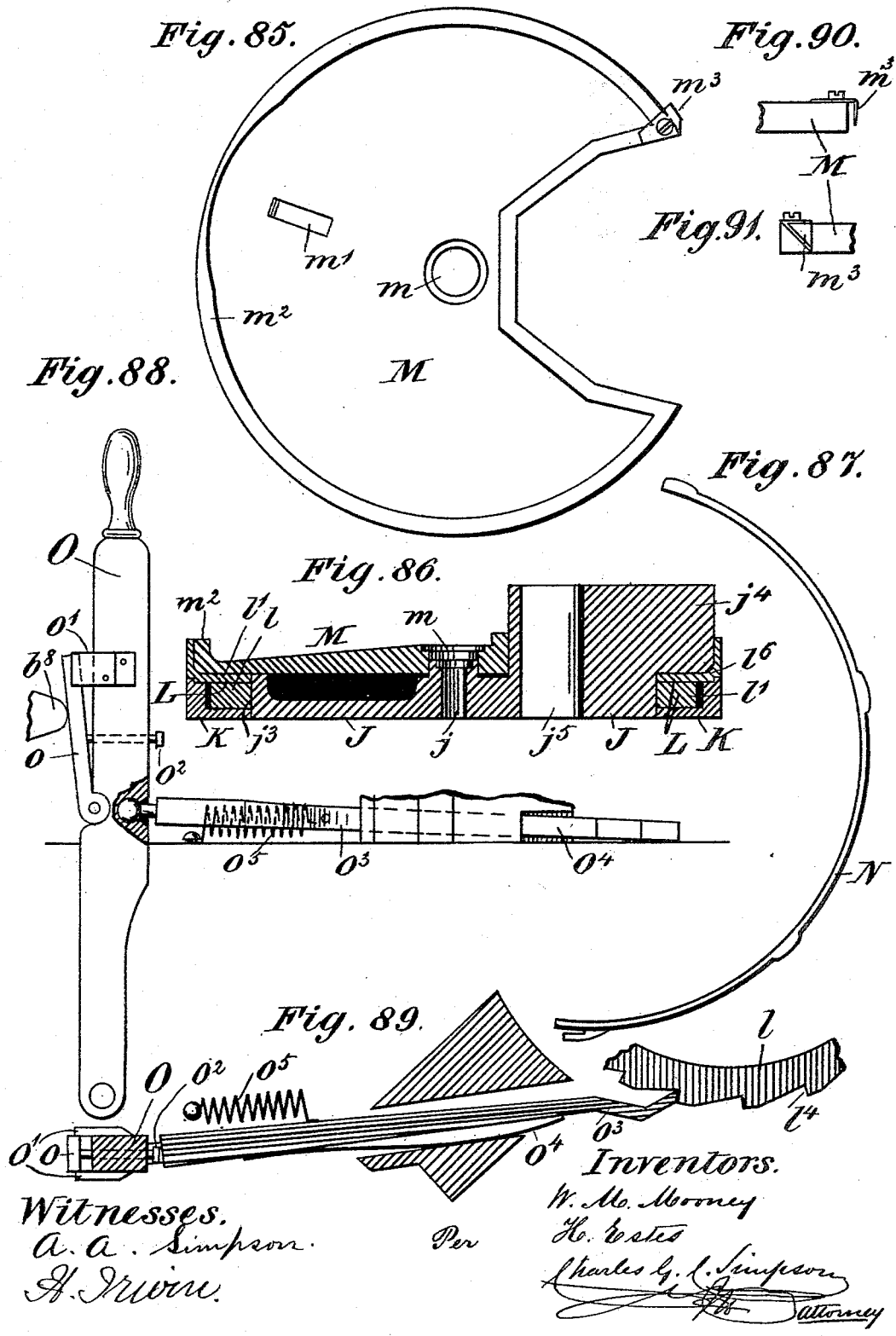

(No Model.) 26 Sheets—Sheet 13.
W. M. MOONEY & H. ESTES.
MACHINE FOR MAKING HORSESHOE NAILS.
No. 339,574. Patented Apr. 6, 1886.
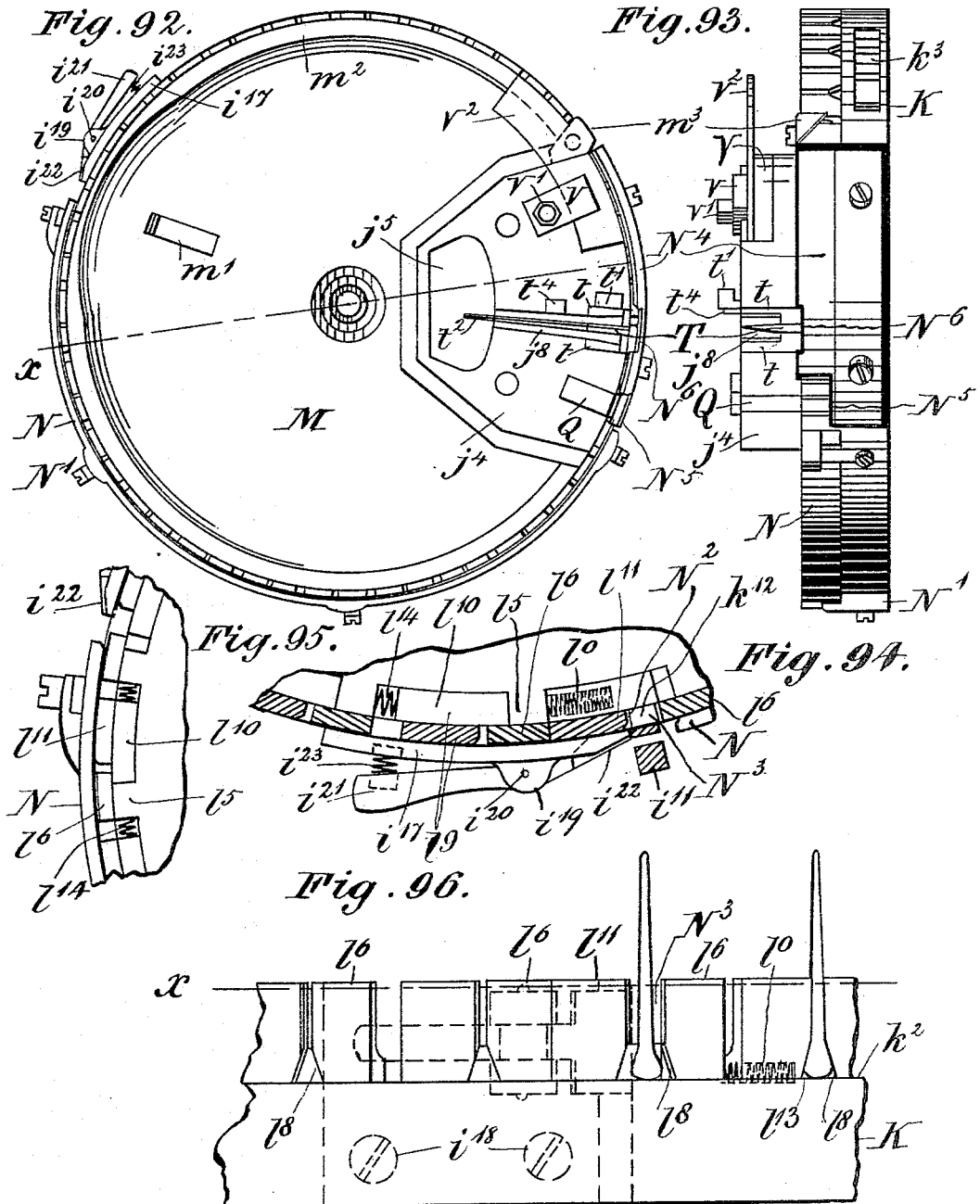

(No Model.) 26 Sheets—Sheet 14.
W. M. MOONEY & H. ESTES.
MACHINE FOR MAKING HORSESHOE NAILS.
No. 339,574. Patented Apr. 6, 1886.
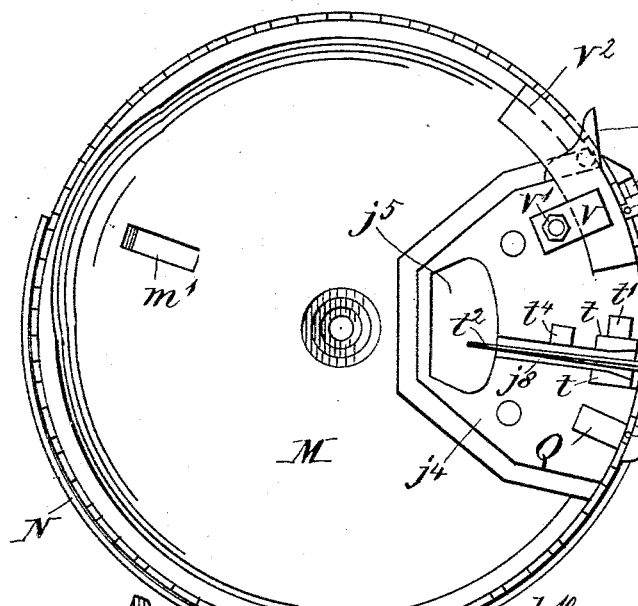
Fig. 97.
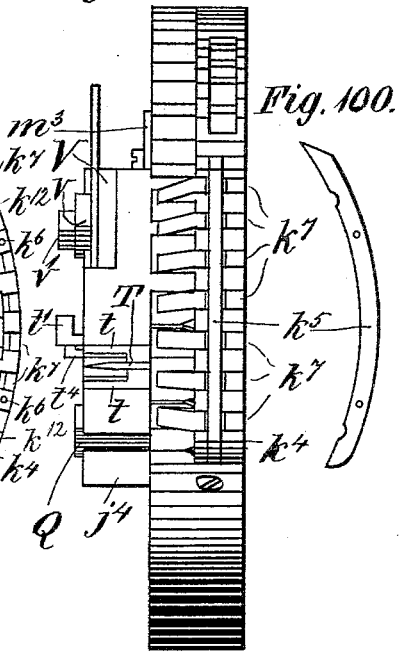
Fig. 99. Fig. 100.
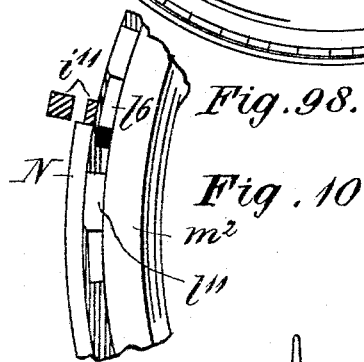
Fig. 98.
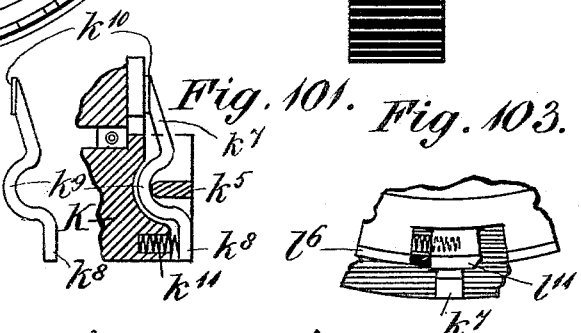
Fig. 101. Fig. 103.
Fig. 102.
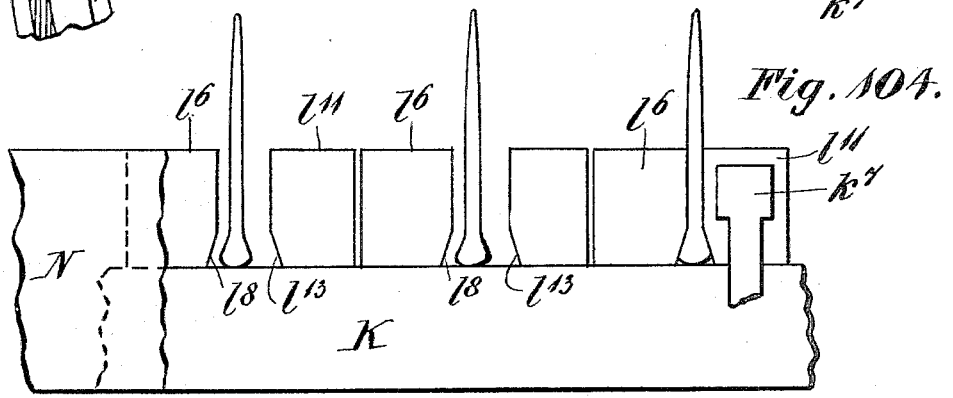
Fig. 104.
Witnesses.
A. A. Simpson.
H. Irwin.
Inventors.
W. M. Mooney
H. Estes
Per Charles G. C. Simpson
Attorney (No Model.) 26 Sheets—Sheet 15.
W. M. MOONEY & H. ESTES.
MACHINE FOR MAKING HORSESHOE NAILS.
No. 339,574. Patented Apr. 6, 1886.
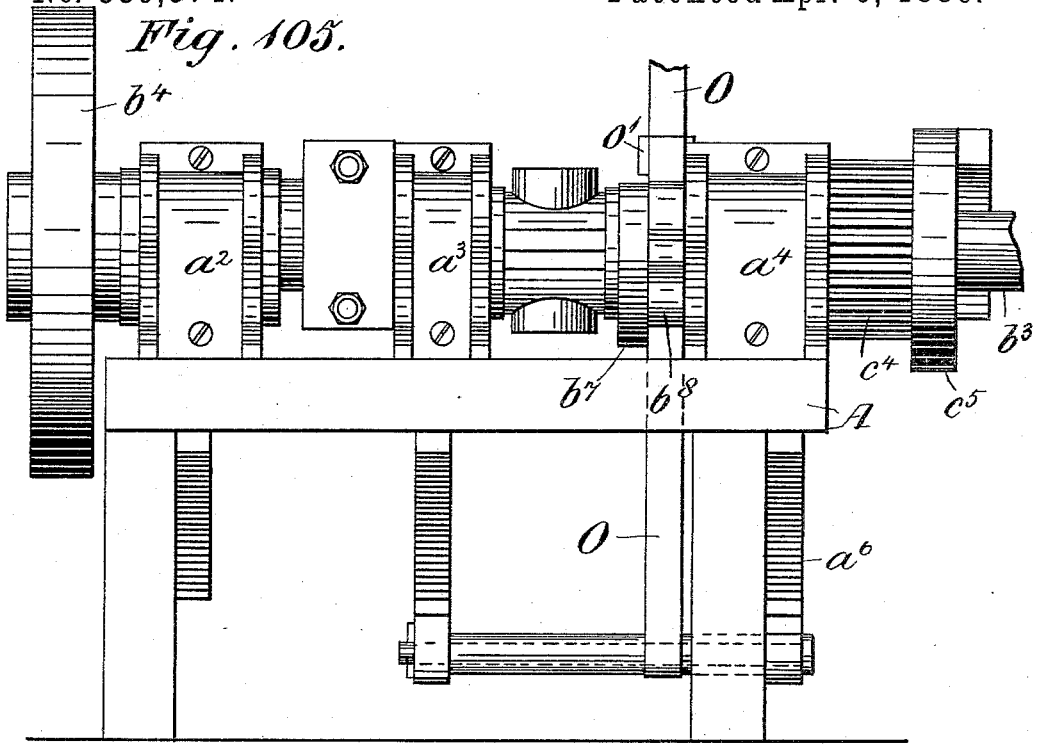
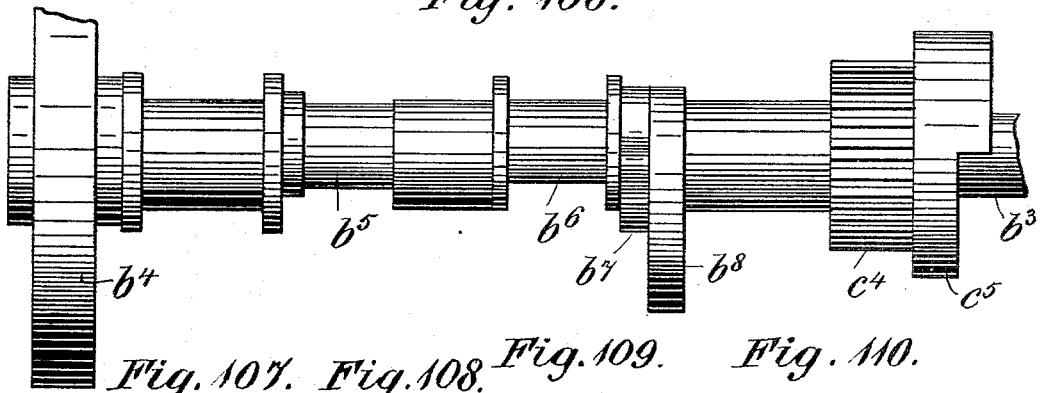
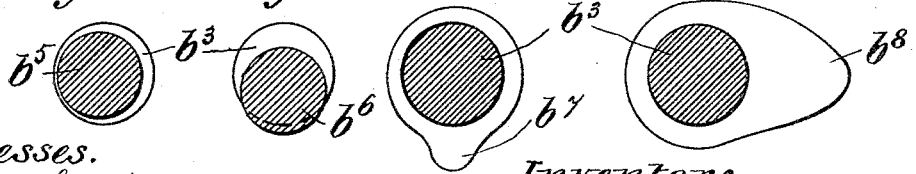
Witnesses.
A. A. Simpson
H. Irwin
Inventors.
W. M. Mooney
H. Estes
Per Charles G. Simpson
Attorney (No Model.) 26 Sheets—Sheet 16.
W. M. MOONEY & H. ESTES.
MACHINE FOR MAKING HORSESHOE NAILS.
No. 339,574. Patented Apr. 6, 1886.
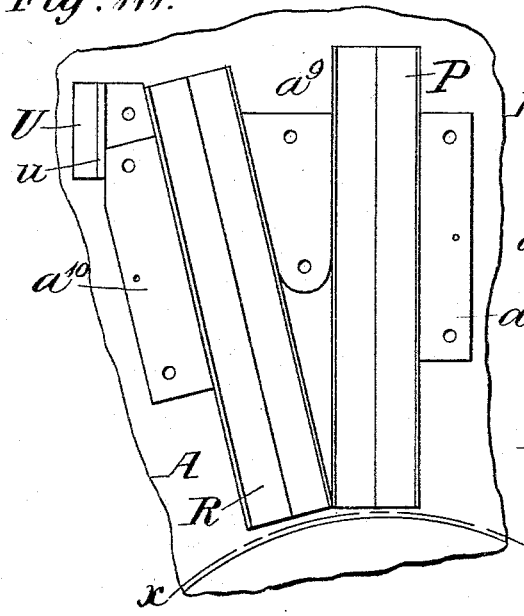
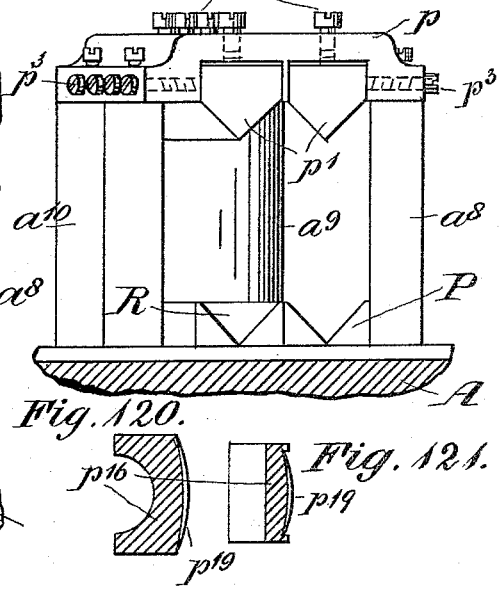
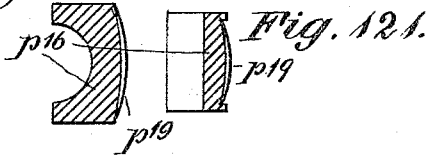
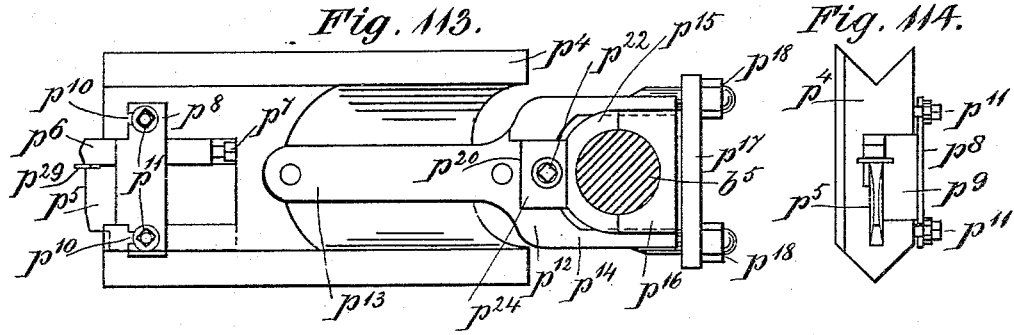
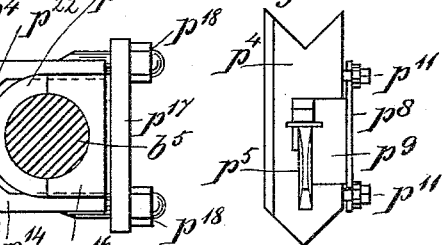
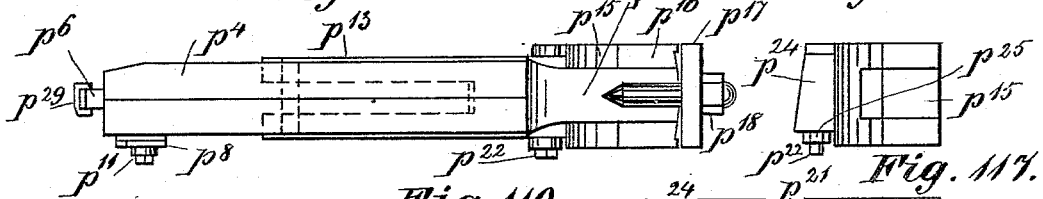
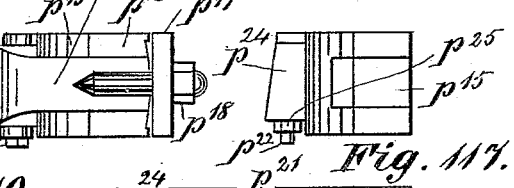
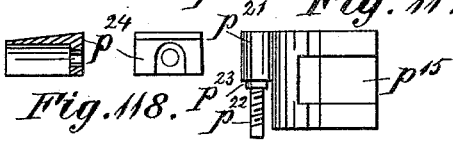
Witnesses.
A. A. Simpson
H. Irwin
Inventors.
W. M. Mooney
H. Estes
Per Charles G. C. Simpson Attorney (No Model.) 26 Sheets—Sheet 17.
W. M. MOONEY & H. ESTES.
MACHINE FOR MAKING HORSESHOE NAILS.
No. 339,574. Patented Apr. 6, 1886.
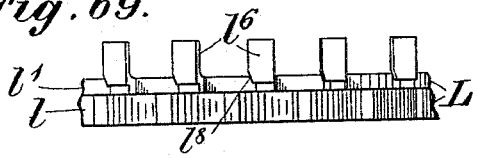
Fig. 69.
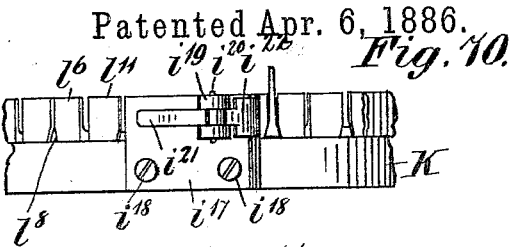
Fig. 70.
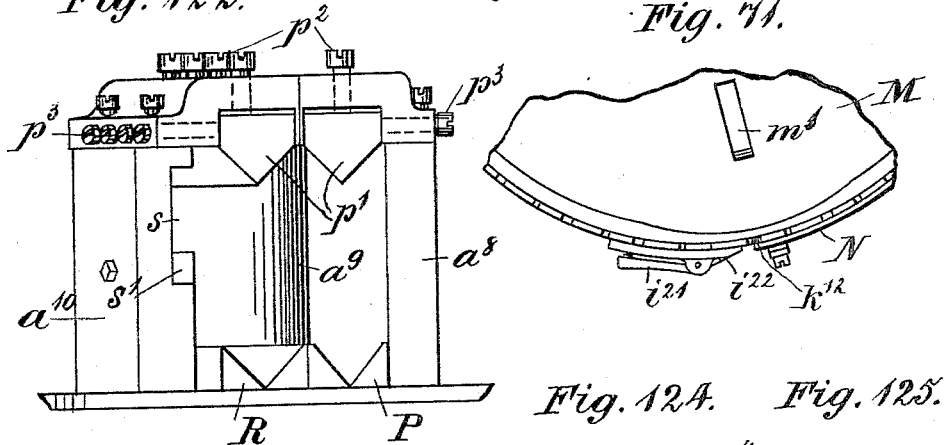
Fig. 122. Fig. 71.
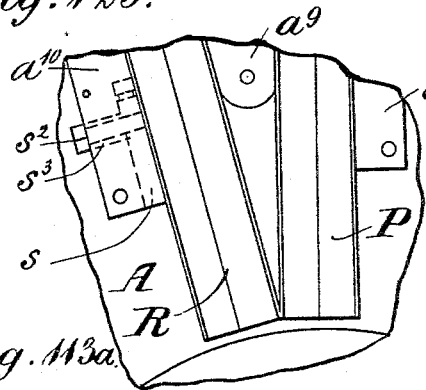
Fig. 123.
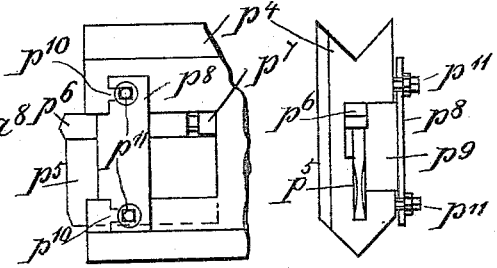
Fig. 124. Fig. 125.
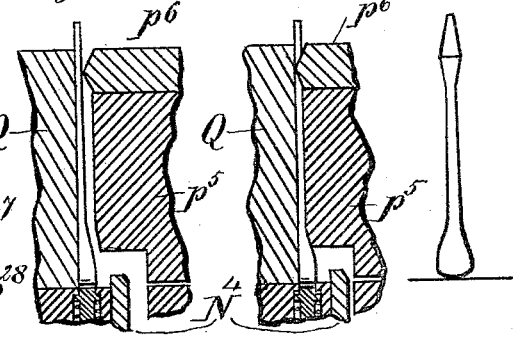
Fig. 113a. Fig. 126. Fig. 127. Fig. 128.
Fig. 113b.
Witnesses.
A. A. Simpson.
H. Irwin
Inventors.
W. M. Mooney
H. Estes
Per Charles G. C. Simpson
Attorney (No Model.) 26 Sheets—Sheet 18.
W. M. MOONEY & H. ESTES.
MACHINE FOR MAKING HORSESHOE NAILS.
No. 339,574. Patented Apr. 6, 1886.

Witnesses.
A. A. Simpson.
H. Irwin.

Inventors.
W. M. Mooney
H. Estes
Per Charles G. Simpson
Attorney

N. PETERS. Photo-Lithographer, Washington, D. C.

(No Model.) 26 Sheets—Sheet 19.
W. M. MOONEY & H. ESTES.
MACHINE FOR MAKING HORSESHOE NAILS.
No. 339,574. Patented Apr. 6, 1886.
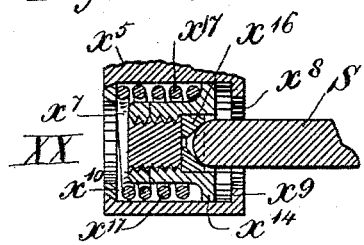
Fig. 142.
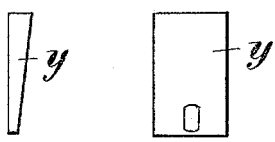
Fig. 148. Fig. 149.
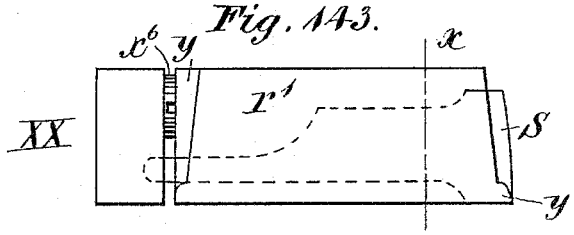
Fig. 143.
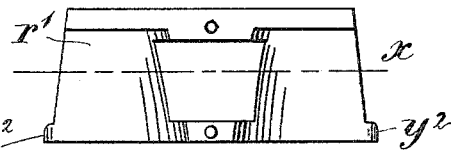
Fig. 150.
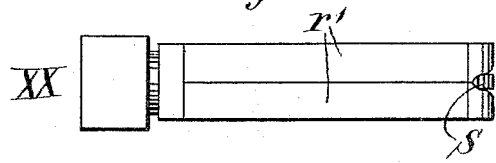
Fig. 144.
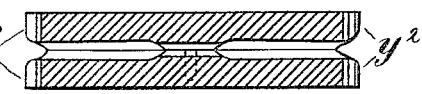
Fig. 151.
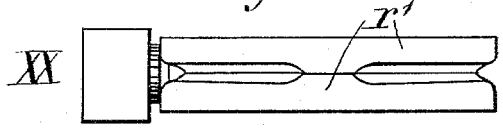
Fig. 145.
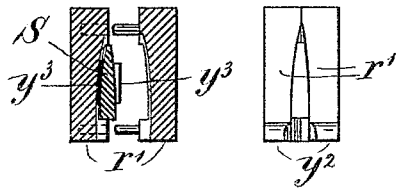
Fig. 152. Fig. 153.
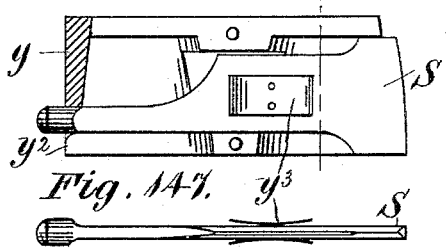
Fig. 146.
Fig. 147.
Witnesses.
A. A. Simpson.
H. Irwin.
Inventors.
W. M. Mooney
H. Estes
Per Charles G. C. Simpson
N. PETERS, Photo-Lithographer, Washington, D. C.

(No Model.) 26 Sheets—Sheet 20.
W. M. MOONEY & H. ESTES.
MACHINE FOR MAKING HORSESHOE NAILS.
No. 339,574. Patented Apr. 6, 1886.
Fig. 154.
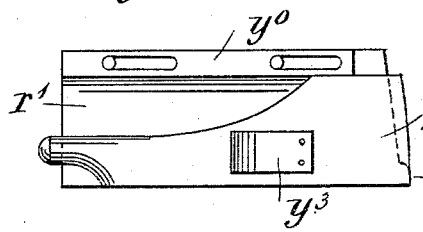
Fig. 160.
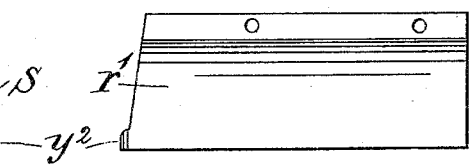
Fig. 155.
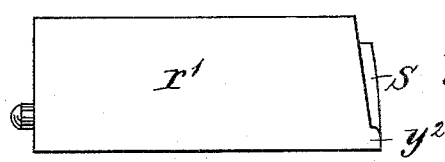
Fig. 161.
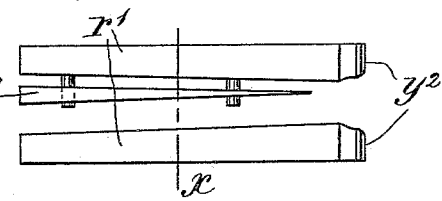
Fig. 156.
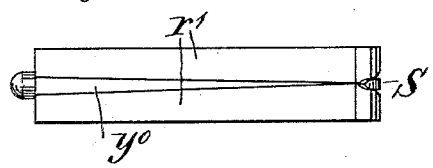
Fig. 162. Fig. 163.
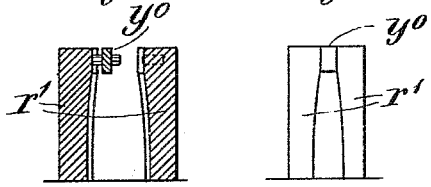
Fig. 157.
Fig. 164.
Fig. 158.
Fig. 165.
Fig. 166.
Fig. 159.
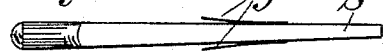
Witnesses.
A. A. Simpson
H. Irvine
Inventors.
W. M. Mooney
H. Estes
Per Charles G. C. Simpson
Attorney (No Model.) 26 Sheets—Sheet 21.
W. M. MOONEY & H. ESTES.
MACHINE FOR MAKING HORSESHOE NAILS.
No. 339,574. Patented Apr. 6, 1886.
*Fig. 167.* *Fig. 168.*
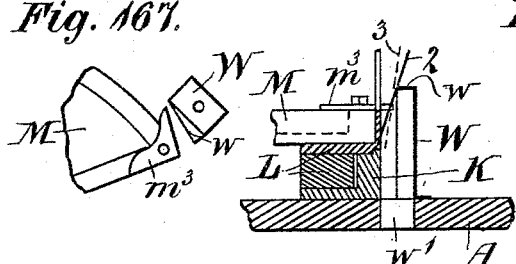
*Fig. 169.* *Fig. 170.*
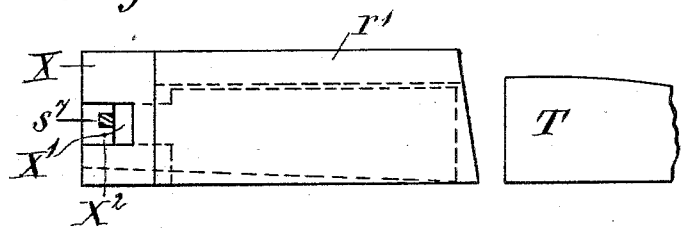 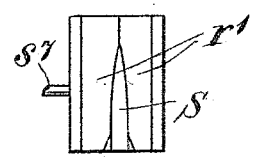
*Fig. 171.* *Fig. 174.* *Fig. 175.*
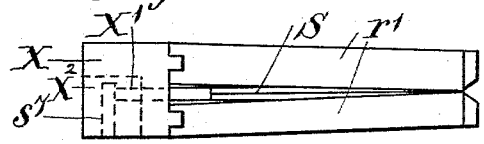 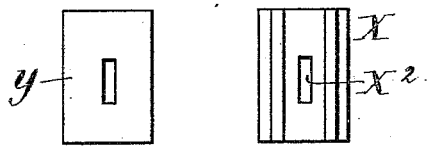
*Fig. 172.* *Fig. 176.*
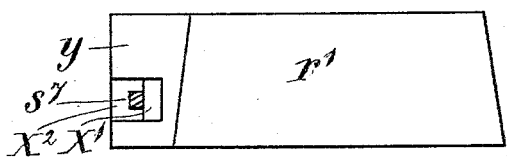 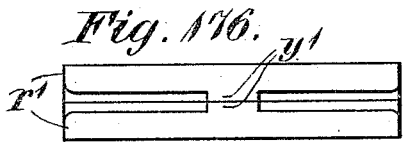
*Fig. 173.* *Fig. 177.*
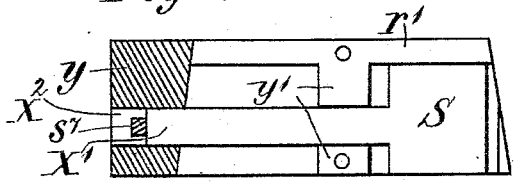 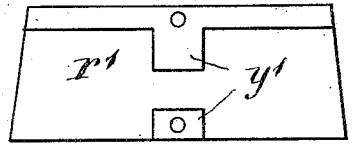
*Fig. 178.*
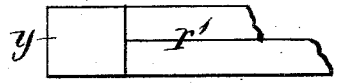
Witnesses.
A. A. Simpson.
H. Irwin.
Inventors
W. M. Mooney
H. Estes
Per Charles G. C. Simpson
Attorney (No Model.) 26 Sheets—Sheet 22.
W. M. MOONEY & H. ESTES.
MACHINE FOR MAKING HORSESHOE NAILS.
No. 339,574. Patented Apr. 6, 1886.
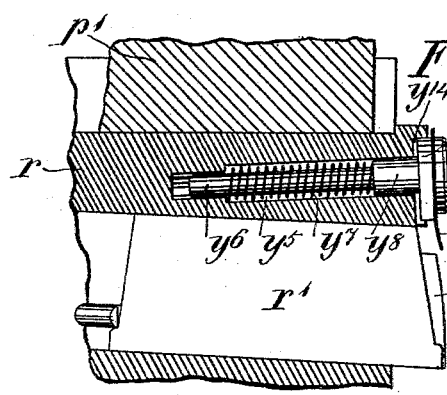
Fig. 179.
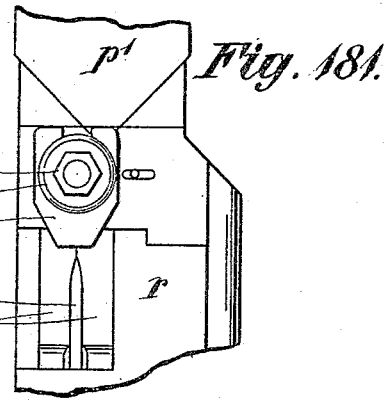
Fig. 181.
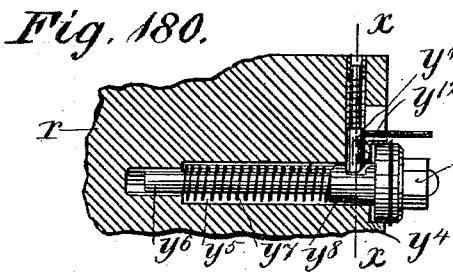
Fig. 180.
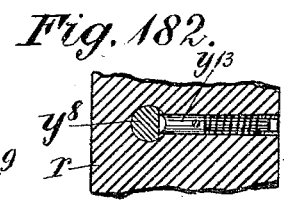
Fig. 182.
Fig. 186.
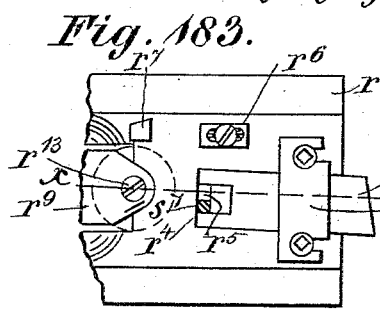
Fig. 183.
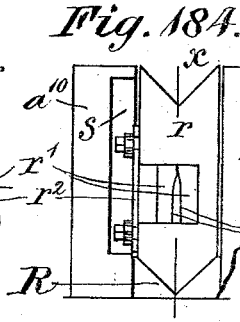
Fig. 184.
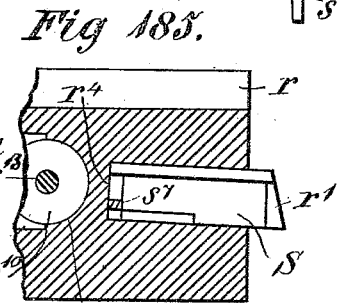
Fig. 185.
Fig. 187.
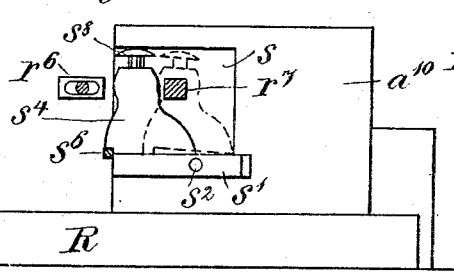
Fig. 188.
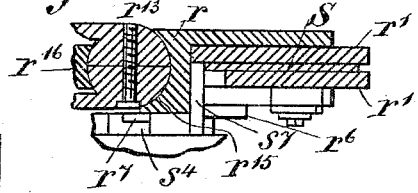
Fig. 189.
Witnesses.
A. N. Simpson.
H. Irwin.
Inventors.
W. M. Mooney
H. Estes
Per Charles G. C. Simpson
Attorney (No Model.) 26 Sheets—Sheet 23.
W. M. MOONEY & H. ESTES.
MACHINE FOR MAKING HORSESHOE NAILS.
No. 339,574. Patented Apr. 6, 1886.
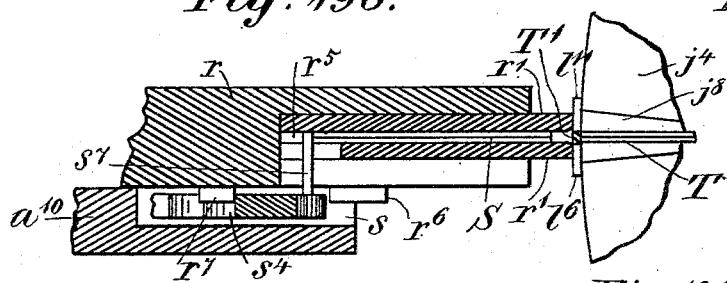
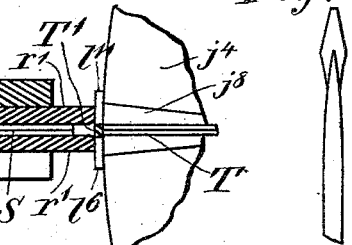
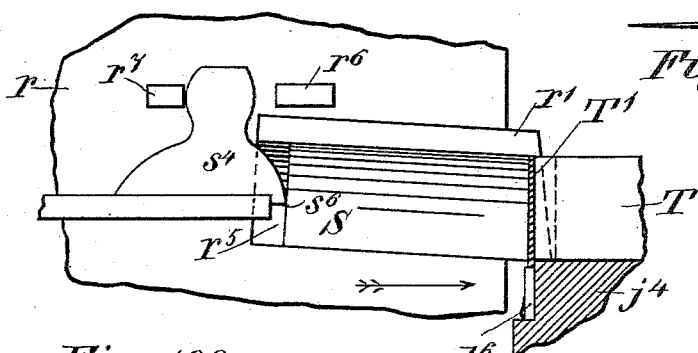
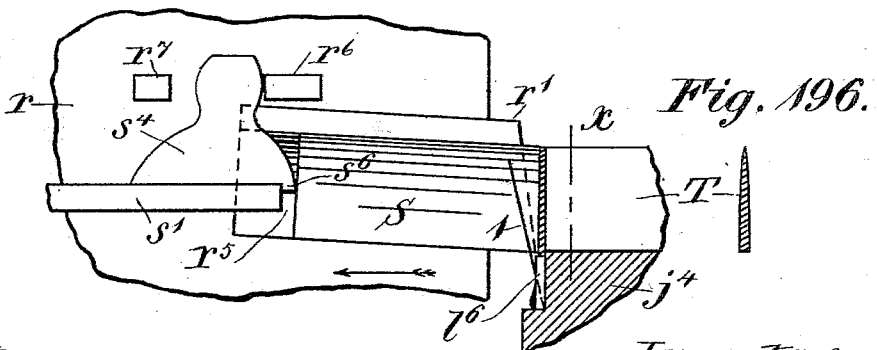
Witnesses.
A. A. Simpson.
H. Irwin.
Inventors.
W. M. Mooney
H. Estes
Per
Charles G. Simpson
Attorney (No Model.) 26 Sheets—Sheet 24.
W. M. MOONEY & H. ESTES.
MACHINE FOR MAKING HORSESHOE NAILS.
No. 339,574. Patented Apr. 6, 1886.
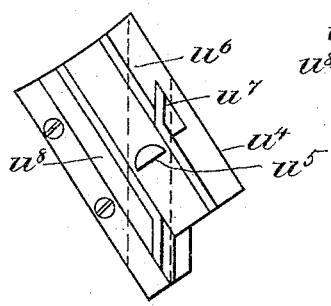
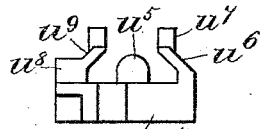
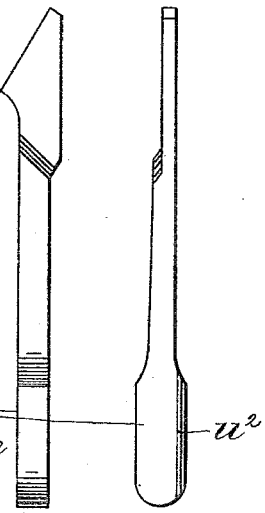
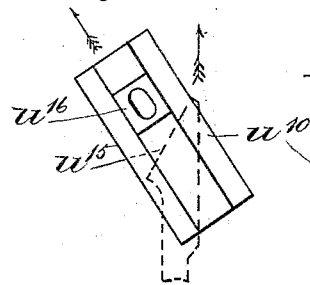
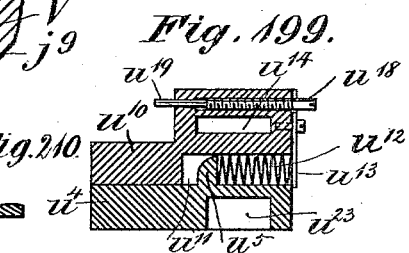
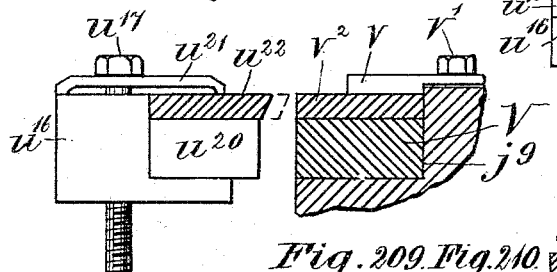
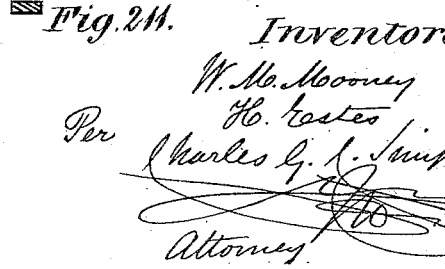
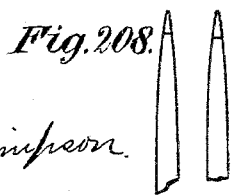
Witnesses.
A. A. Simpson
H. Irwin.
Inventors.
W. M. Mooney
H. Estes
Per Charles G. L. Simpson
Attorney (No Model.) 26 Sheets—Sheet 25.
W. M. MOONEY & H. ESTES.
MACHINE FOR MAKING HORSESHOE NAILS.
No. 339,574. Patented Apr. 6, 1886.
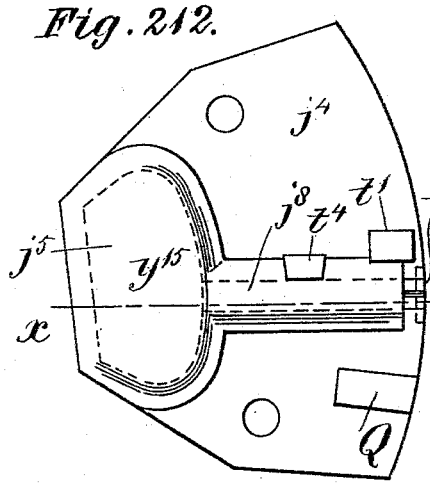
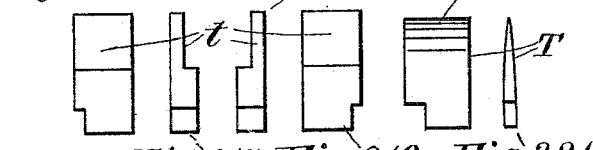
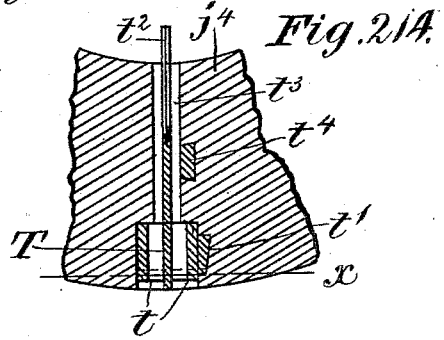
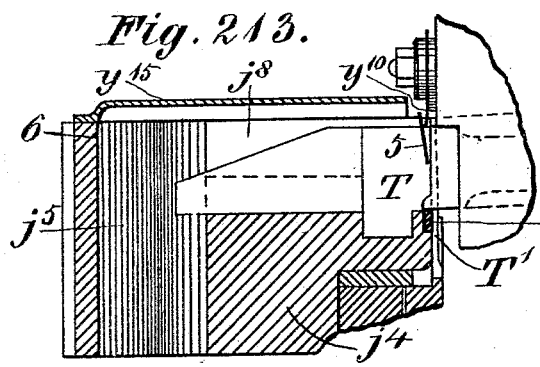
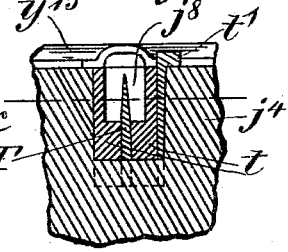
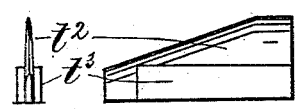
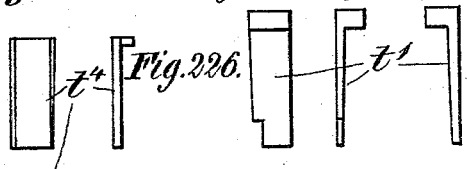
Witnesses.
A. A. Simpson.
H. Irwin.
Inventors.
W. M. Mooney
H. Estes
Per
Charles G. C. Simpson
Attorney (No Model.)

W. M. MOONEY & H. ESTES.
MACHINE FOR MAKING HORSESHOE NAILS.

No. 339,574.   Patented Apr. 6, 1886.

Inventors.
W. M. Mooney
H. Estes
Per
Charles G. C. Simpson
Attorney

Witnesses.
A. A. Simpson.
H. Irwin

United States Patent Office.

WALWORTH M. MOONEY AND HERBERT ESTES, OF AU SABLE CHASM, NEW YORK; SAID ESTES ASSIGNOR TO SAID MOONEY.

MACHINE FOR MAKING HORSESHOE-NAILS.

SPECIFICATION forming part of Letters Patent No. 339,574, dated April 6, 1886.

Application filed August 25, 1885. Serial No. 175,333. (No model.)

*To all whom it may concern:*

Be it known that we, WALWORTH MERRITT MOONEY, of Au Sable Chasm, in the county of Essex, in the State of New York, one of the United States of America, and HERBERT ESTES, of the same place, have invented new and useful Improvements in Machines for Manufacturing Horseshoe-Nails; and we do hereby declare that the following is a full, clear, and exact description of the same.

The present invention has reference to the construction and arrangement of a machine into which "nail-blanks" or pieces of iron or steel partly formed into nails, as will be hereinafter more particularly described, are introduced. These are first elongated by a rolling process, then pressed and beveled, next clipped to form the point of the nail, and, lastly, beveled finish, after which they are discharged by the machine, being then finished in their configuration.

The particular features which form our invention in the said machine will be hereinafter fully set forth, described, and claimed.

Figure 2:
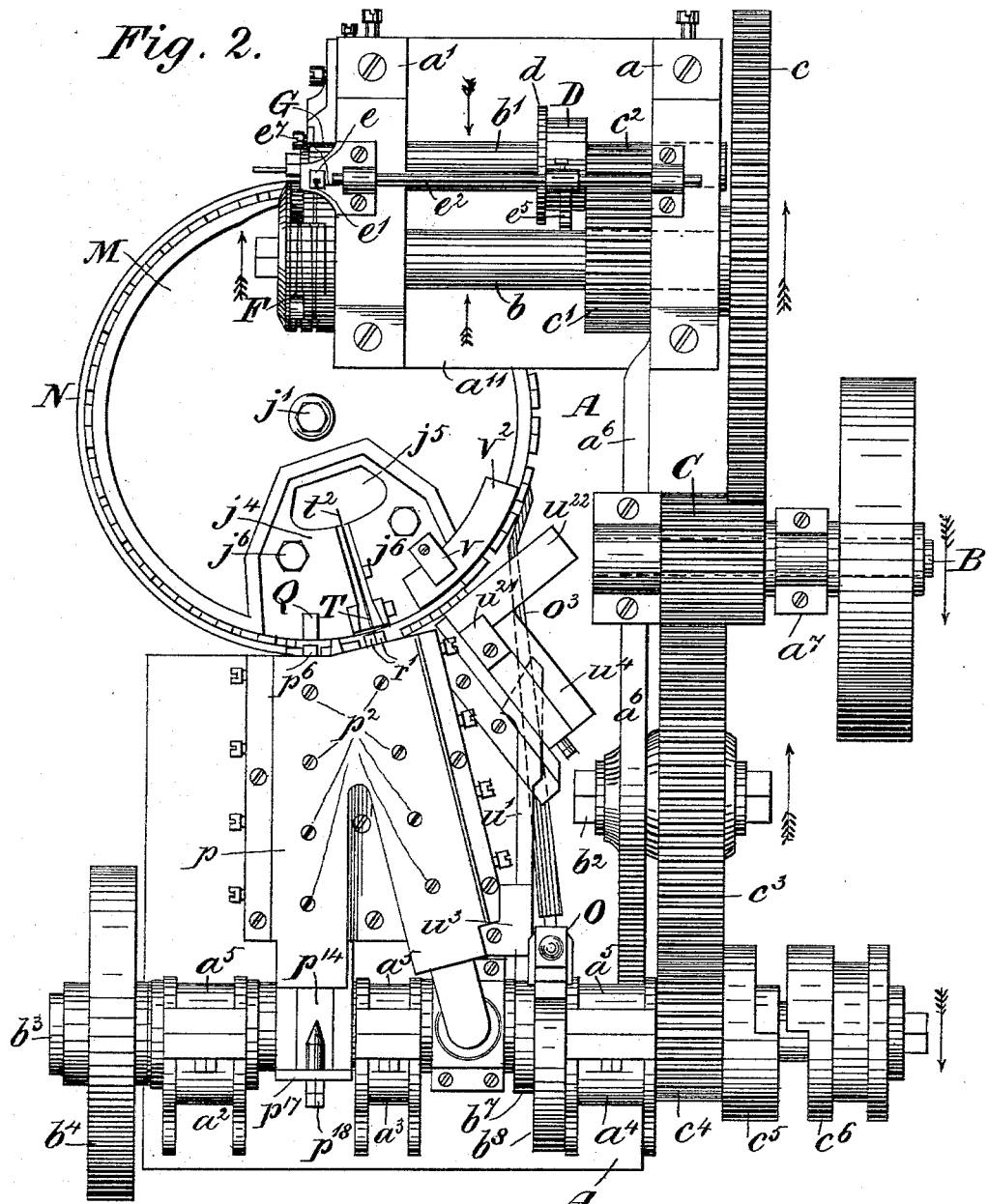
Figure 3:
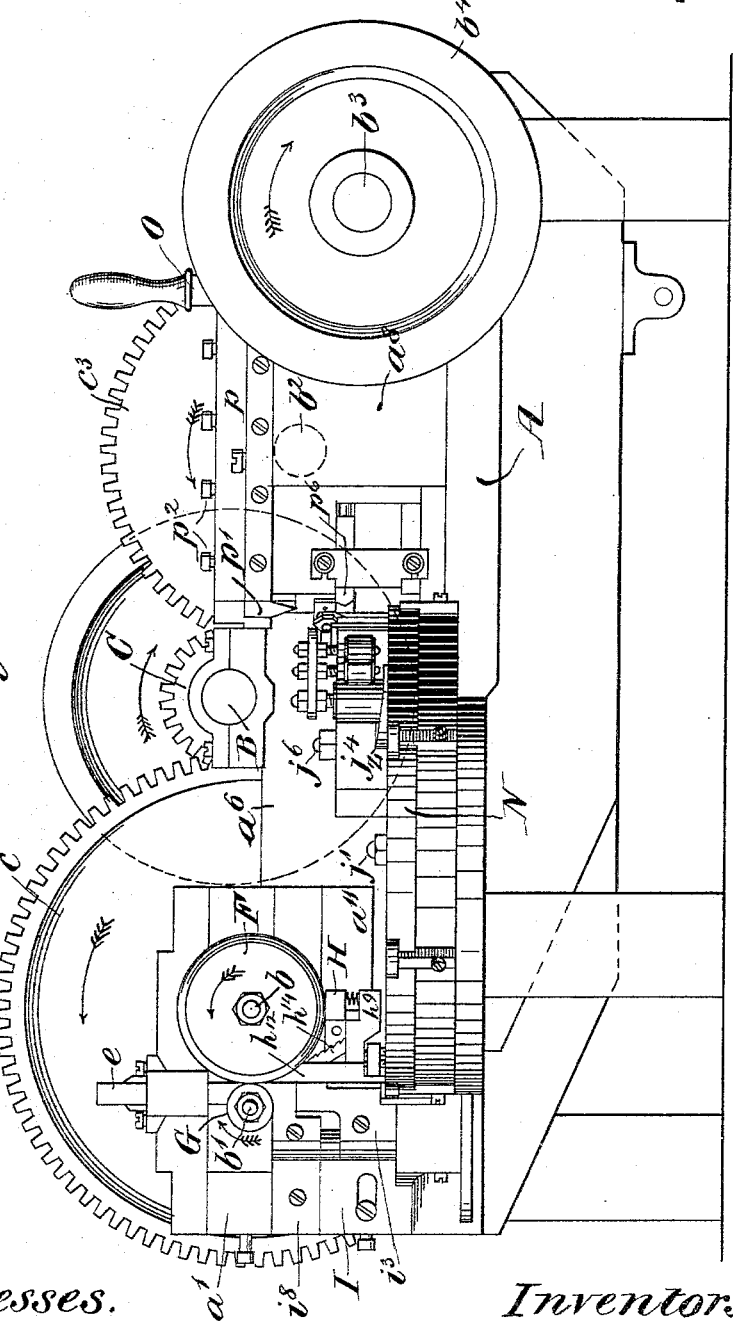
Figure 4:
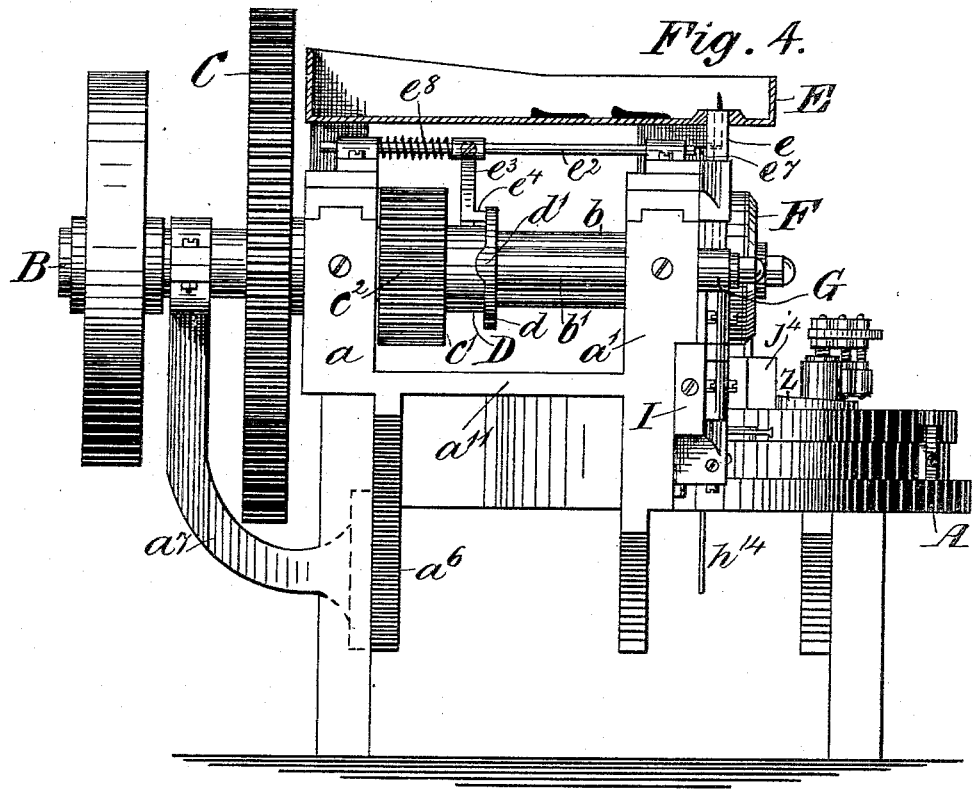
Figure 5:
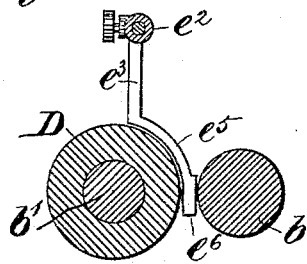
Figure 6:
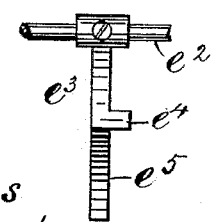
Figure 58:
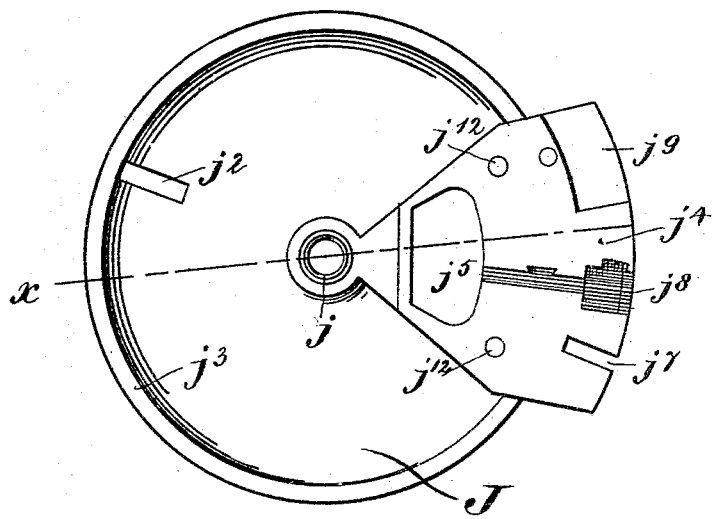
Figure 60:
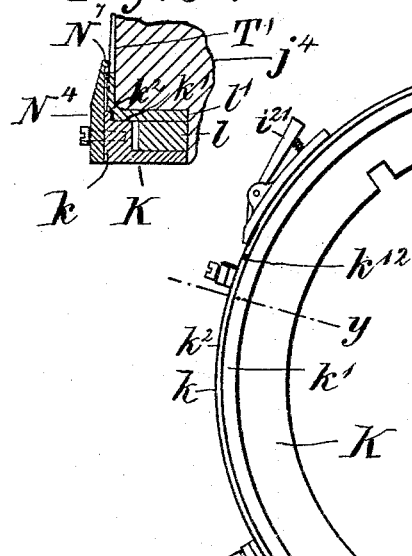
Figures 59, 61, 62, 63, 64:
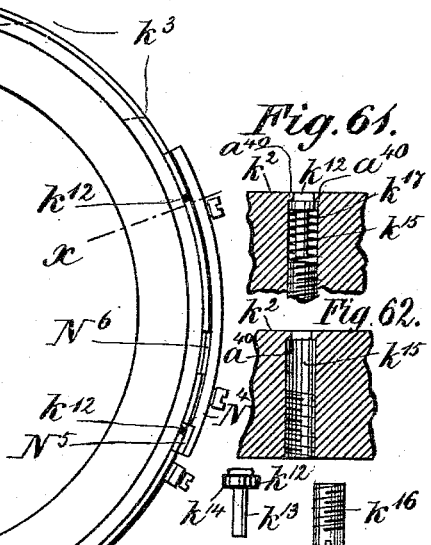
Figure 129:
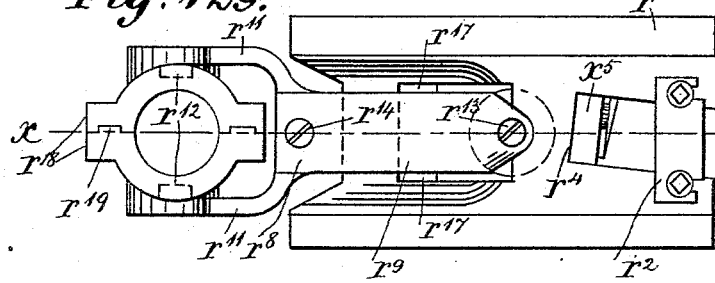
Figure 130:
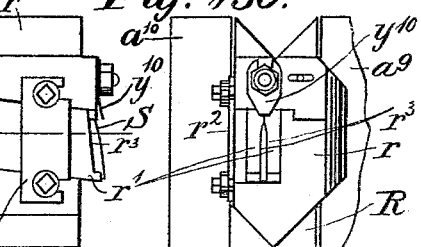
Figures 131, 132:
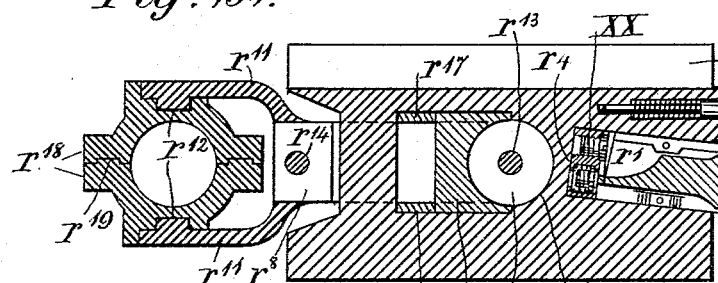
Figures 133, 134:
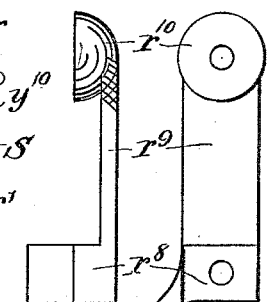
Figure 135:
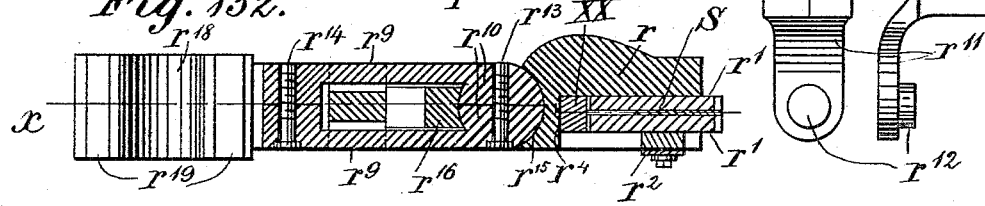
Figures 138, 139:
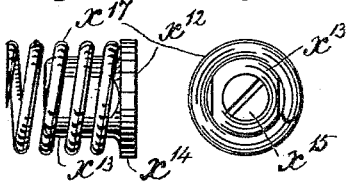
Figure 136:
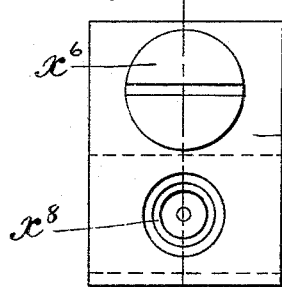
Figure 137:
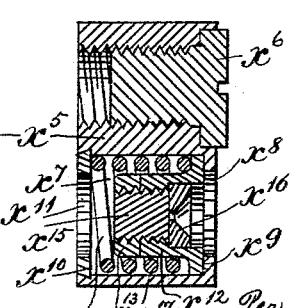
Figures 140, 141:
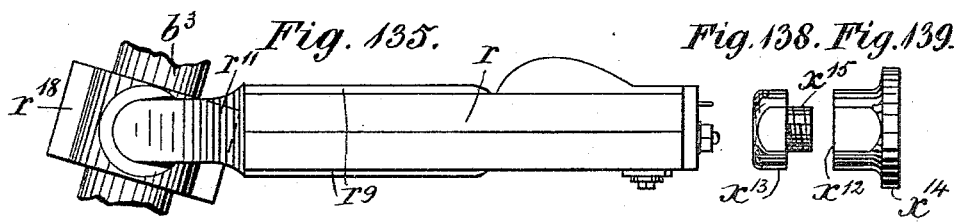
Figure 230:
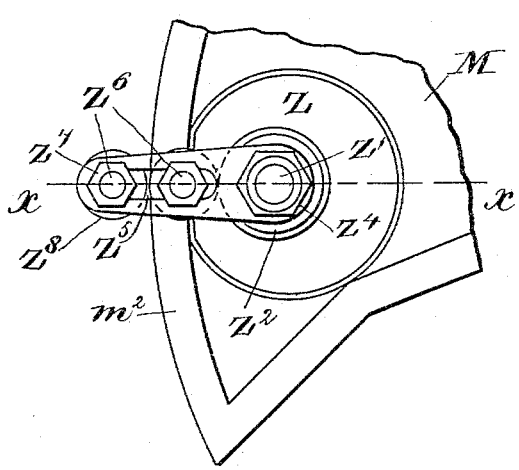
Figure 232:
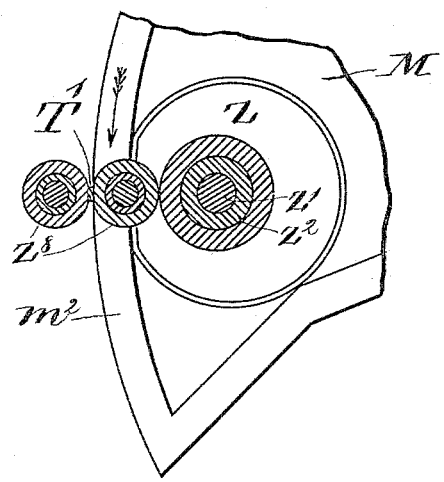
Figure 231:
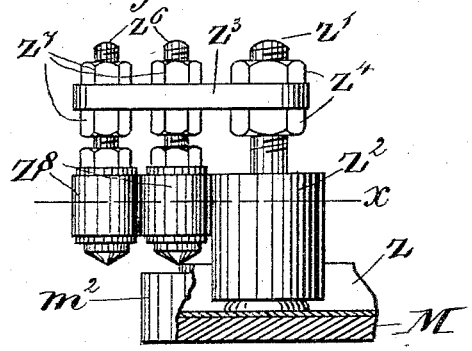
Figure 233:
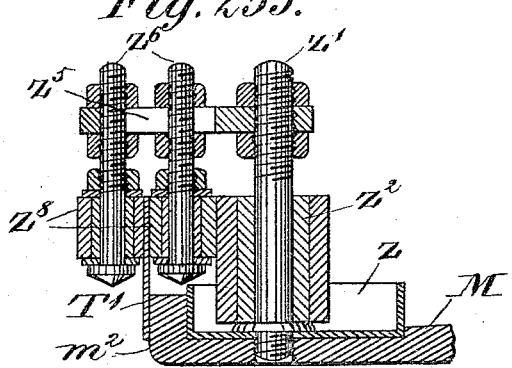

In the drawings hereunto annexed similar letters of reference and numerals indicate like parts; and Figure 1 is a plan of the entire machine embodying our invention. Fig. 2 is a plan of the entire machine, in which certain modifications of various parts are shown. Fig. 3 is a right-side elevation of the machine. Fig. 4 is an elevation of the front end of the machine. Fig. 5 is a side elevation of the arm $e^3$, having curved extension, with head $e^5$ bearing against the shaft $b$. Fig. 6 is a front elevation of the arm $e^3$, having the stud $e^4$ and curved extension $e^5$. Fig. 7 is a front view of the mechanism for controlling the delivery of the nail-blanks to the rolls, with the finger $e^7$ withdrawn from the conductor $e$, to permit of the passage of a nail-blank. Fig. 8 is a partial front view of the mechanism for controlling the delivery of the nail-blanks to the rolls, with the finger $e^7$ thrust in to prevent the passage of a nail-blank. Fig. 9 is an enlarged horizontal section on line $x\,x$, Fig. 7. Fig. 10 is a side elevation of the left side of the nail-blank conductor enlarged. Fig. 11 is a front elevation of the body-block $f$ of the large roll F. Fig. 12 is a side elevation of the body-block $f$ of the large roll F. Fig. 13 is a section on line $x$, Fig. 11. Fig. 14 is a side elevation of one of the die-blocks $f^4$ of the large roll. Fig. 15 is a front elevation of one of the die-blocks $f^4$ of the large roll. Fig. 16 is an end elevation of one of the die-blocks $f^4$ of the large roll. Fig. 17 is a central section of the cover-plate $f^7$ of the large roll. Fig. 18 is an elevation of the back or left side of the cover-plate $f^7$. Fig. 19 is a front elevation, enlarged, of one of the die-blocks $f^4$ of the large roll. Fig. 20 is an end elevation of the die-blocks $f^4$ shown in Fig. 19. Fig. 21 is a central section of the large roll F, showing end of shaft $b$ in connection therewith. Fig. 22 is an elevation of the large roll F, situated on end of shaft $b$. Fig. 23 is a front elevation of small roll G on the end of shaft $b'$, shown in connection therewith. Fig. 24 is a vertical section on line $x$, Fig. 23. Fig. 25 is an enlarged vertical section of large roll F, taken at $x\,x$, Fig. 22. Figs. 26 and 27 are front and side elevations of the previously-prepared nail-blanks which are delivered to the machine. Figs. 28 and 29 are front and side elevations of the nail-blanks after they have been acted upon by the rolls. Fig. 30 is a sectional view illustrating the action of the mechanism for disengaging the nail-blanks from the rolls. Fig. 31 is a front elevation of the auxiliary plate $i^8$ and block $h^{12}$, situated in approximate proper relation therewith. Fig. 32 is a plan of the auxiliary plate $i^8$. Figs. 33 and 34 are respectively back and front elevations of the block $h^{12}$. Figs. 35 and 36 are respectively side and back elevations of the disengaging-bar $i^{11}$. Figs. 37 and 38 are respectively side and back elevations of the plate I. Fig. 39 is a front elevation, partly in section, of the large and small rolls F and G, the conductors for delivering the blanks to the said rolls, and from the said rolls to the forwarding mechanism, also showing the mechanism for disengaging the nail-blanks from the rolls. Figs. 40 and 41 are respectively side and back elevations of the spring-door $i^3$. Fig. 42 is a section on line $x$, Fig. 41, and showing in elevation the back of the spring-door $i^3$. Fig. 43 is a horizontal section on line $x$, Fig. 40. Fig. 44 is an elevation of the forked stud $i^4$. Fig. 45 is a horizontal section on line $x$, Fig. 37, of the plate I, and section of spring-door $i^3$ on line $x$, Fig. 40, the plate $i^{11}$ and spring-door $i^3$ being placed in proper relation to one another. Fig. 46 is a view illustrating the action of the mechanism for disengaging the nail-blanks from the small roll. Fig. 47 is a view illustrating the action of the mechanism for disengaging the nail-blanks from the large roll. Figs. 48 and 49 are views of the parts forming the recesses into which the disengaged nail-blanks are delivered. Fig. 50 is a front view of the block H. Fig. 51 is a plan of the block H. Fig. 52 is a front elevation of the block H, with projection $h'$ in section, taken on line $x$, Fig. 51. Fig. 53 is a side elevation of the pivoted block $h^6$. Fig. 54 is a view of the under side of the pivoted block $h^6$, shown in Fig. 53. Fig. 55 is a view of the top side of the pivoted block $h^6$ shown in Fig. 53. Fig. 56 is a plan of the under side of the projection $h'$. Fig. 57 is a side elevation of the plate $h^{11}$ detached. Fig. 58 is a plan of the base-plate J of the forwarding mechanism. Fig. 59 is a plan of the base-ring K of the forwarding mechanism. Fig. 60 is a section on line $x$, Fig. 59. Fig. 61 is an enlarged sectional view of a part of the base-ring K, with stud $k^{12}$ and parts connected therewith in position. Fig. 62 is a sectional view of the base-ring, showing the recess in which the studs $k^{12}$ and parts connected therewith are located. Fig. 63 is an elevation of the screw-plug $k^{16}$ detached. Fig. 64 is an elevation of the stud $k^{12}$ detached. Fig. 65 is a plan of the forwarding-ring L. Fig. 66 is a plan of part of the forwarding-ring with one of the independent blocks $l^9$ in position. Fig. 67 is a cross-section of the forwarding-ring on line $x$, Fig. 65. Fig. 68 is a cross-section of the forwarding-ring on line $x$, Fig. 65, showing, also, in connection therewith a section of base-ring K on line $y$, Fig. 59, showing, also, in section the guide-plate N, and in elevation one of the guide-retaining clamps N'. Fig. 69 is an elevation of a portion of the forwarding-ring shown in Fig. 65. Fig. 70 is a front elevation of a portion of the forwarding-ring L and base-ring K, with independent blocks in place therewith, and showing the mechanism for operating the independent blocks. Fig. 71 is a plan of the parts shown in Fig. 70. Fig. 72 is a front elevation of a portion of the forwarding mechanism and base-ring K. Fig. 73 is a side elevation of one of the independent blocks $l^9$. Fig. 74 is a front elevation of one of the independent blocks $l^9$. Fig. 75 is a modification of the base-ring K shown in Fig. 59. Fig. 76 is a modification of the forwarding-ring L shown in Fig. 65. Fig. 77 is a plan of the lower portion, $l$, of the forwarding-ring L, connected to the forwarding-ring shown in Fig. 65, or to the modification shown in Fig. 76. Fig. 78 is a front elevation of a portion of the modification of the forwarding-ring L, with both the upper and lower portions shown in Figs. 76 and 77 in their proper relative positions with regard to each other. Fig. 79 is a section on line $x$, Fig. 76. Fig. 80 is a section on line $x$, Fig. 76, and section on line $x$, Fig. 75—that is to say, with the forwarding-ring L and base-ring K placed together in their proper relative positions with regard to each other. Fig. 81 is a plan of a portion of the modification of forwarding-ring L shown in Fig. 76, with a modified independent block placed in relation therewith. Fig. 82 is a front elevation of a portion of modification of forwarding mechanism shown in Fig. 76, with a modified independent block placed in relation therewith. Fig. 83 is a side elevation of one of the modified independent blocks. Fig. 84 is a front elevation of one of the modified independent blocks. Fig. 85 is a plan of the cover-plate M of the forwarding mechanism. Fig. 86 is a vertical central section of the main parts of the forwarding mechanism united together in their proper positions, being a section taken on line $x$, Fig. 92. Fig. 87 is a plan of the guide-plate N. Fig. 88 is a side elevation of the mechanism by means of which the forwarding-ring is actuated. Fig. 89 is a partial plan of the mechanism shown in Fig. 88, showing the pawl-bar $o^3$ as it engages with the lower ring of the forwarding mechanism. Figs. 90 and 91 are details of nail-discharging mechanism. Fig. 92 is a plan of the complete forwarding mechanism. Fig. 93 is a back elevation of the mechanism shown in Fig. 92. Figs. 94 and 95 are plans of that part of the forwarding mechanism illustrating the operation of the independent blocks, and presser-lever by which the independent blocks are alternately drawn back to form the recess to receive the head and lower portion of the nail-blanks as they descend after having been elongated by the rolls. The section of the plates $l^6$ and $l^{11}$ shown in Fig. 94 is taken on line $x$, Fig. 96. Fig. 96 is a front elevation of the mechanism shown in Fig. 94, but with the presser-lever shown in dotted lines instead of solid lines, for the purpose of showing the parts behind it more clearly. Fig. 97 is a plan of the complete forwarding mechanism modified. Fig. 98 is a plan of a portion of the flange $m^2$, guide-plate N, and plates $l^6$ and $l^{11}$ of the modified forwarding mechanism. Fig. 99 is a back elevation of the mechanism shown in Fig. 97. Fig. 100 is a plan of the pivot-bar $k^5$ detached from its position in Fig. 99. Fig. 101 is a side view of a presser-bar, $k^7$, with the adjacent parts in section. Fig. 102 is a side view of a presser-bar, $k^7$, detached. Fig. 103 is a plan of a portion of the mechanism shown in Fig. 104. Fig. 104 is a back elevation of a portion of the modified forwarding mechanism. Fig. 105 is an elevation of the back end of the machine. Fig. 106 is an elevation of the cam-shaft $b^3$. Figs. 107, 108, 109, and 110 are details showing the relative positions of the eccentric portions and cams on the shaft $b^3$. Fig. 111 is a plan of a portion of the bed-plate A and the standards $a^8$ $a^9$ $a^{10}$, the cover-plate $p$ being removed. Fig. 112 is a front elevation of the standards $a^8$ $a^9$ $a^{10}$, with cover-plate $p$ and blocks $p'$ in place, a part of the bed-plate A, shown in section on line $x$, Fig. 111. Fig. 113 is a side elevation of the swage-block slide, with swages and connecting-frame connecting the slide with the eccentric portion $b^5$ of the shaft $b^3$. Fig. 113$^a$ is a plan of the swage-block $p^5$, and tongue placed in relation therewith. Fig. 113$^b$ is a central vertical section of the swage-blocks $p^5$ and $p^6$, with tongue placed in relation therewith. Fig. 114 is a front elevation of the swage-block slide shown in Fig. 113, with swages, &c., in place. Fig. 115 is a plan of the parts shown in Fig. 113. Figs. 116, 117, 118, and 119 are various views of the mechanism for adjusting the length of the connecting-frame. Figs. 120 and 121 are vertical and horizontal central sections of the part $p^{16}$, with spring $p^{19}$ in place therewith. Fig. 122 is a front elevation of the parts shown in Fig. 112 modified. Fig. 123 is a part plan of the parts shown in Fig. 111 modified. Figs. 124 and 125 illustrate certain modifications of the swage-blocks shown in Figs. 113 and 114. Figs. 126 and 127 illustrate the action of the swage-blocks. Fig. 128 illustrates the effect of the swage-blocks upon the nail-blanks. Fig. 129 is a side elevation of the cutter-block $r$, in which are secured the cutters $r'$ for cutting the point of the nail-blank, with parts for connecting the said slide to the eccentric portion $b^6$ of the shaft $b^3$. Fig. 130 is a view of the front end of the parts shown in Fig. 129, showing also the standards $a^9$ and $a^{10}$ in connection therewith. Fig. 131 is a longitudinal sectional elevational view of the parts shown in Fig. 129, taken on line $x$, Fig. 132. Fig. 132 is a part sectional and part elevational view on line $x$, Fig. 129. Figs. 133 and 134 are side and front elevations of the parts $r^8$. Fig. 135 is a plan of the parts shown in Figs. 129, 130, 131, and 132. Fig. 136 is a front elevation of the mechanism for actuating the plate S. Fig. 137 is a vertical longitudinal section on line $x$, Fig. 136. Figs. 138, 139, 140, and 141 are details of construction of the mechanism shown in Figs. 136 and 137. Fig. 142 is a part reproduction of the section shown in Fig. 137, with the end of the plate S placed in relation therewith to illustrate the operation of the parts in actuating the plate S. Fig. 143 is a side elevation of the third modification of the cutters and plate S, showing cushion mechanism in relation therewith. Fig. 144 is a plan of the top side of the parts shown in Fig. 143. Fig. 145 is a plan of the bottom side of the parts shown in Fig. 143, but with plate S removed. Fig. 146 is a central vertical section of the plate $y$, with one of the cutters and the plate S placed in relation therewith. Fig. 147 is a plan of the upper edge of the plate S. Fig. 148 is a side elevation of the plate $y$. Fig. 149 is a front elevation of the plate $y$. Fig. 150 is an inner side elevation of one of the cutters $r'$. Fig. 151 is a horizontal section of a pair of cutters placed together, taken on line $x$, Fig. 150, showing in plan the lower part of the cutters $r'$. Fig. 152 is a transverse vertical section, taken about the line $x$, Fig. 143 or 146, of a pair of cutters moved apart and a section of the plate S placed in proper relation with one of them. Fig. 153 is an end elevation of a pair of cutters as shown in Fig. 143. Fig. 154 is an elevation of the inner side of one of the cutters of the fourth modification, with the plate S and wedge $y^0$ placed in proper relation in front of it. Fig. 155 is a side elevation of a pair of cutters of the fourth modification with plate S placed between them. Fig. 156 is a plan of the top side of the cutters shown in Fig. 155, and wedge $y^0$ placed in proper relation therewith. Fig. 157 is a plan of the under side of the cutters shown in Fig. 155, with wedge $y^0$ removed. Fig. 158 is a plan of the top side of the plate S. Fig. 159 is a plan of the bottom side of the plate S. Fig. 160 is a side elevation of one of the cutters of the fourth modification. Fig. 161 is a plan of the upper side of a pair of cutters of the fourth modification and wedge $y^0$ moved apart. Fig. 162 is a cross-section on line $x$, Fig. 161. Fig. 163 is a back end elevation of the cutters shown in Fig. 156. Fig. 164 is a front elevation of the cutters shown in Fig. 156. Figs. 165 and 166 are respectively front and side elevations of the wedge $y^0$. Figs. 167 and 168 are respectively a plan and sectional elevation, showing the mechanism for discharging finished nails from the machine. Fig. 169 is a side elevation of a first modification of cutters and bearing-block. Fig. 170 is a front view of the cutters shown in Fig. 169. Fig. 171 is a plan of the cutters and block shown in Fig. 169. Fig. 172 is a side elevation of a second modification of the cutters $r'$ and block $y$. Fig. 173 is a central vertical section of the block $y$, showing one of the cutters and plate S in relation therewith. Fig. 174 is an elevation of the front side of the block $y$. Fig. 175 is a front elevation of the block $x$. Fig. 176 is a plan of the bottom side of a pair of cutters of the second modification. Fig. 177 is a side elevation of one of the cutters of the second modification. Fig. 178 is a plan of the block $y$ and part of a pair of cutters, $r'$. Fig. 179 is a part sectional and part elevational view of the mechanism for discharging the clippings cut from the points of the nail blanks. Fig. 180 is a plan of the mechanism for discharging the clippings. Fig. 181 is a front elevation of the mechanism shown in Fig. 179. Fig. 182 is a part section and part elevation on line $x\ x$, Fig. 180. Fig. 183 is a side elevation of a part of the block $r$ with modified cutters $r'$. Fig. 184 is a front view of the parts shown in Fig. 183. Fig. 185 is a vertical central section on line $x$, Fig. 184. Fig. 186 is a vertical section of the tumbler $s^4$. Fig. 187 is a plan of the under side of the tumbler $s^4$. Fig. 188 is a side view of the tumbler $s^4$ and adjacent parts in position. Fig. 189 is a horizontal section on line $x$, Fig. 183. Fig. 190 is a sectional view illustrating the operation of the block $r$ and cutters $r'$ in the operation of clipping a nail-blank. Fig. 191 is a side elevation, showing the position of the parts after the nail-blank is clipped and the cutters have reached the end of their stroke beyond the nail-blank in a forward direction. Fig. 192 is an elevational view of the parts shown in Figs. 190 and 191, showing the position of the parts after the cutters have begun their return-stroke in a rearward direction. Fig. 193 illustrates the piece clipped from the nail-blank. Figs. 194, 195, and 196 are respectively a side elevation, plan, and section of the fixed cutter upon which the nail-blanks are clipped, the said section being taken on line $x$, Fig. 192. Fig. 197 is a side elevation of the rest and slide upon which the bevel-finishing block is attached. Fig. 198 is a front elevation of the slide and bevel-finishing block shown in Fig. 197. Fig. 199 is a central section of the rest and slide only, shown in Fig. 197, taken at about the position of line $x$, Fig. 198. Figs. 200 and 201 are respectively side and edge views of the wedge-bar of the nail-point-swaging mechanism. Fig. 202 is an end sectional view of the support of the rear end of the wedge-bar with the wedge-bar and cover in place. Fig. 203 is a plan of the rest of the nail-point-swaging mechanism. Fig. 204 is an end elevation of the rest shown in Fig. 203. Fig. 205 is a plan of the slide of the nail-point-swaging mechanism. Fig. 206 is a rear end view of the slide shown in Fig. 205. Fig. 207 is a view showing in section the nail-point-swaging blocks and parts adjacent thereto. Figs. 208 to 211, inclusively, illustrate the result produced by the nail-point-swaging blocks. Fig. 212 is a plan of the projection $j^4$ of the base-plate, showing cover of opening and the recess in which the fixed cutter of the nail-point-clipping mechanism is secured, and showing the end of the slide carrying the nail-point cutters in relation therewith. Fig. 213 is a part elevational and part sectional view of the parts shown in Fig. 212, the sectional part being taken on line $x\ x$, Fig. 212. Fig. 214 is a horizontal section taken at about the level of line $x$, Fig. 215. Fig. 215 is a vertical section taken on line $x$, Fig. 214. Figs. 216 to 229, inclusively, are details of minor parts for securing the fixed cutter T in place in groove $j^8$. Fig. 230 is a plan of the lubricating mechanism. Fig. 231 is a side elevation of the lubricating mechanism. Fig. 232 is a horizontal section on line $x$, Fig. 231. Fig. 233 is a vertical section taken on line $x$, Fig. 230.

Before proceeding with the description of the machine and its parts, it may be well, for convenience and clearness of understanding, to establish definitions of certain terms or phrases used in this specification. The following terms are used in reference to the machine: The end of the machine at which the operator stands to insert the nail-blanks into the conductor is called the "front" end, the opposite end thereto the "rear" or "back" end, the side at the right, when facing the front end of the machine, the "right side," and the opposite side thereto the "left side." Therefore in speaking of any part or sub-mechanism, as to which side is shown or upon which side such a feature is formed or exists, it is to be understood as referring to the above definition of front, back, right, and left.

The following terms are used with reference to the nails: A nail-blank is a small bar of metal of such quality and kind as it is desired to make the nails of, having an enlargement at one end. This enlargement is worked by the ordinary mechanism to the exact size and configuration required to form the finished head of the nail, and this enlargement is called the "head." The end opposite thereto is called the "point." The portion of the nail or nail-blank lying between the head and the point is called the "body." The distance through the body of the nail the shortest way is called the "thickness." The distance through the body the longest way is the "width." The distance from head to point, inclusive of both, is called the "length."

The body in a nail-bank is shorter, thicker, and narrower than that of the finished nail.

The following terms are used in reference to the location of certain parts of the forwarding mechanism: The point at which the nail-blanks are received from the rolls is considered the "initial" point of the mechanism, and the words "nearer" and "farther" are employed to distinguish differences of location in relation to that point.

We will now proceed to describe the mechanism embodying our invention.

The frame-work for supporting the operating parts is as follows:

Letter A, Figs. 1, 2, 3, and 4, represents the main supporting-bed or base-plate, constructed of any proper material and suitable size, which bed is itself supported on legs, as shown.

$a\ a'$ represent standards located at the front end of the machine, being made integral with the bed A, which standards are provided with proper bearings for supporting the shafts $b\ b'$, hereinafter described. The standards $a\ a'$ also furnish a support to the mechanism for controlling the delivery of the nail-blanks to the rolls, and the mechanism for disengaging the blanks from the rolls to the forwarding mechanism.

$a^2$, $a^3$, and $a^4$, Figs. 1, 2, and 105, represent fixed brackets situated at the rear end of the bed-plate. $a^5$ are caps, which, with the brackets, form proper bearings for the cam-shaft $b^3$.

$a^6$, Figs. 1, 2, 3, 4, and 105, represents a long standard located on the left side of the machine. This is provided with proper bearings for supporting the shafts B $b^2$, as shown.

$a^7$, Figs. 1, 2, and 4, represents a bent arm raised from the lower portion of the standard $a^6$, provided with a proper bearing for supporting one end of the main shaft B, as shown.

$a^8\ a^9\ a^{10}$, Figs. 3, 111, 112, 122, and 123, represent standards employed in connection with the cutting and swaging mechanisms. These are situated under the plate $p$, Figs. 1 and 2, and to them this plate is attached, as hereinafter described.

$a^{11}$, Figs. 1, 2, and 4, represents a raised portion of the bed-plate, which overhangs a portion of the forwarding mechanism, as shown. These parts should be constructed of suitable material and have such rigidity as to properly support the moving parts of the machine.

The shafting is as follows:

B, Figs. 1, 2, 3, and 4, represents the main shaft supported by bearings in the standard $a^6$ and bracket-arm $a^7$. This shaft is provided on its outer end with a pulley adapted to receive motion from the source of power.

$b$, Figs. 1, 2, 3, and 4, represents a shaft supported by bearings in the standards $a\ a'$, which shaft is provided at its right-hand end with a reducing-roll, F, at its left-hand end with a large gear-wheel, $c$, and near its left end, on the right side of the standard $a$, with a gear-wheel, $c'$.

$b'$ represents a shaft supported by bearings in the standards $a\ a'$, which shaft is provided at its right end with the reducing-roll G, and near its left end with a pinion, $c^2$.

$b^2$, Figs. 1, 2, and 3, represents a shaft supported by bearings in the standard $a^6$, upon which is located the intermediate gear-wheel, $c^3$.

$b^3$, Figs. 1, 2, 3, 105, and 106, represents a shaft supported by bearings in the brackets $a^2\ a^3\ a^4$, having the cap-blocks $a^5$, which shaft is provided on its right end with a fly-wheel, $b^4$, between the brackets $a^2$ and $a^3$, an eccentric portion, $b^5$, between the brackets $a^3$ and $a^4$, with an eccentric portion, $b^6$, and the cams $b^7$ and $b^8$, (see, also, Figs. 107 to 110,) and on the left side of the bracket $a^4$ with a gear-wheel, $c^4$, and the clutches $c^5$ and $c^6$. (See Figs. 1 and 2.)

The gear-wheels are as follows:

C represents a small gear-wheel upon the main shaft B, and $c$ a large wheel on the left end of the shaft $b$, the wheels engaging with each other, as shown.

$c'$, Figs. 1, 2, and 4, represents a gear-wheel on the shaft $b$, on the right side of the standard $a$ and adjacent thereto, and $c^2$ a pinion upon the shaft $b'$, engaging therewith. The pinion $c^2$ is so proportioned to the wheel $c'$ as to make exactly four complete revolutions to each single revolution of the wheel.

$c^3$, Figs. 1, 2, and 3, represents a large intermediate wheel upon the shaft $b^2$, which engages with the small gear-wheel C upon the main shaft, and also with a small gear-wheel, $c^4$, upon the shaft $b^3$.

The movement of the main shaft is communicated, by means of the gear wheels C $c\ c'\ c^2$, to the shafts $b\ b'$ of the reducing-rolls F and G, and by means of the gear-wheels $c^3\ c^4$ to the cam-shaft $b^3$, the arrows indicating the direction of the movement.

The cams are as follows:

D, Figs. 1, 2, 4, 5, and 7, represents a wheel or hub upon the shaft $b'$, having a rim or flange, $d$, provided with a cam, $d'$, adapted to actuate the mechanism for controlling the delivering of the nail-blanks to the rolls, as hereinafter described. The eccentric portion $b^5$ (see Figs. 106 and 107) serves to actuate the mechanism for swaging the nail-blanks, as shown in Figs. 113, 126, and 127. The eccentric portion $b^6$, Figs. 106 and 108, of the cam-shaft $b^3$ serves to actuate the mechanism for cutting the nail-blanks. The cam $b^7$, Figs. 106 and 109, actuates the mechanism for swaging the point of the nail. The cam $b^8$, Figs. 1, 2, 105, and 106, actuates the mechanism which gives the proper intermittent movement to the forwarding mechanism. These eccentric portions and cams are so timed, in the manner well understood, that the independent movements of the various mechanisms occur in harmony with each other, the swaging and cutting mechanisms both acting during that period of time in which the forwarding mechanism remains stationary, although not precisely acting at the same instant.

The nail-blank-controlling mechanism, or mechanism by which the nail-blanks are controlled in their delivery to the rolling mechanism, is as follows:

E, Fig. 4, represents a tray into which the nail-blanks, previously formed by any proper means, are deposited in mass.

$e$, Figs. 1, 2, 3, 4, and 7, represents a conductor consisting of a bar or block suitably supported upon the standard $a'$, which bar is provided with a rectangular opening or groove extending through the same, the opening being of sufficient size to permit the passage of a nail-blank. (See Fig. 8.)

$e'$, Figs. 1, 2, 7, and 9, represents a narrow slit opening into the groove $e$.

The upper end of the conductor extends upward through the tray in a convenient position (see Fig. 4) to receive the blanks from the hand of the operator, and the lower end extends down to the rolls into proper position to discharge the nail-blanks in between the rolls, as shown in Figs. 3 and 39.

$e^2$, Figs. 1, 2, 4, to 8, represents a rod supported upon the standards $a\ a'$ in such a manner as to be capable of free movement in a longitudinal direction.

$e^3$, Figs. 4, 5, 6, and 7, represents an arm depending from the rod $e^2$, which is secured thereto by a set-screw, as shown.

$e^4$, Figs. 4, 6, and 7, represents a stud projecting from the arm $e^3$, as shown, which stud, when the arm $e^3$ is properly adjusted upon the rod $e^2$, is held in the vertical plane in which the cam $d'$ moves, as shown in Fig. 4.

$e^5$, Figs. 5 and 6, represents a curved extension of the arm $e^3$, which is provided with a head, $e^6$, having a face adapted to bear between the shafts $b'$ and $b^2$.

$e^7$, Figs. 1, 2, 4, 7, and 8, represents a finger upon the right end of the rod $e^2$, which finger, when the rod is in the position shown in Figs. 4 and 8, extends into the rectangular groove in the conductor $e$ and closes the groove against the passage of a nail-blank.

$e^8$, Figs. 4 and 7, represents a spring located near the end of the rod $e^2$, one end of which rests against the bearing of the rod $e^2$ and the other against the hub of the arm $e^3$.

The operation of these parts is substantially as follows: The previously-prepared nail-blanks formed substantially as shown in Figs. 26 and 27, which have been deposited in the tray, are taken, one at a time, and fed head downwards into the open end of the conductor $e$, as shown in Fig. 4. If the rod $e^2$ is in its normal position, as shown in Fig. 4, when the nail-blank is placed in the conductor, the blank will be stopped by the finger $e^7$, and be held thereby until, at the proper time in the revolution of the shaft $b'$, the cam $d'$ strikes the stud $e^4$ and moves the rod $e^2$ and withdraws the finger $e^7$. The nail-blank then being unsupported falls through the conductor to the rolls, as shown in Fig. 39. The rod $e^2$ is caused to move longitudinally on its bearings against the action of the spring $e^8$ when the stud $e^4$ is struck by the cam $d'$, because held from revolution by the contact of the bearing-face of the head $e^6$ with the shaft $b$, as shown in Fig. 5. If the rod $e^2$ is not in its normal position, but has its finger $e^7$ withdrawn from the groove of the conductor, as shown in Fig. 7, when the nail-blank is placed therein, it will fall directly to the rolls. The finger $e^7$, it will be understood, is withdrawn from the groove of the conductor to open the passage once in each revolution of the shaft $b'$ by the action of the cam $d'$, and then is instantly thrust in again to close the passage when released by the cam $d'$, by the reaction of the spring $e^8$. By means of the described construction not more than one nail-blank can be delivered to the rolls at each revolution of the shaft $b'$. If, however, from any cause two or more nail-blanks should become jammed in the conductor, they may be loosened by inserting a hook or other proper instrument through the narrow slit $e'$.

The rolls for elongating the nail-blanks are constructed as follows:

The large roll: F, Figs. 1, 2, 3, 21, 22, 25, and 30, represents the large roll. This consists of a number of separate parts united to form a single structure.

$f$, Figs. 11 and 25, represents the main body portion of the roll, consisting of a metal block having a circular outline cut by four rectangular recesses, as shown.

$f'$, Figs. 12, 22, 25, and 30, represents a groove of varying depth formed in the periphery of the uncut portions of the block, as shown.

$f^2$, Figs. 11, 12, 13, 21, and 22, represents a round plate or disk secured to one of the side faces of the block, which is provided upon its under face with a bearing flange or face, $f^3$.

$f^4$, Figs. 14, 15, 16, 19, and 20, represents die-blocks having rectangular bearing-faces adapted to fit the recesses of the block $f$, curved faces to form, in connection with the uncut portions of the block $f$, the outer bearing-surface of the roll, and curved recesses on each side adapted to receive the bearing-flange $f^3$ of the disk $f^2$, and the corresponding flange, $f^8$, of the cover-plate $f^7$. (See Figs. 17, 18, and 21.)

$f^5$, Figs. 19 to 22, represents recesses in the curved face of the die-blocks, two in each, arranged in reversed order—that is, the parts adapted to receive the head located at opposite ends of the block. Each individual recess has an enlarged portion adapted, in connection with the correspondingly-enlarged portion in the adjacent end of the groove $f'$, Figs. 12 and 22, to receive the head of the nail-blank, or to receive so much of it as is intended that this roll shall receive, and retain the same until by the revolution of the roll it is brought into contact with the disengaging mechanism hereinafter referred to. The head of the blank, being of the proper form and size, is not subjected to pressure in its passage between the rolls. Each individual recess has also a portion extending from the enlarged head portion toward the point end, which is adapted in width to permit the expansion of the metal of the blanks, under the rolling action, to the shape and dimensions required for the finished nail, and in depth to cause a reduction of the thickness to the dimension required, and a consequent elongation of the blank beyond the amount required for the finished nail, the excess being provided to secure a perfect nail when the blank is cut. For a certain portion of the length of this recess—say from about 1 to 2, Fig. 25—the head of the nail-blank is held without being subject to pressure; for a further portion—say from 2 to 3— the body of the blank, by the decrease in the depth of the recess, is generally reduced in thickness; for a further portion—say from 3 to 4—the body of the blank, by the uniformity in the depth of the recess, is reduced to a uniform thickness; and for a further portion— say from 4 to 5—the surplus at the point end of the blank, by the increase in the depth of the recess, unnecessary elongation is avoided.

$f^6$, Figs. 19 and 20, represents a small auxiliary recess formed in the large recess at the large end of the same, as shown.

$f^7$, Figs. 17, 18, 21, and 22, represents a round cover plate or disk provided with a bearing-face, $f^8$, as shown. The die-blocks $f^4$, it will be observed, exceed in width the body-block $f$, and an intermediate space is left between the inner face of the block and inner face of the cover-plate $f^7$ when the parts are united, as shown in Fig. 21.

$b^5$, Fig. 21, represents a shoulder upon the shaft $b$, by means of which a solid bearing is furnished for one side of the roll.

$b^6$ represents a nut upon the threaded portion at the end of the shaft, by means of which the independent parts are firmly bound together to form a single structure.

The blocks are strongly held by the clamping action of the plates $f^2 f^7$, the bearing-faces $f^3 f^8$ of which engage only with the recesses of the die-blocks, the die-blocks exceeding the body-block in width, as before stated.

The roll is held from revolving upon the shaft by means of a key or feather, in a manner well understood. When the parts of the roll are in place, as shown in Figs. 21, 22, and 25, it will be observed that one of the two recesses upon each of the die-blocks coincides with the groove $f'$ upon the body-block $f$, the connecting series of grooves and recesses thus forming a continuous channel about the roll, as shown in Fig. 25. The recesses in the groove $f'$, Fig. 25, coincide in depth at one end with the recess at the point end of the die in contact with it, and at the other end with the recess of the head end of the die in contact with it, by which means a continuous bearing-surface is formed for the disengaging-finger $h^{15}$, hereinafter referred to, although the depth of the continuous channel is not uniform.

The construction and arrangement of the small roll G is shown principally in Figs. 23, 24, and 30. It is located on the right end of the shaft $b'$, as before stated, and consists of a plain cylinder having a recess, $g$, adapted to receive such portion of the heads of the nail-blanks as may be desired. This roll bears such relation to the roll F in size and arrangement of gearing as to revolve four times during one revolution of the large roll, its single recess coinciding at each revolution with the head portion of the recess of one of the four die-blocks $f^4$ in the large roll.

The operation of parts above mentioned is substantially as follows: The nail-blank, Figs. 26 and 27, having been permitted to descend to the bottom of the conductor $e$, Fig. 39, by the mechanism before described for controlling the delivery of the blanks to the rolls, and the head of the same having been caught or taken by the single recess in the roll G and the corresponding portion of the recess in one of the die-blocks $f^4$ of the large roll F, the blank is drawn in through between the rolls, as shown in Fig. 30. The head of the blank being of the proper form and size passes through the rolls without change, but the body of the same is reduced in thickness and extended in width and length, as shown, the rolled blank being the required dimension in the direction of its thickness and width, but an excess in that of its length. This excess of metal is provided to insure sufficient amount to form a perfect nail, and is removed at the proper time in the operation of the machine by the cutting mechanism hereinafter described. This excess of metal, owing to the increase in depth in that portion of the recess of the die which acts upon it, is not subjected to severe pressure.

We will now describe the mechanism for disengaging the reduced nail-blanks from the rolls and delivering them to the forwarding mechanism.

The mechanism employed in connection with the large roll F is as follows:

H, Figs. 39, 47, 50, to 57, represents a block, of L-shaped configuration, secured in position upon the standard $a'$ below the large roll F, (see Fig. 3,) which block is provided with projections or auxiliary blocks $h\ h'$, projecting from the face of the block H at corners diagonally opposite to each other. (See Figs. 50, 52.)

$h^2$, Figs. 50 and 52, represents a straight-sided recess in the front edge of the upper block, $h'$, which recess is adapted to receive a flange, $h^8$, Fig. 53, of a loose pivoted block $h^6$, hereinafter referred to.

$h^3$, Figs. 52 and 56, represents a circular recess extending up into the block from the lower side, which recess is adapted to hold the upper end of the spring $h^{10}$, Fig. 47, hereinafter referred to.

$h^4$ and $h^5$, Figs. 47 and 52, represent set-bolts located in the lower block, $h$, as shown.

$h^6$, Figs. 53, 54, and 55, represents a loose or pivoted block of step-like form, which is pivoted at its front end on the lower side by a recess, $h^7$, adapted to receive the point of the set-bolt $h^5$, as shown, Fig. 47.

$h^8$, Figs. 53 and 55, represents the flange before referred to, which is adapted to extend into the straight-sided recess $h^2$ of the block $h'$. (See Figs. 50 and 52.)

$h^9$, Figs. 47, 53, and 55, represents a circular recess in the block $h^6$, which is adapted to hold the lower end of the spring $h^{10}$, as shown.

$h^{11}$, Figs. 47 and 57, represents a plate, which, when in place, as shown in Figs. 53 and 54, forms the rear wall of a diagonal recess in the block $h^6$, the front edge of the plate being provided with a series of serrations, as shown, to engage with corresponding serrations or saw-teeth on the back edge of the saw-blade $h^{14}$.

$h^{12}$, Figs. 31, 32, to 34, represents a block, the upper end of which is provided with a curved face adapted to bear against the periphery of the roll F; also with a beveled edge adapted to guide the head of the nail-blank as it is disengaged from the rolls, as hereinafter described. The lower end of this block is provided with a recess adapted to rest upon the bolt $h^4$, and with an extension, $h^{13}$, as shown, Figs. 47 and 48. The body of the block is also provided with a diagonal recess, extending partly through the same, to receive, guide, and hold the blade $h^{14}$.

$h^{14}$, Figs. 39 and 47, represents a blade or bar, provided on its back edge with serrations or teeth for nearly the whole of its length, and at its upper end with a curved finger, $h^{15}$, as shown, Figs. 25, 30, 39, and 47. When the blade is in its proper position, (see Fig. 47,) its serrations or teeth engage with the serrations or teeth of the plate $h^{11}$ in the diagonal slot of the block $h^6$.

By means of the recess $h^7$ in the block $h^6$ the latter is adapted to turn upon the point of the bolt $h^5$ as a pivot. By means of the set-bolt $h^5$ the block itself may be adjusted in a vertical direction.

By means of the recess $h^2$ in the block $h'$ and the flange $h^8$ on the block $h^6$ the latter is held from lateral movements without interfering with its freedom to vibrate upon the point of the bolt $h^5$.

By means of the spring $h^{10}$ the rear end of the block $h^6$ is forced away from the fixed block $h'$, and hence the blade bears upon the edge 1, Fig. 47, of the block $h^6$ as a fulcrum. Thus the finger $h^{15}$ of the blade $h^{14}$ is caused to bear upon the roll F with an elastic pressure, and being arranged to travel in the recesses or grooves $f''f^3$, is enabled to accommodate its point to rest upon the unequal periphery, as shown in Fig. 25.

By means of the serrations or teeth upon the plate $h^{11}$ and those upon the blade $h^{14}$ the blade may be adjusted the amount of one or more of the teeth to approximate the position of the blade required, and further accuracy of adjustment will be obtained by screwing up or down the bolt $h^{15}$.

The operation of the parts employed in connection with the large roll to disengage the head of the nail-blank is substantially as follows: The blade $h^{14}$, having been adjusted in the pivoted block $h^6$, Fig. 47, in such a manner that its finger $h^{15}$ will extend into the continuous recess, as above mentioned, of the roll F, as shown, the latter, by the action of the spring $h^{10}$, will bear upon the surface of the recess with an elastic pressure. At the proper time in the revolution of the roll F the finger $h^{15}$ will enter the auxiliary recess $f^6$, Figs. 19 and 20, behind the head of the nail-blank and disengage the same from the roll, the head having been previously disengaged from the small roll G, as will be hereinafter described.

The mechanism employed in connection with the small roll G is as follows:

I, Figs. 37, 38, and 39, represents a plate secured to the outside of the vertical standard $a'$ by means of a set-screw, $i$, extending through a slot, as shown.

$i'$, Fig. 39, represents a set screw extending into the slot from the end of the plate, as shown.

$i^2$, Figs. 37, 38, and 39, represents a projection upon the face of the plate I, near its upper edge, which is provided with a pintle adapted to receive the upper end of the hinged portion of the spring-door $i^3$.

$i^4$, Figs. 39, 42, and 43, represents a stud or rod held in a chamber in the plate I, the upper end of which is provided with a fork, as shown in Fig. 44, and the lower end with a notch, as shown.

$i^5$ represents a coiled spring, one end of which is attached to the hinged portion of the door in any proper manner, and the other to the fork of the stud $i^4$, as shown in Figs. 39 and 42.

$i^6$, Fig. 39, represents a set-screw, by means of which the stud $i^4$, when properly adjusted, may be rigidly secured in place.

$i^7$, Figs. 40, 41, and 42, represents a set-screw in the door $i^3$, as shown.

$i^8$, Figs. 31, 32, and 39, represents an auxiliary plate located on the standard $a'$ above the plate I.

$i^9$, Figs. 31 and 32, represents a removable face-plate secured to the plate $i^8$ in such manner as to leave a space, $i^{10}$, between the two, as shown, Fig. 32.

$i^{11}$, Figs. 35, 36, and 39, represents a bar having at its extreme upper end a finger, $i^{12}$, and at its lower end a fork or slot, $i^{13}$. This bar, when in position, as shown in Fig. 39, lies with its upper end in the space $i^{10}$, Fig. 32, and its finger $i^{12}$ bears against the surface of the small roll G, and with its lower portion in the space $i^{10}$, Fig. 45, between the outer face of the plate I and the inner face of the door $i^3$.

$i^{14}$, Figs. 37, 38, and 39, represents a stud or pin projecting from the plate I through the slot $i^{13}$, as shown, and beyond it.

$i^{15}$, Fig. 39, represents a set-screw, by means of which the bar $i^{11}$ is supported and its vertical position adjusted.

$i^{16}$, Figs. 39 and 46, represents a coiled spring held in a suitable recess in the plate I, which spring bears against the lower end of the bar $i^{11}$ upon its front side, as shown.

By means of the screw $i'$, Fig. 39, the plate I may be adjusted to the desired position, and by means of the set-screw $i$ be securely fastened when adjusted.

By removing the face-plate $i^9$ and opening the door $i^3$ the bar $i^{11}$ may be taken out when desired.

By loosening the set-screw $i^6$ and turning the stud $i^4$ the tension of the spring $i^5$ of the door $i^3$ may be increased or diminished at will.

By means of the set-screw $i^7$ in the door its position when closed is accurately adjusted.

The operation of the parts employed in connection with the small roll G to disengage the head of the nail-blank is substantially as follows: The bar $i^{11}$, Figs. 39 and 46, having been properly adjusted in a vertical direction, is held upon the fulcrum-stud $i^{14}$, by the action of the spring $i^{16}$, in such a manner that its finger will bear upon the surface of the roll G with an elastic pressure. At the proper time in the revolution of the roll the finger $i^{12}$ is caused to enter the recess $g$ of the small roll and disengage that portion of the head which lies therein, as shown in Fig. 46.

The mechanism for conducting the disengaged nail-blanks from the rolls to the forwarding mechanism is as follows: The rear side of the bar $i^{11}$, above described, forms the front wall of the conductor-space $i^{10}$, Figs. 31, 32, 45, and 48, the same extending from the rolls to a point below the bearing-face $k^2$ of the base-ring K, upon which the heads of the conducted nail-blanks rest, as shown in Fig. 48. The front side of the block $h^{12}$, Figs. 33, 34, 39, 47, and 48, forms the rear wall of the conductor-space $i^{10}$, the said block extending from the roll to the upper edge of the peripheral flange $m^2$ of the cover-plate M, which flange forms the fixed wall which supports and guides the inner side of the nail-blank in its movement, as shown in Fig. 48. The auxiliary plate $i^8$, Figs. 31, 32, and 39, is located on the vertical standard $a'$ above the plate I. A portion of the outer surface of this plate, which extends rearward of the bar $i^{11}$, forms the upper portion of the inner wall of the conductor. The plate I, before referred to, is located on the standard $a'$ below the plate $i^8$, and a portion of the outer surface of this plate, passing out beyond the dotted line X, Fig. 37, forms the lower portion of the inner wall of the conductor, as shown in Fig. 45. The removable face-plate $i^9$ (shown in Fig. 31, before referred to) is located on the auxiliary plate $i^8$, and a portion of the inner side of this plate forms the upper portion of the outer wall of the conductor. The door $i^3$, before referred to, located on the plate I, furnishes by a portion of its inner side the lower portion of the outer wall of the conductor-space down to just above the upper edges of the plates $l^6$ $l^{11}$ of the forwarding mechanism, the edges of the plates $l^6$ $l^{11}$ forming the sides of the receiving-recesses of the said forwarding mechanism. With regard to the door $i^3$, it will be observed that in Figs. 40 and 42 a dotted line is shown. This represents that a portion of the door may be removed, as see also the dotted lines upon the conductor-space in Fig. 39. From this it is desired that it should be understood that the door may either be made, as shown by solid lines in Figs. 40 and 42, or as indicated by the outer dotted lines, the purpose of which will be hereinafter described.

The receiving-recess proper of the forwarding mechanism consists, first, of the bearing-face $k^2$ of the fixed base ring K, Figs. 48 and 49, upon which the heads of the nail-blanks rest as they are moved thereon; second, of the flange $m^2$ of the cover-plate, which forms a fixed continuous wall, adapted to support and guide the nail-blanks as they move upon the fixed base-ring; third, of a portion of the bar $i^{11}$, which sustains one side of the nail-blank as it rests upon the fixed base-ring before being moved by the forwarding mechanism; and, fourth, of one of the plates $l^6$ of the forwarding-ring and one of the plates $l^{11}$, the two being separate and actuated by a spring hereinafter referred to, the two said plates being so arranged that at the time the nail-blank falls down from the rolls through the conductor-space the two plates $l^6$ $l^{11}$ stand at a sufficient distance apart to receive the nail-blank between them. The bearing-walls of the plates $l^6$ and $l^{11}$ take the place of the right and left walls of the conductor, which terminate just above them, as before stated. The rear surface of the bar $i^{11}$ coincides with the inner surface of the guide-plate N, the end of which is adjacent thereto, as shown in Fig. 94. The guide-plate N takes the place of the bar $i^{11}$ when the nail-blank is moved away from the bar by the action of the plate $l^6$ of the forwarding-ring. The nail-blanks, when delivered to the recesses of the forwarding-ring, are carried along by the action of the plates $l^6$ of the forwarding-ring, their heads resting on the bearing $k^2$ of the base-ring, and their sides being supported by the flange $m^2$ and the guide-plate N, as will be hereinafter more fully described.

The general operation of the disengaging and conducting mechanism is substantially as follows: A nail-blank being elongated by the rolls, and coming head first through them, the head is first disengaged from the recess in the small roll G by the finger $i^{12}$ of the bar $i^{11}$, provided the head of the nail-blank should incline to stick in this recess; but should it incline to stick in the head portion of the recess $f^5$ of the large roll the head of the nail-blank is removed from the recess by the finger $h^{15}$ of the blade $h^{14}$. (See Figs. 25, 30, 46, and 47.) When thus disengaged, the nail-blank is guided by the beveled edge at the top of the block $h^{12}$ (see Fig. 47) into the main portion of the conductor, and is partly straightened by the joint action of the rolls and the finger $h^{15}$ and the bar $i^{11}$. The disengaged nail-blank, as soon as it has passed through the rolls, falls by gravity head downward through the conductor to the receiving-recess of the forwarding mechanism, as shown in Figs. 48 and 49, the said recess being then open and the forwarding mechanism stationary, ready to receive the head and a portion of the body of the nail-blank adjacent thereto. The nail-blank having been received in the recess is carried by the action of the forwarding-ring (shown in Figs. 65 or 76) out from beneath the line of the conductor, to permit the descent of another blank into the next following recess of the forwarding mechanism. The spring-door $i^3$, if not cut away, as indicated by the solid lines in Figs. 40 and 42, but left the full size, as indicated by the dotted lines in the same figures, is caused to open by the contact with it of the portion of the nail-blank projecting above the receiving-recess, the door opening a sufficient amount to permit the passage of the nail-blank, and then closing immediately afterward by the action of the spring $i^5$, to form again the outer wall of the conductor. If the door $i^3$ is cut away, as indicated by the solid lines in Figs. 40 and 42, the amount of said cutting away being that portion of the door lying between the solid and dotted lines in those figures, such amount cut away will be sufficient for at least the upper portion of the nail-blank to pass without opening the door, for it will be borne in mind that, as shown in Fig. 27, the head is much thicker than the body of the nail-blank, and the height of the part cut away from the door $i^3$, as shown in Figs. 40 and 42, will be sufficient to clear the body of ordinary nail-blanks. Thus the door in the majority of cases will not be opened by the nail-blank in its travel out from the conductor-space; but in case of any irregularity in the manufacture of the nail-blanks fed to the machine in the first place, whereby occasionally one should be, after passing through the rolls, of greater length than what can pass without opening the door, then the door will open to allow it (the nail-blank) to pass. Again, should a nail-blank in passing through the rolls into the conductor-space be bent or crookened in such a manner as not to clear the door, in such case the door will open to allow it to pass.

The mechanism for forwarding the nail-blanks disengaged successively from the rolls to the several mechanisms for acting upon them and forming them into complete or perfect nails is as follows:

J, Figs. 58 and 86, represents what may be called, for convenience, the "base-plate" of the forwarding mechanism, the same consisting of a circular plate, which, in connection with the other parts employed therewith, is located on the bed-plate A, nearer the front end of the machine, under the plate M. (Shown in Figs. 1 and 2.)

$j$, Figs. 58 and 86, represents a central opening adapted to receive the bolt $j'$, Figs. 1 and 2, which bolt, in combination with the bolts $j^6$, hereinafter referred to, serves to unite the base-plate J rigidly to the bed-plate A of the machine.

$j^2$, Fig. 58, represents a slot cut through the base-plate J upon one side, which slot corresponds with a similar opening cut in the bed-plate A.

$j^3$, Figs. 58 and 86, represent a peripheral flange, the periphery of which lies in contact with the inner edge or surface of the fixed base-ring K, hereinafter referred to, which ring rests upon the main bed-plate A and surrounds the base-plate J, as shown in Fig. 86. The periphery of the flange $j^3$ also serves for a guiding-surface for the inner surface or edge of the forwarding-ring L, hereinafter referred to, which ring rests upon the base-ring K and surrounds the base-plate J, as shown in Fig. 86.

$j^4$, Figs. 1, 2, 3, 58, 86, 92, 93, 97, 99, 212, 213, and 214, represents a block, of the configuration clearly shown, formed integral with the base-plate J, and situated to one side of it, projecting over beyond the periphery of the same, as shown. This is provided on its outer side with a curved face concentric with the circular-formed base-plate J.

$j^5$ represents a large opening within the block $j^4$, extending through the same and the base-plate J and bed-plate A, below the base-plate in a vertical direction.

$j^{12}$ are holes vertically situated, passing through the block $j^4$, and base-plate J, and corresponding holes are formed in the bed-plate A for the bolts $j^6$, hereinbefore referred to, to pass through and assist in holding the base-plate J rigidly in position upon the bed-plate A.

$j^7$, Fig. 58, represents a recess formed in the block $j^4$, in the position shown, which recess extends through the overhanging portion of the block from top to bottom.

The section of the base-plate J and block $j^4$ (shown in Fig. 86) is taken at or about the line $x$, Fig. 58.

$j^8$, Figs. 58, 92, 97, 99, 113, 114, and 115, represents a recess formed in the block $j^4$, as shown, which recess extends partly through the same from the top to the bottom, and entirely through the same from the outer face to the opening $j^5$, as shown.

$j^9$ represents a shallow recess extending along the top of the block, at the farther corner of the same, as shown.

As before stated, this base-plate J is rigidly secured to the bed-plate A, and the outer surface of its flange $j^3$, Fig. 86, furnishes an abutment for the inner surface of the fixed base-ring K, and a bearing-surface for the inner surface of the revolving ring L, the bearing-surface of the flange serving to guide the forwarding-ring as it is revolved upon the fixed base-ring by the actuating mechanism hereinafter described.

The block $j^4$ upon the plate J serves as a base of support for the fixed portions of the mechanism for swaging the nail-blanks, cutting off the excess of the same, and swaging the point, as will be hereinafter described.

It now becomes necessary to call attention to the fact that the drawings show a considerable number of modifications with regard to many of the remaining portions of the forwarding mechanism, and it is thought that the clearest and best way will be to proceed straight on with the description of the construction and operation of the forwarding mechanism and immediately afterward describe the various modifications.

The base-ring K, Fig. 59 and 86, has been to some extent described as to its position and relation with the base-plate J. This base-ring is fixed in position and may be rigidly secured to the fixed base-plate J after the forwarding-ring L has been put in place, which will be hereinafter described.

$k$, Figs. 59 and 75, represents a peripheral rim, having at its upper edge an inner broad bearing-face, $k'$, and an outer narrow bearing-face, $k^2$, which outer-bearing face is raised above the inner, as shown in Fig. 68.

$k^3$, Figs. 59, 75, 93, and 99, represents a horizontal opening formed in the rim $k$ upon one side of the ring, as shown.

$k^{12}$, Figs. 61, 64, 75, and 97, is a rectangular head of a stud. These studs are three in number, located in the narrow bearing-face $k^2$, as shown.

$k^{13}$, Figs. 61 and 64, represents a shank made in one with the head $k^{12}$ of the stud, as shown.

$k^{14}$ are end projections of larger size than the head $k^{12}$, as shown.

$k^{15}$, Figs. 61 and 62, represents an opening extending through the base-ring K, which opening is provided below with a threaded portion adapted to receive the threaded plug, $k^{16}$, Fig. 62, and at the top with a contracted opening fitted to receive the head $k^{12}$ of the stud, thus forming shoulders $a^{40}$, to agree with the projections $k^{14}$, and prevent the upper surface of the head $k^{12}$ from projecting above the surface of the bearing $k^2$.

$k^{17}$, Fig. 61, represents a spring inclosing the shank $k^{13}$. The lower end of the spring rests upon the upper end of the screw-plug $k^{16}$, and the upper end of the spring bears against the projections $k^{14}$, as shown. By means of this construction the heads $k^{12}$ of the studs form independent bearing-surfaces flush with the bearing-surface $k^2$, adapted to yield when pressure is brought to bear upon them, as and for the purposes which will be hereinafter described.

The forwarding ring is constructed as follows:

L, Figs. 65, 67, 68, 69, and 86, represents the forwarding-ring, consisting of a lower portion, $l$, Figs. 69, 77, and 79, and an upper portion, $l'$, Figs. 69, 76, 79, and 80, (the two taken together being called the "forwarding-ring" L,) the two being either formed in one piece or secured together, as indicated by the section-lining, Figs. 67 and 68.

$l^2$, Fig. 67, represents a bearing-face upon the lower portion, $l$, which bearing-face is adapted to rest and revolve upon the upper face of the base-ring K, as shown in Figs. 68 and 86.

$l^3$, Figs. 67, 68, and 69, represents the inner surface of the ring $l$ and $l'$, which surface bears against the outer periphery of the flange $j^3$ of the base-plate J, Fig. 86. This flange serves to guide the ring properly in its revolution.

$l^4$, Fig. 77, represents one of a series of teeth extending about the lower portion, $l$, of the ring L, as shown.

$l'$, Fig. 65, represents the upper portion, before referred to, consisting of a plate resting upon and secured to the lower portion, $l$, and is provided with a peripheral series of arms, $l^5$, projecting from the body of the ring in the same plane a short distance, as shown in Figs. 65 and 76, and then upward at right angles, as shown in Figs. 67 and 79, to form vertical plates $l^6$. The arms $l^5$ on the upper portion, $l'$, and teeth $l^4$ on the lower portion, $l$, are equal in number, as shown in Figs. 65 and 76.

$l^7$, Figs. 67 and 79, represents a recess formed in the outer angle of the arm $l^5$, which recess is adapted to receive the narrow bearing-face $k^2$ of the base-ring K. (See Figs. 68 and 80.)

$l^8$ represents a space formed by cutting away a portion of the metal on the left-hand side of each plate $l^6$, at the base of the same, as shown in Figs. 72 and 96.

$l^9$, Figs. 66, 72, 73, and 74, represents one of a series of independent blocks having a horizontal portion, $l^{10}$, a circular opening in one end of the same, as indicated by dotted lines at $l^0$ in Figs. 94 and 96, adapted to hold a spring, $l^{14}$, as shown by the above-mentioned figures, which spring and a vertical plate portion, $l^{11}$, will be hereinafter referred to.

$l^{12}$, Figs. 73 and 74, represents a recess formed in the outer angle of each plate, which recess, like the recess $l^7$, is adapted to receive the narrow bearing-surface $k^2$ of the base-ring K.

$l^{13}$ represents a space formed by cutting away a portion of the metal on the right side of the plate $l^{11}$, at the base of the same, as shown in Figs. 72, 74, and 96. The horizontal portions $l^{10}$ of the blocks $l^9$ rest upon the broad bearing-face $k'$ of the fixed base ring between the horizontal portion of the arms $l^5$, as shown in Figs. 66, 94, and 95, and are carried round with the arms in their revolving movement.

$l^{14}$ represents the spring before referred to, one end of which is held in the circular opening $l^0$, and presses against the bottom of this opening, and the other end of the spring bears against the horizontal portion of the adjacent arm $l^5$, as shown. The vertical portions $l^{11}$ of the blocks $l^9$ are thicker than the corresponding portions, $l^6$, of the arms $l^5$, as shown in Figs. 66, 94, and 95, for the purposes hereinafter explained. The forwarding-ring L rests upon the base-ring K, as shown in Figs. 68 and 80, and revolves about the flange $j^3$ of the base-plate J, as shown in Fig. 87, an intermittent movement being communicated by means of a mechanism, hereinafter described, acting on the teeth $l^4$ through the horizontal opening $k^3$ (see Figs. 89 and 93) in the base-ring K. The vertical plates $l^6$ of the arms $l^5$ of the ring L and the plates $l^{11}$ of the independent blocks $l^9$ revolve upon the narrow bearing $k^2$. (See Figs. 68, 72, 86, and 96.) The blocks $l^{16}$ of the plates $l^{11}$ (which two taken together form the independent block called "$i$") are caused to revolve with the plates $l^6$ by the contact of the arm $l^5$ with the springs $l^{14}$ of the blocks, the tendency of the springs being to keep the plates $l^{11}$ in contact (or, more properly speaking, as near as it can, as shown in Fig. 66) with the plates $l^6$, preceding them in the direction of revolution, as indicated by the arrow in Fig. 65. By means of this action a wide space is left, as shown, behind the blocks $l^9$ when the parts are in their normal position, as shown in Figs. 66 and 72. Each space $l^8$ and $l^{13}$ is adapted to afford proper room for the head of the nail-blank when the independent plate $l^{11}$ is caused to approach the relatively-fixed plate $l^6$, for the purpose of clamping the nail-blank, as shown in Fig. 96, at the left side. The cover-plate M, Figs. 1, 85, 86, and 92, is constructed as follows: The cover-plate M is circular in form, except on one side, where a space is formed (see Fig. 85) for the projection $j^4$ of the base-plate J.

$m$, Figs. 85 and 86, represents a central opening adapted to receive the central securing-bolt, $j'$, Fig. 1, which opening is closed when the parts are in place by the bolt and a bearing-collar.

$m'$, Fig. 85, represents a slot-opening formed in the cover-plate M, corresponding with the slot $j^2$ of the base-plate.

$m^2$, Figs. 85 and 86, represents a peripheral flange, the outer surface of which forms a fixed wall for supporting and guiding the inner side of the nail-blanks as they are carried around upon the bearing-face $k^2$ of the base-ring K by the contact with it of one of each of the plates $l^6$ and $l^{11}$.

$m^3$, Figs. 85, 90, 91, and 92, represents a finger secured to the cover-plate M, adjacent to the block $j^4$, at the farther end of the same. Its edge forms a bearing at an acute angle with the periphery of the plate M, the outer end being turned down, as shown. The plate M serves to protect the inner parts and furnish a supporting and guiding wall on one side of the nail-blanks, as above mentioned. It also serves to support the finger $m^3$ of the discharging mechanism above mentioned, and hereinafter again referred to.

The guide-plate is constructed as follows:

N, Figs. 1, 3, 87, and 93, represents a semicircular plate extending partly about the forwarding-ring L and plates $l^6$ and $l^{11}$, as shown in Fig. 92, the plate N being secured in place by brackets N', formed on the outer periphery of the base-ring K. The inner surface of the plate N forms a fixed wall for supporting the outer side of the nail-blanks as they are carried around upon the bearing-face $k^2$ of the fixed base-ring K. The nearer end of plate M comes in close proximity to the side of the bar $i^{11}$, forming the front side of the receiving-recess, as before described, and it extends about the ring nearly as far as the anvil-block Q, hereinafter described. Therefore it will be seen that by the plate N in front and the flange $m^2$ fixed walls are formed for the guidance of the nail-blanks in their movement upon the bearing-surface $k^2$ of the base-ring K while held between the plates $l^6$ and $l^{11}$.

$N^4$, Figs. 59, 60, 92, and 93, is a supplementary plate in extension of the plate extending from the plate N to the end of the projection $j^4$. It is reduced in height at $N^5$ to give room for the swage-block $p^5$ to pass over it, (see Figs. 126, 127,) and is again slightly reduced at $N^6$ to give room for the cutters $r'$, hereinafter referred to, to pass over it in a similar manner. It is provided with an inward-projecting rim, $N^7$, Fig. 60, leaving only so much space between the rim and the projection $j^4$ as the nail-blanks T' (see Fig. 60) can freely slide through as they are moved along by the forwarding mechanism. (See Fig. 92.) By this means the nail-blanks are kept close up against the projection $j^4$ during their passage around the back of the said projection.

The mechanism for actuating the forwarding mechanism is constructed as follows:

$b^8$, Figs. 1, 106, and 110, represents a cam upon the shaft $b^3$, before referred to; and O, Figs. 1, 3, 88, 89, and 105, represents a lever pivoted at its lower end to a cross-bar below the base-plate, as shown in Fig. 105.

$o$, Figs. 88 and 89, represents a bar hinged at its lower end to the lever at a point opposite to the pawl-bar $o^3$, hereinafter referred to; and $o'$ guide-plates, by means of which the bar $o$ is held from lateral movement without interference with its freedom to turn upon its hinge.

$o^2$ is a set-screw screwed into the lever O and projecting on its rear side.

$o^3$ represents a pawl-bar, the rear end of which is united to the lever by means of a universal joint, as shown, the front end of which is adapted to extend through the horizontal opening $k^3$, Figs. 75 and 93, of the base-ring K and engage with the teeth $l^4$ of the lower portion, $l$, of the forwarding-ring L.

$o^4$ represents a spring, by means of which the front end of the pawl-bar is kept constantly engaged with the teeth $l^4$.

$o^5$ represents a spring, by means of which the rearward motion of the pawl-bar is effected after the cam has given the lever its forward movement and revolved away from it.

By the bearing-bar $o$ and set-screw $o^2$ is obtained the necessary adjustment of the amount of movement imparted to the pawl-bar $o^3$ by the cam $b^8$ to the exact distance required to actuate the forwarding-ring properly at each impulse of the bar. At the proper time in the revolution of the cam-shaft $b^3$ the cam $b^8$ is caused, by means of the bearing-bar $o$ of the lever O, to actuate the pawl-bar $o^3$ and move the forwarding-ring the distance of one tooth, $l^4$. As the cam in its continued revolution revolves away from the bearing-bar $o$ the pawl-bar $o^3$ is returned to its normal position by the reaction of the spring $o^5$. The continued revolution of the cam $b^8$ gives, through the mechanism described, an intermittent revolving movement to the forwarding-ring as long as the mechanism is in operation. The forwarding-ring may be revolved by hand, when desired, by simply revolving the cam-shaft into the proper position to avoid interference between the cam $b^8$ and bearing-bar $o$, and then moving the lever O by hand in the manner well understood.

The general operation of the forwarding mechanism is substantially as follows: When the cam-shaft $b^3$ is in operation, its cam $b^8$ at the proper time at each revolution of the shaft is caused, by means of the lever O, to give a forward movement to the pawl-bar $o^3$, the front end of the pawl-bar $o^3$, by the action of the spring $o^4$, being held in contact with the teeth $l^4$ of the part $l$ of the forwarding-ring L, as shown in Fig. 89. This ring at each forward movement of the bar is also moved the distance of one tooth. The teeth $l^4$ are equal in number to the plates $l^6$, as before stated, and the length of the movement thus imparted to the ring at each impulse of the bar is such that one of the plates $l^6$ and also one of the plates $l^{11}$ separate therefrom by a mechanism for that purpose, hereinafter described, is brought into position to form one of the receiving-recesses, Figs. 48 and 49, into which the nail-blanks disengaged from the rolls descend, as has been before described. The intermittent movement of the ring is so timed relatively to the action of the rolls F and G that at each rest-interval in the movement of the ring a nail-blank is delivered from the rolls into the receiving-recess.

On the left-hand side of the bar $i^{11}$ is situated (see Fig. 94) the mechanism by which the independent blocks $l^9$ are operated, in combination with the springs $l^{14}$ and the revolving action of the forwarding-ring L.

$i^{17}$ represents a plate attached by screws $i^{18}$ to the base-ring K, (see Figs. 70, 72, 94, 95, and 96,) and it extends up a height equal (or a little above) to that of the base-ring K and plates $l^6$ $l^{11}$.

$i^{19}$ represents projections on the plate $i^{17}$, through which a pivot-pin, $i^{20}$, passes.

$i^{21}$ represents a presser-lever pivoted by the pivot-pin $i^{20}$ to the projections $i^{19}$. It is provided with a broad end, $i^{22}$, having a back face adapted to bear upon the outer surface of the plates $l^{11}$.

$i^{23}$ represents a spring situated partly in a small recess formed in the lever $i^{21}$ and partly in a corresponding recess formed in the plate $i^{17}$, and pressing between the two.

By the action of the springs $l^{14}$, with the arrangement of parts shown in Figs. 70, 71, 94, 95, and 96, the edge of each of the plates $l^{11}$, having the cut-away portion or space $l^{13}$, is kept close or adjacent to the edge of each of the plates $l^6$, having the cut-away portion or space $l^8$. When, however, one of the plates $l^{11}$ is, by the revolution of the forwarding-ring L, brought behind the plate $i^{22}$, (see Fig. 94,) the friction of the plate $i^{22}$ upon the plate $l^{11}$ overcomes the force of the spring $l^{14}$ and causes the block to be drawn back to the position shown at the left side of Figs. 94 and 96, thus forming a suitable recess for the reception of the head and adjacent portion of the body of the nail-blank in a manner so clearly delineated that no further explanation is required in this respect. It will be observed that the front edges of the plates $l^{11}$ are chamfered off, so that there is not any danger of their interlocking with the inner edge of the plate $i^{22}$, which is also chamfered off, the position of the parts being as shown, and the intermittent action being arranged to stop just as one of the arms $l^5$ and plates $l^6$ has brought one of the independent blocks $l^9$ and plates $l^{11}$ to the position shown at $N^2$, in which position a wide open space is formed between the plates $l^{11}$ and $l^6$ just when the edge of the plate $l^{11}$ has come about fair with the edge of the bar $i^{11}$. This position having been arrived at just as the intermittent motion of the forwarding-ring L stops, the parts remain stationary until a nail-blank has dropped down from the rolls into the space $N^3$. When the forwarding-ring L makes its next motion, the plate $l^{11}$, that was under the plate $i^{22}$, passes forward and comes behind the guide-plate N, and being carried beyond the action of the plate $i^{22}$ the spring $l^{14}$ causes the plate $l^{11}$ to press forward and between its edge and that of the next preceding plate $l^6$ to grip the nail-blank, and this it continues to do until after the same has been presented to the various mechanisms for swaging and clipping it, and is finally discharged from the machine. This is done by the continued revolving of the forwarding-ring L. As the nail-blanks are brought step by step (being guided between the flange $m^2$ of the cover-plate M and guide-plate N) the head of the nail-blank rests upon the bearing-face $k^2$ until each in its turn reaches the end of the guide-plate N and passes between a supplementary plate, $N^4$, and the projection $j^4$ of the base-plate J, as before described.

Before proceeding further with the description of the nail-blank-swaging mechanism we will describe the modifications of the forwarding mechanism above described, which modifications are delineated by Figs. 2, 75, to 84, and 97 to 104, inclusively.

$k^4$, Figs. 75, 97, and 99, represent a projecting portion on one side of the base-ring K, which is provided with a series of vertical recesses arranged at proper distances apart, as shown in Fig. 75, and a series of horizontal recesses in line with each other, as shown in Fig. 99.

$k^5$, Figs. 99 and 100, represents a pivot-bar secured in the horizontal recesses by means of the pins $k^6$.

$k^7$, Figs. 97 and 99, represents what may be termed for convenience "presser-bars," each consisting of a metallic bar having a base portion, $k^8$, Fig. 101, a curved central portion, $k^9$, and an inclined top portion with bearing-face, $k^{10}$. By means of the curved central portion each bar is secured in one of the vertical recesses of the projection $k^4$ by means of the pivot-bar $k^5$, as shown.

$k^{11}$ represents a spring located in a proper recess in the body of the base-ring K, behind the foot of the bar, (see Fig. 101,) the tendency of which is to press outward the lower end of the bar and inward the upper end of the bar. These presser-bars, it will be observed, are located in position opposite to the curved face of the block $j^4$. In this modification the stud $k^{12}$, and parts relating thereto, as hereinbefore described, are used, and as their construction and arrangement are exactly the same their description need not be again repeated. The forwarding-ring L in this case is provided with plates $l^6$, of the same width as its arms $l^5$. The spaces $l^8$, formed by cutting away a portion of the metal, are formed on the right side of each plate $l^6$, at the base of the same, as shown in Figs. 82 and 103. The independent blocks $l^9$, in this modification, leave the cutting away to form the space $l^{13}$ on the left side of the plates $l^{11}$.

$l^{14}$ are springs, one end of which is received in an opening in the horizontal portion $l^{10}$ of the block $l^9$, Fig. 94, and the other end of which bears against the horizontal portion of the adjacent arm $l^5$, thereby causing the plate $l^{11}$ of the independent block $l^9$ to close upon a nail-blank placed before the front edge of the said plate $l^{11}$ and behind the rear edge of the plate $l^6$ as soon as the plate $l^{11}$ has traveled beyond the action of the friction plate or surface $i^{22}$. The vertical plate portion $l^{11}$ of the blocks $l^9$ are thicker than the corresponding portions $l^6$ of the arms $l^5$, and this thicker portion is beveled on its right side, as shown in Figs. 81 and 83, for the purposes hereinafter explained.

By the above-described arrangement of the parts, as shown in Figs. 81 and 82, the spring has the opposite effect to that shown in Figs. 66, 72, 94, 95, and 96, for instead of causing the edges which grip the nail (shown more particularly in Fig. 96) to close together and thereby grip the nail-blank, the spring $l^{14}$ has the opposite effect and keeps the edges at their full extent apart until each in turn (the blocks $l^9$) reach the end of the guide-plate N and the first presser-bar $k^7$ of the series shown at the right end of Fig. 104. By the contact then of the plates $l^{11}$ with the presser-bar the plate advances far enough to clamp a nail-blank. When the nail-blank is once clamped, it is held clamped by the frictional contact of the successive presser-bars with the plate $l^{11}$ until all the mechanisms for acting on the nail-blank are passed and the complete nail is ready to be discharged from the machine. As the springs $l^{14}$ in this case by their action hold the plates $l^6$ and $l^{11}$ at their full distance apart throughout the entire circle of the nail-forwarding mechanism, except throughout that portion of it where the presser-bars $k^7$ are situated, they therefore stand open, ready to receive the nail-blanks as each pair of plates pass under the nail-conductor, which guides the nail-blanks as they descend from the rolls F and G.

These two modifications of arrangement of the forwarding mechanism, as they both produce the same result in substantially the same general manner, are considered equivalents, although the action of some of the parts in the one case is exactly opposite to that in the other, for any person of ordinary skill in the art of constructing machinery of the class to which this invention relates, having given him the nail-forwarding mechanism as it is herein described in its first construction or first modification and as illustrated in Figs. 66 and 94 and other figures, where one plate, $l^6$, (or each one of the plates $l^6$,) following the preceding plate, $l^{11}$, (or each one of the plates $l^{11}$,) are arranged to have their edges adapted to grip a nail-blank, being moved apart by a frictional bearing, $i^{22}$, to receive such nail-blank, and are further arranged so that when the plate $l^{11}$ has passed beyond the said frictional bearing, the nail-blank is gripped between the front edge of the plate $l^{11}$ and the back edge of the plate $l^6$ by the action of a spring, $i^{14}$, as herein described, operating the independent block $l^9$, with which the plate $l^{11}$ is integral. Such person, I say, would at once see that opening a space between the front edge of any one of the plates $l^{11}$ and the next preceding plate, $l^6$, does indeed and in fact mean closing together the back edge of the plate $l^{11}$ and the front edge of the next following plate, $l^6$, and therefore by making these edges suitable for gripping the nail-blank, as herein described, the action will be reversed, the nail being held or gripped by the said two plates, when the plates $l^{11}$ are operated by the frictional bearing $i^{22}$, and be held open or free from the nail-blank by the action of the spring $i^{14}$. This is the principal difference between the first modification and the second herein described. It is true, however, that in the modification shown in Figs. 97, 99, and 101 a number of presser-levers, $k^7$, are shown. This is, for convenience of construction and accuracy of operation, to show what would be obtained by making them all in one piece; but they really amount, when taken together, to the same as if made in one piece. It is also true that they are located in a different part of the circle of the forwarding mechanism, because the place where the gripping of the nail-blanks by the plates $l^6$ and $l^{11}$ is absolutely required—that is to say, throughout that part of the circle where the swaging, clipping, and nail-point-finishing mechanisms are situated—is about opposite on the circle of the forwarding mechanism to the place where the nail-blanks are received or dropped into the forwarding mechanism, so that while there is a considerable difference in the external superficial appearance of the two modifications, yet, when looked into closely, the difference of principle upon which they operate disappears, because the same effects are produced by the same means, only, the means being reversed the effects are reversed.

The mechanism for swaging the nail-blanks is as follows:

$a^8$ $a^9$ $a^{10}$, Figs. 111 and 112, represent the standards, before referred to, located on the bed-plate A, near the rear end of the machine, which standards serve to guide the swage-blocks in their movements, as will be more fully described hereinafter.

P, Figs. 111 and 112, represents a bed-plate resting upon the main bed-plate A, between the standards $a^8$ and $a^9$, which bed-plate P is provided with a V-shaped groove, as shown.

$p$, Figs. 1, 2, 3, and 112, represents a horizontal plate-cover, covering the standards $a^8$ $a^9$ $a^{10}$, which is provided with two bars or blocks, $p'$, each having a V-shaped projection, as shown.

$p^2$, Figs. 1, 2, 3, and 112, represents vertical set-screws located in the plate $p$ above the blocks $p'$, and adapted to bear upon the top of the same, and $p^3$ are horizontal set-screws adapted to bear upon one of the sides of each block $p'$, as shown.

$p^4$, Figs. 113, 114, and 115, represents the swage-block slide provided on its lower edge with a V-shaped projection, (see Fig. 114,) adapted to agree with the V-shaped groove of the bed-plate P, and its upper edge with a V-shaped groove adapted to engage with the V-shaped projection of one of the blocks $p'$.

$p^5$, Figs. 113, 114, 124, 125, 126, and 127, represents the lower swage, consisting of a plate of proper form and size, having at its front end a bearing-face adapted, in connection with the main portion of the anvil-block Q, to straighten the nail-blank presented in front of it by the forwarding mechanism if improperly bent, and to give the bend or curve desired.

$p^6$, Figs. 1, 2, 3, 113, 114, 124, 125, 126, and 127, represents the upper swage-block, consisting of a block of proper form and size, having on its front end inclined bearing-faces which are adapted, in connection with the upper portion of the anvil-block Q, to form upon the point end of the nail-blank the requisite beveled surface for the point of the nail.

$p^7$, Figs. 113 and 124, represents a set-screw located at the rear end of the swage $p^6$, as shown. The swages $p^5$ and $p^6$ are located in proper recesses in the front end of the swage-block, as shown.

$p^8$ is a plate, Figs. 113, 114, having a projection, $p^9$, secured to one side of the same, which projection, when secured in place, is adapted to bear upon the side of the swages and clamp the same.

$p^{10}$ represents two slots located one at each end of the plate $p^8$, which slots are open at one end, and $p^{11}$ are securing-screws passing through the slots and screwed into the body of the swage-block in the position shown.

$p^{12}$ represents a connecting-frame having arms $p^{13}$, pivoted at their front end to the sides of the swage-block, in a recessed portion of the same, the arms $p^{14}$ $p^{14}$ inclosing the parts $p^{15}$ $p^{16}$ of the bearing which surrounds the eccentric portion $b^5$ of the cam-shaft $b^3$, Fig. 106, as shown.

$p^{17}$ represents a cross-plate connecting the rear ends of the arms $p^{14}$.

$p^{18}$ are nuts upon the threaded ends of the arms, by means of which the cross-plate and other parts are properly secured in place.

$p^{19}$, Figs. 120 and 121, represents a spring interposed between the front surface of the cross-plate $p^{17}$ and the rear surface of the rear part $p^{16}$ of the bearing, which spring consists of a rectangular plate which is bent from the center to the sides and ends to form an arched surface, as shown. The adjacent face of the part $p^{16}$ of the bearing, it will be observed, is constructed also with an arched configuration.

$p^{20}$ represents an inclined bearing face formed on the rear wall of the central portion of the frame $p^{12}$, between the arms $p^{14}$, as shown.

$p^{21}$, Fig. 117, represents a cylindrical block formed upon the front wall of the part $p^{15}$ of the bearing, upon one side of the same, as shown, which is provided with a threaded stud, $p^{22}$, projecting from its inner end, as shown.

$p^{23}$ represents a collar upon the stud, as shown.

$p^{24}$, Figs. 116, 118, and 119, represents a block having an inclined bearing-face corresponding with the inclined bearing-face $p^{20}$ upon the frame $p^{12}$, which block is provided at one end with a central opening adapted to permit the passage of the stud $p^{22}$, as shown.

$p^{25}$ represents a nut upon the stud $p^{22}$.

If desired, the frame $p^{12}$ may be made in two parts instead of one, the individual parts being strongly secured together.

The operation of the parts is substantially as follows: The set-screw $p^2$ and blocks $p'$ may be adjusted vertically, to engage properly with the recess of the swage-block slide, which moves thereon. By means of the set-screws $p^3$ the blocks $p'$ may be securely held in any position in which they may have been adjusted. By means of the set-screws $p^7$ in the upper swage, $p^6$, the said swage may be adjusted to bear or be indented into the nail-blank, as shown by Fig. 127. The lower swage, $p^5$, may be adjusted in a forward direction by inserting a supplementary plate behind it. By means of the open side slots, $p^{10}$, by simply loosening the screws $p^{11}$, the plate $p^8$ may be moved backward and taken out without removing the screws $p^{11}$. The plate $p^8$ being removed, the swages may be adjusted or taken out, the upper swage being first removed, and afterward the lower one. By means of the special form given to the spring $p^{19}$—that is, that of an arch both longitudinally and transversely—it is adapted to exert a greater pressure than it would do if curved only in one direction. By means of a similarly-curved bearing upon the part $p^{16}$ a proper base is afforded for the spring $p^{19}$, in order that it may not be fractured or distorted under excessive pressure. By means of the adjusting mechanism, inclined bearing-surface $p^{20}$, cylindrical block $p^{21}$, stud $p^{22}$, collar $p^{23}$, block $p^{24}$, and nut $p^{25}$ upon the connecting-frame $p^{12}$, the length of the connection may be varied at will, the adjustment being performed by screwing the collar $p^{23}$ in or out upon the stud $p^{22}$. By the position of the collar $p^{23}$ upon the stud $p^{22}$ the lateral position of the block $p^{24}$ is determined, and its inclined surface engaging with the inclined surface $p^{20}$ of the frame $p^{12}$ increases or diminishes, as the case may be, the length of the connection between the bearing of the shaft and the swage-block slide $p^4$. By means of the construction described the swage-block slide $p^4$ is united to the eccentric portion $b^5$ of the cam-shaft $b^3$ by a connection which is sufficiently elastic to avoid breakage when exposed to undue strains, and which may be readily adjusted to the desired length. As above described, the swages $p^5$ and $p^6$ are arranged as shown in Figs. 124, 125, 126, and 127, and their effect upon the nail-blank is clearly illustrated by Figs. 126, 127, and 128, and this mechanism may be said to be complete when used in combination with the anvil-block Q; but inasmuch as it is sometimes found that the swages $p^5$ and $p^6$, after they have pressed the nail-blank, manifest occasionally an inclination to draw the nail-blank from its position, as shown in Fig. 127, slightly away from the anvil-block Q, therefore a tongue-piece may be employed, if desired, to overcome any difficulty that might arise on this account. This tongue-piece and the manner of arranging it with the swages $p^5$ and $p^6$ are delineated in Figs. 113$^a$, 113$^b$, 114, and 115. A groove, $p^{26}$, is cut in the upper surface of the swage $p^5$, in which a tongue, $p^{27}$, is placed, filling the front part of the groove. The rear part of the groove being enlarged in a downward direction, gives room for a portion of the tongue to be bent downward in a corresponding manner. On this bent portion of the tongue a spiral spring, $p^{28}$, is placed, and so arranged with the rear downward-bent end of the tongue that, pressing against the bend in the tongue at the one end and against the block $p^4$ at the other, it causes the head of the tongue $p^{29}$, which is made broad and of the configuration shown in Fig. 113$^a$, to protrude beyond the swages $p^5$ and $p^6$, as shown in Fig. 113$^b$. When the swages by their forward stroke are brought to bear upon the nail-blank, the spring $p^{28}$ yields, and the head $p^{29}$ slides in between the front ends of the swages $p^5$ and $p^6$ until its front edge is flush or fair with the front surface of the swage $p^5$—that is to say, in the position shown in Fig. 113$^a$. Therefore, after the swages have acted upon the nail-blank and begun their return-stroke, the force of the spring $p^{28}$, acting through the medium of the tongue $p^{27}$, prevents any tendency to any temporary sticking or adhesion of the nail-blank to the surface of the swages $p^5$ and $p^6$.

Q (before referred to) represents the anvil-block located in the recess $j^7$, Fig. 58, and shown in position in Figs. 1, 2, 92, 93, 97, and 99, which block is provided with a bearing-surface adapted to properly hold one side of the nail-blank while the other is being acted upon by the swages $p^5$ and $p^6$.

The general operation of the swaging mechanism is substantially as follows: The elongated nail-blank which has been disengaged from the rolls and delivered into the receiving-recesses of the forwarding mechanism is carried thereby until it is brought in front of the anvil-block Q, and being held there stationary by the intermittent motion during the period of time that elapses between one intermittent motion of the forwarding mechanism and the other, the eccentric portion $b^5$ of the cam shaft $b^3$ is timed to operate the swages $p^5$ and $p^6$ and properly swage and shape the nail-blank. The lower swage serves to straighten the nail-blank, if improperly bent, and give it the proper curve and bend. The upper swage serves to form the proper beveled surface for the point of the nail-blank. The upper swage acts, first, to form the bevel, and the lower swage, after, to straighten the nail-blank. The necessary provision for the expansion of the metal under the swaging action is furnished by the spring-stud $k^{12}$, Fig. 61, in the base-ring K, upon which the head of the nail-blank rests, as shown. It has been before stated that there are three spring-studs, $k^{12}$, and that they are all alike in their construction. One of these, as just above stated, is placed in the bearing-face $k^2$ in front of the anvil-block Q. Another one is similarly situated behind the bar $i^{11}$. The object of this stud is to overcome the difficulty which is sometimes experienced by the rebound or bouncing of the nail-blanks as they fall down from the rolls F and G upon the bearing-surface $k^2$, if the stud $k^{12}$ is not provided in this position. The position of the third stud, $k^{12}$, and its use will be hereinafter described. After the swaging action has been performed the elongated blank is carried forward to the cutters. The form given to the nail-blank when acted upon by the swages is shown in Figs. 127 and 128.

We will now describe the mechanism for cutting the blanks to form the nails.

$a^9$ and $a^{10}$, Figs. 111 and 112, represent the standards before referred to, located on the base-plate A, near the rear end of the machine, which standards serve to guide the cutter-block $r$, Figs. 129 and 130.

R, Figs. 111 and 112, represents a bed-plate resting upon the bed-plate A, between the standards $a^9$ and $a^{10}$, which plate is provided with a V-shaped groove adapted to engage with a corresponding projection upon the lower edge of the cutter-block $r$, Fig. 130, as shown.

$p'$, Fig. 112, represents a block, before referred to, which is provided with a V-shaped projection adapted to engage with a V-shaped recess upon the upper edge of the cutter-block $r$, Fig. 130, as shown.

$r$, Figs. 129, 130, 131, 132, and 135, represents this cutter-block held in the ways described, in such manner as to be capable of free movement in a longitudinal direction.

$r'$ $r'$, Figs. 129, 130, 131, and 132, represent the cutters held in a proper recess at the front end of the cutter-block by a removable securing-plate, $r^2$, Figs. 129 and 130, like the plate $p^3$, Figs. 113 and 114, before described.

$r^3$ $r^3$, Figs. 129 and 130, represent the cutting-edges of the cutters $r'$, of such shape as to cut, in connection with the fixed cutter T, Fig. 195, the nail-blank to the proper form, as shown in Fig. 208.

S, Figs. 131, 132, 190, 191, and 192, represents an independent plate, hereinafter referred to, which is held between the cutters $r'$ $r'$, as shown.

$r^4$ represents a surface formed at the rear end of the recess, in front of which is placed, as shown in Figs. 129, 131, and 132, a cushion mechanism, X X, the detail and construction of which we will now describe.

In the upper part of the block $x^5$ (see Figs. 136 and 137) a screwed opening is formed, in which is inserted a set-screw, $x^6$, the face of which is made fair and parallel with the back of the block, and is provided with a groove to receive a screw-driver or similar instrument by which the set-screw $x^6$ may be screwed in or out of the block, and thus adjust the position of the cutters $r'$ $r'$ in the amount that it is required that their outer ends should project beyond the cutter-block $r$. In the lower part of the block a spring-head is formed for the decreased end of the independent plate S to press against, as shown in Fig. 142.

The following description of the block $x^5$ and its parts is more particularly illustrated by Figs. 131, 136, 137, 138, 139, 140, 141, 142, and 143.

$x^7$ represents a recess formed in the lower part of the body of the block $x^5$, having a decreased opening, $x^8$, on the front side, whereby a shoulder, $x^9$, is formed within the recess. In the back of the block $x^5$ a dovetailed recess is formed across it, as indicated by the dotted lines in Fig. 136, and into this recess is fitted a dovetailed plate, $x^{10}$, having an opening, $x^{11}$, of about equal size to the opening $x^8$, in front, and forming a shoulder at the back of the recess corresponding with the shoulder $x^9$ in front. Within the recess $x^7$ is situated a thimble made in two parts, $x^{12}$ and $x^{13}$. The front part, $x^{12}$, is provided with a flange, $x^{14}$, and through the parts $x^{12}$ and $x^{13}$ an opening is formed which is screw-threaded, and in this opening is inserted a close-fitting screw, $x^{15}$. Within the parts $x^{12}$ is formed a recess in which is situated a disk, $x^{16}$, for the end of the independent plate S to press upon, by reaching in through the opening $x^8$, as shown in Fig. 142. Within the space that exists in the recess $x^7$ around the thimble a spiral spring, $x^{17}$, is placed, one end of which presses forcibly against the back plate, $x^{10}$, and the other against the flange $x^{14}$, which flange in turn bears against the shoulder $x^9$, keeping the same forcibly pressed against the said shoulder; but when the end of the independent plate S presses with still greater force upon the disk $x^{16}$ it causes the spring $x^{17}$ to yield and the thimble to be depressed from the position shown in Fig. 137 to about that shown in Fig. 142. To enable an independent adjustment of the disk $x^{16}$ in its relative position in the block $x^5$, the screw $x^{15}$ is provided. It will be observed that the recess in which the disk is located is somewhat deeper than the thickness of the disk, and by screwing the screw $x^{15}$ a little more into the part $x^{12}$ than that shown in Fig. 137 the position of the disk in the recess will be adjusted. The part $x^{13}$ of the thimble may be used as a jam-nut on the screw $x^{15}$, to secure it after the last-mentioned adjustment. Thus it will be seen from the above description that an elastic cushion susceptible of adjustment is provided to receive and act upon the end of the independent plate S. Many forms of such cushion may be devised, and a tumbler mechanism will hereinafter be described in this specification for actuating the independent plate S. Now, as in this specification it will be necessary hereinafter to refer to this cushion mechanism, and as it would be tedious and confusing to be obliged to identify it by a repeated mention of the whole of the parts forming the same, we shall, for clearness of understanding and convenience for the reader in future reference to it, call it the "cushion mechanism X X."

Having described the cushion mechanism X X, it now becomes necessary to explain that if the cushion mechanism is used, instead of what we have mentioned above as the tumbler mechanism, a slight difference in the construction of the cutters $r'$ $r'$ is required, and to endeavor to describe the two arrangements together would only lead to confusion. We will therefore leave the cutters $r'$ $r'$, independent plate S, and cushion mechanism X X at this point and go on with the modification of the cutters as arranged for the tumbler mechanism, which description will in a great measure explain and show the use and value of the cushion mechanism X X.

Referring to Figs. 183, 185, and 189, the ends of the cutters $r'$ $r'$ are represented as bearing upon the surface $r^4$.

$r^5$ represents a space formed in the rear end of one of the cutters, which space is adapted to permit the projection into it of the arm $s^7$, hereinafter referred to.

$r^6$ and $r^7$, Fig. 183, represent stop-blocks upon that side of the cutter-block on which the tumbler $s^4$ is situated beside it, one or both of which blocks may be adjustable, if desired.

$r^8$, Figs. 129, 131, 132, 133, and 134, represents a frame made in two similar parts, each of which is provided with a side-bar portion, $r^9$, having at the one end a hemispherical projection, $r^{10}$, and a bent-arm portion, $r^{11}$, at the other, which bent-arm portions have formed on them journal-studs $r^{12}$.

$r^{13}$ $r^{14}$ represent screws, by means of which the parts when in position are rigidly united together to form a single frame, which serves as a connecting-rod to unite the shaft-bearing to the cutter-block.

$r^{15}$ represents a recess formed in the cutter-block, which is adapted to receive the front side of the ball formed by the union of the hemispherical projections $r^{10}$, as shown in Fig. 132.

$r^{16}$ represents a bearing-block having a recess adapted to receive the rear side of the ball above referred to.

$r^{17}$ represents distance-blocks, which are inserted in place after the other parts are brought together to hold the bearing-block $r^{16}$ in place.

$r^{18}$, Figs. 129, 131, 132, and 135, represents bearing-blocks, by means of which the connecting-rod frame is united to the shaft $b^3$, each block being provided with a semi-cylindrical face adapted to inclose the eccentric portion $b^6$ of the shaft $b^3$, (see Fig. 106,) a vertical recess adapted to receive the journal-studs $r^{12}$ of the frame $r^8$, and a recess or projection, $r^{19}$, adapted to engage with a corresponding recess or projection on the other part, as shown. The cutter-block, owing to its position relatively to the circular forwarding mechanism, is set at an angle to the shaft $b^3$, as shown in Fig. 135. The movement of the shaft, however, is communicated to the cutter-block without strain, by means of the journal-studs $r^{12}$, in a manner well understood, By means of the ball-and-socket joint which unites the cutter-block to the frame ample provision is made for the slight amount of lateral movement which will result from the angular position of the shaft.

$s$, Figs. 122, 123, and 188, represents a recess cut in the inner side of the vertical standard $a^{10}$, at the front of the same, which recess is provided on its lower side with a bearing-block, $s'$, having an adjusting-screw, $s^2$, which adjusting-screw extends through a slot-hole, $s^3$, in the standard $a^{10}$, and has its end screwed into the block $s'$. By this means this block may be adjusted and secured.

$s^4$ represents what, for convenience, may be called a "tumbler." It consists of a block of hatchet-like form, which is provided below with a bearing-face, $s^5$, and a shoulder, $s^6$, which extends outward and forms an arm, $s^7$, and above with a vertical recess adapted to hold a spring and the shank of a head or button, $s^8$, as shown. This tumbler when in position rests with its bearing-face $s^5$ upon the upper bearing-face of the block $s'$, and the upper face of the head of the button $s^8$ bears against the upper surface of the recess, as shown in Fig. 188. The left face of the tumbler bears against the wall of the recess, and the right face of the tumbler is toward the left face of the cutter-block, as shown in Fig. 190. The upper portion of the tumbler lies between the stop-blocks $r^6$ and $r^7$, as shown in Figs. 188, 190, 191, and 192. The end of the arm $s^7$ extends into the space $r^5$, behind the rear end of the independent plate S, as shown in Figs. 183, 185, 189, to 192, inclusively.

By means of the slot $s^3$ in the standard $a^{10}$ and the screw $s^2$ the block $s'$ may be adjusted as desired to determine the exact movement of the tumbler $s^4$.

T, Figs. 190, 194, 195, and 196, represents the fixed cutter located in the central recess, $j^8$, of the block $j^4$, Fig. 58, which consists of a bearing-surface having cutting-edges of such form as to correspond with the cutting-edges of the cutters $r'$. This part T may be either made as shown in Figs. 194 and 195 or as shown in Figs. 220 and 221. In the latter case it is provided with a downward-projecting continuation which enters into a recess formed in the block $j^4$, as shown in Fig. 213.

Figs. 217 and 218 show front elevations of two clamping-plates, $t$, situated one on each side of the fixed cutter T, while Figs. 216 and 219 show side elevations of these clamping-plates $t$. These two plates are alike, only one is made "right" and the other "left." Each of these clamping-plates $t$ is provided with a base portion adapted to clamp the base of the fixed cutter T and an upper portion having a recess to permit the entrance of the cutters $r'$ and the portions cut off the nail-blanks to pass.

$t'$, Figs. 92, 93, 97, 99, 212, 214, 215, 227, 228, and 229, represents a cotter-pin held in a portion of the recess $j^8$ of the block $j^4$, which, by means of its wedging action, causes the plates $t\ t$ to securely hold the fixed cutter in position.

$t^2$, Figs. 194, 222, and 223, represents an auxiliary plate located in rear of the fixed cutter T, which auxiliary plate is provided with an inclined upper surface which connects with the upper surface of the cutter, as shown in Fig. 194.

$t^3$ represents a pair of clamping-plates adapted to hold the auxiliary plate $t^2$; and $t^4$, Figs. 224, 225, and 226, are respectively front and side elevations of a cotter-pin held in a proper portion of the recess $j^8$, which pin by means of its wedging action causes the clamping-plates $t^3$ to securely hold the auxiliary plate $t^2$.

$T^6$, Figs. 212 and 213, is a small piece let into the block $j^4$ and forming a projection at the end of the recess $j^8$, the object of which is to form a slight projecting surface immediately under the bottom of the fixed cutter T, so that as the nail-blanks are presented on the rear end of the fixed cutter T their bodies are by this slight projection caused to move slightly rearward, and thus obviate any danger of the edge of the nail-blanks interlocking with the edge of the fixed cutter T. It will be observed that this projection $T^6$ is located opposite the reduction $N^6$ in the plate $N^4$. (See Fig. 93. Therefore no obstruction is rendered by the plate $N^4$ to the projection $T^6$ moving the nail-blanks, as above mentioned. This is important, for without the projection $T^6$ much trouble would be experienced from nail-blanks interlocking on the edge of the fixed cutter T, as it is found not to be desirable to set the fixed cutter T within the surface of the block $j^4$. The amount the projection $T^6$ projects beyond the surface of the block $j^4$ is so very small that it cannot well be shown in the drawings. It may, however, be stated that this projection is made in the full-size machines not more than a one thirty-second to one sixty-fourth of an inch; but we do not wish to confine ourselves by the above-mentioned dimensions.

The general operation of the cutting mechanism is as follows: The nail-blank which has been acted upon by the swaging mechanism in a manner before described is brought by the continued movement of the forwarding mechanism in proper position on the rear end of the fixed cutter T and projection $T^6$, as shown in Figs. 190 and 213, where T' represents the nail-blank. By the action, then, of the eccentric portion $b^6$ of the shaft $b^3$ the cutter-block $r$, having the cutters $r'$, is advanced at this time to cut the blank, in connection with the fixed cutter T, and form the point of the nail, as shown in Fig. 193. When the cutters $r'$ are carried forward to cut the nail-blank, the tumbler $s^4$, by the contact with it of the stop-block $r^7$ of the cutter-block $r$, Figs. 188 and 191, is also carried forward upon the bearing-block $s'$ until its shoulder $s^6$ engages with the end of the block, as shown. By the contact of the arm $s^7$ of the tumbler $s^4$ with the rear end of the plate S, Figs. 185, 189, and 190, this plate is also carried forward until its front end bears against the upper portion of the nail-blank, as shown in Fig. 191. The length of the movement of the tumbler is positively determined by means of the position of the stop-block $r^7$ being adjusted to produce this result. By the engagement of the shoulder $s^6$ of the tumbler with the end of the block $s'$ the tumbler $s^4$ and plate S are held against movement, when the cutters by the action of the eccentric portion $b^6$ are caused to return, as shown in Fig. 192. The plate S, the rear end of which is in contact with the arm $s^7$ of the tumbler, is also held against movement, and so, also, is the nail against which the front end of the plate S bears, as shown in Figs. 191 and 192. The nail-blank thus being held, the tendency of the cutters on their return movement to draw the same into the position indicated by the line 1, Fig. 192, is entirely avoided. The tumbler $s^4$, shoulder $s^6$, and arm $s^7$ are integral. The tumbler $s^4$ is held stationary when the shoulder $s^6$ engages with the end of the block $s'$, and the plate S is held up to press upon the nail-blank T', by the arm $s^7$ engaging with the back end of the plate S, (see Figs. 190 and 191,) until the stop-block $r^6$ of the cutter-block, in the movement of the latter, is caused to come into contact with the head of the tumbler and cant the same over sufficiently to lift the shoulder $s^6$ out of contact with the end of the block $s'$ and disengage the same. When the shoulder is disengaged, the tumbler and plate are moved back with the cutter-block to their normal positions, the position of the tumbler being shown by dotted lines in Fig. 188, and the nail-blank is released. This same function of obviating the tendency, hereinbefore described, which the cutters have of drawing over the nail-blank from its upright position (shown in Fig. 192) to the inclined position (shown by the line 1) is obtained by making the independent plate S, instead of having a broad end at the rear, as shown in Fig. 191 and other figures, with a small end, as shown in Figs. 142 and 143 and other figures, and making the plate of such length that it projects, as shown in Figs. 129, 131, and 143, a small amount beyond the cutting edges of the cutters $r'$, and engaging its decreased end with the cushion mechanism X X, hereinbefore described. By this arrangement the front end of the plate S is brought, in the forward stroke of the cutters $r'$, to bear upon the nail-blank before the cutting operation commences, and as the cutters advance to complete their stroke and clip the nail the cushion mechanism X X yields and allows the plate S to remain stationary, whereby the cutters $r'$ pass beyond the front end of the plate S in a similar manner, as described. When the tumbler $s^4$ is used, and when the cutters commence their return-stroke, the elasticity of the cushion mechanism X X keeps the end of the plate S pressed against the nail-blank until the cutters have returned beyond the nail-blank.

We will now describe the mechanism by which the portions cut from the nail-blanks are discharged. In the cutter-block $r$, Figs. 179, 180, 181, 212, and 213, a recess, $y^5$, is formed, adapted to receive a spindle, $y^6$, and spiral spring $y^7$. The recess being smaller at its rear end, forms a guide for the rear end of the spindle and a shoulder for the rear end of the spiral spring to press upon, while the forward portion of the spindle is provided with an enlarged portion, $y^8$, suitable to slide and guide the spindle. Near the forward end of the spindle is formed a collar, $y^4$, and threaded projection, to receive upon it a threaded nut, $y^9$, to secure upon the forward end of the spindle a spring-plate, $y^{10}$, by means of a clamping-washer, $y^{11}$, in the side of the forward portion of the spindle $y^6$ a recess, $y^{12}$, is formed to receive the end of a lock-bolt, $y^{13}$, which lock bolt is of ordinary construction, and is so clearly shown as to require no further description, as many other contrivances of different construction may be employed for this purpose, the essential requisites being such a contrivance as that the spindle $y^6$, with the spring-plate $y^{10}$ secured thereon, may be readily placed and secured in the recess $y^5$, in the position shown, and taken therefrom with ease; also, that the spring $y^7$ shall be compressed a sufficient amount to hold open a space, $y^{14}$, between the collar $y^4$ and the cutter-block $r$. When the cutter-block with the cutters comes forward to clip the nail-blank, in the manner hereinbefore described, the spring-plate $y^{10}$ comes in contact with the portion clipped off, and as the cutters proceed to clip the point of the nail-blank the spring $y^7$ is further depressed by the collar $y^4$ being brought to a bearing upon the cutter-block $r$. Any farther advance of the cutters not compensated for by the closing up of the space $y^{14}$ is compensated for by the yielding of the lower portion of the spring-plate $y^{10}$. The above-described action is illustrated in Fig. 213, where the black stroke 5 represents the clipping. The moment after having been severed it is thrown by the united action of the spring $y^7$ and the spring-plate $y^{10}$ forward to strike the front side of the recess $j^5$—say about the position marked 6—and to prevent its flying up a cover, $y^{15}$, of suitable size to fit over the opening $j^5$ and recess $j^8$, is provided. To insure the downward fall of the clippings after they have struck the point 6, any suitable suction mechanism—such as a pump, fan, &c.—connected by a tube to the lower orifice of the opening $j^5$, and a strong current of air may be drawn in through the recess $j^8$, under the cover $y^{15}$, and down the opening $j^5$. The cutters $r'$, it will be observed in Figs. 183 and 185, are not held on a horizontal line, but with their rear ends elevated a little above the front ends. By means of this arrangement a certain amount of clearance is caused as soon as the act of cutting is completed. The front edges of the cutters $r'$, also, it will be observed, are inclined from a vertical line in such a manner that the lower corners project outward some distance beyond the upper. By means of this arrangement of parts the cutters are caused to begin their cutting action at the lowest point to be cut and then move up to the point of the nail-blank, the material being thus severed by a shearing action instead of a punching one. The cutting-edges of the cutters $r'$, as shown in Figs. 170 and 176, it will be observed, are beveled or rounded slightly at their lower ends. By means of this construction the nail-blanks, if slightly out of position, are accurately centered before the same are cut, the bevels engaging with the blank and adjusting it before the cutting action begins.

The relative positions of the parts of the cutting mechanism in the machine are shown in Figs. 1 and 2.

We will now describe the mechanism for swaging the points of the nails.

The moving portion of the nail-point-swaging mechanism is as follows:

$b^7$, Figs. 1, 2, 106, and 109, represents a cam on the shaft $b^3$, before referred to.

U, Figs. 111 and 202, represents a projection upon the left side of the standard $a^{10}$, at the rear end of the same, which is provided with a bearing-face having a groove, $u$, therein, as shown.

$u'$ represents a bar, the rear end of which is provided with a bearing-face having a rib, $u^2$, as shown, and its front end with an enlargement having a straight side and an inclined side, as shown. The bearing-face at the rear end of the bar $u'$ is adapted to rest on the bearing-face of the projection U, with its rib $u^2$ engaging with the groove $u$ of the projection, as shown. By means of this construction the bar is held against movement in a lateral direction, but is permitted to move freely in a longitudinal one.

$u^3$, Figs. 1, 2, and 202, represents a movable cover-plate, by means of which the rear end of the bar is held against upward movement.

$u^4$, Figs. 1, 2, 197, 199, 203, and 204, represents a base-block rigidly secured, in the proper position shown, to the bed-plate A in any proper manner, which block is provided with a vertical extension, $u^5$, near the center of the same, and with an inclined bar, $u^6$, upon one side, having a projection, $u^7$, with an inclined bearing-face, as shown.

$u^8$ represents a movable side bar, secured to the base-block in any proper manner, which is provided with an inclined bar, $u^9$, having a corresponding projection with the inclined bearing-face, as shown.

The inclined bars $u^6$ $u^9$ form ways, in connection with the upper surface of the base block $u^4$, to guide the movable block held therein in its longitudinal movement.

$u^{10}$, Figs. 197, 198, 199, 205, and 206, represents the movable block, consisting of a base portion having inclined sides adapted to engage with the inclined sides of the base-block in such a manner as to move freely therein, and an upper portion having straight sides, as shown.

$u^{11}$, Figs. 199 and 206, represents a longitudinal recess in the base portion of the block $u^{10}$, into which extends, when the parts are in place, the vertical extension $u^5$ of the base-block $u^4$.

$u^{12}$ represents a spring located in the recess $u^{11}$, and $u^{13}$ a cover-plate secured by a bolt, as shown, which plate furnishes a bearing for one end of the spring, as shown.

$u^{14}$, Figs. 197 and 199, represents an opening in the upper portion of the movable block provided with an inclined side, $u^{15}$, against which bears the inclined side of the front of the wedge-bar $u'$, as shown.

$u^{16}$, Figs. 197, 198, and 207, represents an auxiliary block located at one end of the upper portion of the movable block, which, by means of proper ways, is adapted to move in a longitudinal direction, as shown.

$u^{17}$, Figs. 197 and 198, represents a bolt extending through a vertical slot in the auxiliary block $u^{16}$ into the movable block $u^{10}$ below, by means of which the auxiliary block is rigidly secured in any position in which it may be adjusted.

$u^{18}$, Figs. 197 and 199, represents an adjusting-screw held in a threaded recess in the upper portion of the movable block $u^{10}$, and $u^{19}$ a stud of less diameter lying in an extension of the recess, the outer end of which is adapted to bear against the adjacent face of the auxiliary block $u^{16}$, as shown.

$u^{20}$, Figs. 197 and 207, represents a rectangular block of any proper thickness, which is adapted to rest in the recess portion of the auxiliary block $u^{16}$, as shown.

$u^{21}$ represents a clamping-plate held by the bolt $u^{17}$, before referred to, and $u^{22}$, Figs. 1, 2, and 207, a long swage-bar of steel having a beveled edge, which bar is secured in place by means of the clamping-plate and bolt, as shown.

By means of the adjusting-screw the adjustment of the auxiliary block $u^{16}$ is obtained to the required longitudinal position.

$u^{23}$ represents an opening through the base-block, by means of which space is provided for the pawl-bar $o^3$, as shown in Figs. 1 and 2.

The fixed portion of the nail-point-swaging mechanism will now be described.

$j^9$, Fig. 58, represents a curved recess, hereinbefore described, in the block $j^4$ of the circular base-plate J of the forwarding mechanism.

V, Figs. 93, 99, and 207, represents a curved block of any proper thickness, which is adapted to fill a portion of the recess $j^9$, as shown.

$v$ represents a clamping-plate, and $v'$ a bolt, by means of which a curved bar of steel, $v^2$, is secured in place, which bar forms the anvil of the nail-point-swaging mechanism.

The operation of the above-described nail-point-swaging mechanism is substantially as follows: The rear end of the wedge-bar $u'$ is held continuously in contact with the cam $b^7$ on the cam-shaft $b^3$ by the action of the spring $u^{12}$, and consequently at the proper time in the operation of the machine the wedge-bar is given a forward movement. The front end of the wedge-bar lies in the opening $u^{14}$ of the movable block $u^{10}$, Figs. 197 and 199, with its inclined side bearing against the inclined side $u^{15}$. (See also Figs. 1 and 2.) By means of the forward movement of the wedge-bar and its inclined side the movable block $u^{10}$ is caused to move upon the base-block $u^4$ against the resistance of the spring $u^{12}$. By the movement of the movable block $u^{10}$ the auxiliary block $u^{16}$, resting thereon, which supports the block $u^{20}$ and swage-bar $u^{22}$, is caused to advance close to the anvil-block and swage the point of the nail which is held between them. When the wedge-bar is released by the continued movement of the cam, the movable block $u^{10}$ and its attachments are returned to their normal positions by the reaction of the spring $u^{12}$. The head of the nail when the point is swaged rests upon the farther one of the studs $k^{12}$, Figs. 59 and 75, before referred to, so that the proper provision is made for the elongation of the nail. By means of the adjusting-screw $u^{18}$ the amount of swaging action performed by the swage-bar $u^{22}$ may be adjusted at will. By means of the blocks $u^{20}$ and V, of different thicknesses, nails of different lengths may be acted upon. The nails are presented to the nail-point-swaging mechanism in the same manner that they were presented to the cutters $r'$ by the forwarding mechanism. This special mechanism for swaging the point of the nail is employed, because the cutters have a tendency to make one side of the nail slightly rounding, as shown in Fig. 210, and also to reduce the bevel at the point, as indicated by Fig. 208. By the action of the swages the shape of the nail is changed in cross-section from that shown in Fig. 210 to that shown in Fig. 211, and the bevel is increased from the size shown in Fig. 208 to that shown in Fig. 209. The blow or hammering given by the swage-bar $u^{22}$ to the material forming the extreme point of the nail solidifies or renders it more dense, producing a similar effect as in the nails pointed by hand.

We will now describe the discharging mechanism.

$m^3$, Figs. 85, 90, 91, 92, 93, 97, 99, 167, and 168, represents the finger before referred to and described. In addition, however, to the description already given, we would remark that it may either have the turned-down outer end shown in Figs. 85, 90, and 91, or it may have the straight outward configuration shown in Figs. 97, 99, 167, and 168. Both of these configurations are suitable for the purpose of discharging the nails from the forwarding mechanism, and may be employed in combination with the parts about to be described.

W, Figs. 167 and 168, represents a spring-plate raised from the bed-plate A, which is provided at its upper end with a horizontal portion, $w$, having an inclined bearing-edge, as shown. The bearing-edge of the finger $m^3$ and the bearing-edge of the horizontal portion $w$ are located in such relation to each other as to form between them, from above, as shown in plan in Fig. 167, a wedge-shaped space. The bearing-edge of the portion $w$ is located in a higher plane than that of the finger $m^3$.

$w'$ represents an opening in the bed-plate, situated at the foot of the spring-plate W in the proper position to permit the discharge of the finished nail through the bed-plate into any suitable receptacle below.

The operation of the discharging mechanism is substantially as follows: The nail having been completed by the nail-point-swaging mechanism, before described, is carried by the continued movement of the forwarding mechanism to come in contact with the bearing-surface of the finger $m^3$, and is caused to slide along a portion of this surface, which causes it to incline over to the position shown by the line 2, Fig. 168, until it rests against the bearing-edge of the horizontal portion $w$, which edge prevents the inclination of the nail any farther than the line 2; but as the nail is moved farther around in the circle described by the forwarding mechanism, the farther-out-extending portion of the finger $m^3$ compels the head of the nail to draw outward from the forwarding mechanism and come to the position of the line 3; and thus being released from all support it falls by gravity through the opening $w'$.

We will now describe a certain mechanism for coating the upper ends of the nail-blanks with a film of oil while they are being conveyed by the hereinbefore-described forwarding mechanism to the mechanisms for beveling, clipping, and bevel-finishing. This mechanism is situated, as shown generally in Figs. 1 and 3, and more particularly by Figs. 230 to 233, inclusively. On the top surface of the cover-plate M, and at or about the position shown, a level seat is formed.

$z$ represents a circular or other desired shaped bath, situated on the level seat formed on the cover-plate M, just above mentioned, attached in any desired and suitable manner upon the said seat, and situated in close proximity to the flange $m^2$ of the said plate.

$z'$ represents a vertical axis projecting upward, and about centrally situated in the said bath. This axis may either pass down through the bottom of the bath and be screwed into the plate below and rendered water-tight by means of a collar integrally formed with the axis, the point of the collar being made a water-tight fit, or the axis may be integrally formed with the bottom of the bath.

$z^2$ represents a roller placed loosely on the axis $z'$. This roller will preferably consist of two parts, a center rigid part to form a suitable bearing on the axis, and an outer elastic cellular part suitable for becoming charged by capillary attraction with oil from its lower end, which will be immersed in the oil in the bath $z$.

$z^3$ represents an arm adjustably secured on the axis $z'$ by jam-nuts $z^4$. This arm is provided with a slot-opening, $z^5$.

$z^6$ represents two sub-axes adjustably secured in the slot $z^5$ by jam-nuts $z^7$.

$z^8$ represents two sub-rollers placed upon the axes $z^6$, and constructed in two parts, as above described for the roller $z^2$—that is to say, having outer elastic cellular surfaces. They are also arranged in relation to each other and to themselves, as shown in Fig. 231—that is to say, of equal height on the top and having such a touching contact that by power applied to revolve one of the rollers the frictional contact will cause the others to revolve with it. The point of contact between the two rollers $z^8$ is placed half the thickness of the upper end of a nail-blank outside of the peripheral surface of the flange $m^2$.

The operation of this portion of the mechanism is as follows: The bath $z$ being filled with oil or other fluid lubricating material, the said lubricant spreads through the surface of the roller $z^2$ and charges the surfaces of the rollers $z^8$.

It has been described in the description of the forwarding mechanism that the nail-blanks held in a vertical position, point upward, are carried around the periphery of the flange $m^2$ by the forwarding mechanism. One of such blanks so carried is delineated in section at T' in Figs. 232 and 233, and by its travel around the periphery of the flange $m^2$, in the direction of the arrow, Fig. 232, it is compelled to pass, as shown, between the two rollers $z^8$, the elastic surfaces of which readily yield for that purpose and impart to the surfaces of the nail-blanks a proper amount of the lubricating material. This passage of the nail-blank between the rollers $z^8$ causes a slight rotation of the rollers, and also that of the roller $z^2$, whereby a fresh surface charged with lubricating material is presented for the next nail-blank which the forwarding mechanism brings to it to pass between the rollers $z^8$.

The rollers $z^8$, in addition to performing the function of lubricating the upper ends of the nail-blanks, will, if properly adjusted, also adjust the nail-blanks, if not perfectly vertical, to a perfectly upright position. The advantages, therefore, of this lubricating mechanism are great economy in the use of lubricating material and an adjusting mechanism to a vertical position of the nail-blanks.

We will now give a summary general description of the operation of the machine as a whole, which is as follows: The power to drive the machine is communicated from any suitable motor to the main shaft B, and from it, through the gearing described, to the roll-shafts $b\ b'$, and also through the clutch mechanism $c^5\ c^6$ to cam-shaft $b^3$. Movement having been communicated to the roll-shafts and rolls, the nail-blanks, Figs. 26 and 27, are fed in through the conductor $e$ to the rolls F and G, as shown in Fig. 39, the delivery of the blanks being controlled by the finger $e^7$, as shown in Figs. 4, 7, and 8. By the passage of the blanks through the rolls they are reduced in thickness and extended in width and length. The action of the rolls gives to the blank its final dimensions in the matter of thickness and width, and an excess of length over that required for the finished nail. The head of the blank as it leaves the rolls is first disengaged from the recess of the small roll by proper disengaging mechanism shown in Fig. 46, and then afterward from a recess of the large roll by mechanism shown in Figs. 30 and 47. By the joint action of the rolls and the disengaging mechanism, and the walls of the conductor leading from the rolls, the nail-blank bent by the action of the rolls is partly, if not entirely, straightened. The nail-blank when disengaged from the rolls falls through a proper conductor into a receiving-recess. Figs. 39 and 48, which is formed in part by a fixed bearing-surface, $k^2$, upon which rests the head of the nail blank, a fixed wall, $m^2$, supporting one side of the nail-blank, and two plates, $l^6\ l^{11}$, of the revolving forwarding-ring L, having an intermittent movement. By the contact of the plate $l^6$ or the plates $l^6\ l^{11}$ of the forwarding-ring with the edges of each nail-blank they are moved upon the fixed bearing-surface $k^2$ step by step, first to a lubricating and vertically-adjusting mechanism, then to certain swaging mechanism, by means of which the blank is given the proper bend or curvature, and is first partially beveled at the place where the point is to be formed, then to certain cutting mechanism, by means of which the surplus metal at the point is removed from the nail, and then to certain swaging mechanism, by means of which the point of the nail is finally shaped and its bevel perfected to finish the nail. This operation having been performed, the finished nail is discharged from the machine by a mechanism shown in Fig. 168. The forwarding-ring L is given an intermittent movement principally by means of the cam $b^8$ and pawl $o^3$, as shown in Figs. 1 and 2. The moving portion of the swaging mechanism, Fig. 113, is actuated by the eccentric portion $b^5$ of the cam-shaft $b^3$, Figs. 106 and 107. The moving portion of the cutting mechanism is actuated by the eccentric portion $b^6$ of the cam-shaft $b^3$, Figs. 106 and 108. The moving portion of the nail-point-swaging mechanism is actuated principally by the cam $b^7$ of the cam shaft $b^3$ and wedge-bar $u'$ and movable block $u^{10}$ upon the base-block $u^4$. When the machine is in full operation, a nail-blank is delivered during each pause in the intermittent movement of the forwarding mechanism. At this time also another nail-blank is being acted upon by the swaging mechanism, still another by the cutting mechanism, and a nearly-finished nail is being fully finished by the nail-point-swaging mechanism; all these actions occurring during the rest-interval of the forwarding mechanism, but not precisely at the same instant of time.

We will now describe certain modifications of the cutters $r'$ and independent plate S. The distinguishing characteristic of these cutters is that while the front ends are placed together, as shown in Figs. 170 and 171, their rear ends are separated any proper distance, as shown in Fig. 171, by means of a bearing-block, $x$, Fig. 175. By means of this special arrangement of parts the cutters are adapted to clear themselves from the nail as soon as the cutting action is effected. The independent plate S, for holding the nail when the cutters are withdrawn, is provided with a projection, $x'$, Figs. 169 and 172, adapted to extend through the opening $x^2$, Fig. 173, in the block $x$, into proper position to be acted upon by the arm $s^7$ of the tumbler $s^4$ in the manner before described. Whenever it is necessary to sharpen these cutters the portion removed can be compensated for by placing a supplementary piece at the back of the block $x$. It will be understood that the recess in the cutter-block that contains the cutters must conform to the special angle formed by the cutters in their relative positions to each other, or that any suitable means of supporting them at the angle they assume—such as a side supplementary wedge piece—will be provided to give the side of the recess the required angle. The above first modification is specially arranged for use in combination with the tumbler $s^4$.

The second modification of the cutters $r'$ is as follows: The distinguishing characteristic of these cutters is that they are made with parallel sides and both ends alike, so that they may be turned end for end, when desired. To compensate for the inclined ends of the cutters, a special bearing-block, $y$, Figs. 172, 173, 174, and 178, is provided, which has a rectangular side and an inclined side, as shown. The independent plate S, Fig. 173, is modified in construction to extend through the space between the bridge-pieces $y'$ $y'$, which serve to properly separate the parts of the cutters, as shown. This modification is also arranged to be used in combination with the tumbler $s^4$.

The third modification of the cutters $r'$ is as follows: In this modification the cutters $r'$ are provided with equally-inclined ends, as in the second modification, and also with parallel sides. They are, furthermore, provided with the block $y$, but with projections $y^2$ at their bottom corners, which projections have upon them the rounded or beveled corners for adjusting the nail-blank to a central position, before described, before the clipping of the point of the nail-blank commences. The plate S, as shown, used with this modification, is provided with a decreased end projecting through the plate $y$ a sufficient distance to engage with the cushion mechanism X X and be operated by it. In this modification the plate S has side springs, $y^3$, attached upon it, which by their friction upon the inner surfaces of the cutters prevent the plate from displacement by undue movement on account of the freeness of its fit to the space within the pair of cutters. The clearance of these cutters is obtained by so forming them that the space between them increases from the ends toward the center, and the clearance so formed is augmented by setting the cutters at an incline to the line of their motion, as hereinbefore mentioned. Therefore, when these cutters require to be sharpened, by removing a portion of the material from their ends, to prevent the positions of the cutting-edges from being changed, a small portion is removed from the inner surfaces of the cutters which bear the one upon the other, whereby the cutters are slightly decreased in thickness, bringing the cutting-edges to the same relative positions they before had. This decrease in the thickness will be compensated for by a parallel supplementary piece placed in the recess in which they are situated in the cutter-block $r$.

The fourth modification of the cutters $r'$ is as follows: Each cutter is provided with a rectangular end and a beveled or inclined end. Upon the latter is formed the projection $y^2$. The outer surfaces of these cutters, when they are placed together, are parallel, while the inner surfaces are tapered, as shown in Figs. 156 and 157. The plate S in this case is of the wedge form shown in Figs. 158 and 159, and is provided with the side springs, $Y^3$. It is further provided with a small end to engage with the cushion mechanism X X in the same manner shown in Fig. 143. When these cutters require to be sharpened, and and a portion is removed from their cutting ends, such would cause the renewed cutting-edges to be at a greater distance apart, and therefore would change the shape of the point of the nail. This is compensated for by drawing backward the wedge $y^0$. As such drawing backward of the wedge $y^0$ would cause it to protrude at the rear end of the cutters such portion as will protrude by reason of the new position of the wedge $y^0$ will be removed. It will be observed that, as illustrated, dowel-pins are provided, and as these dowel-pins pass through the wedge $y^0$, to enable the wedge to be moved, the openings through which the dowel-pins pass are elongated. The above-described adjustment of the wedge reduces the thickness of the cutters, to compensate for which a suitable side supplementary piece or pieces will be provided.

Some of the advantages derived from the described construction are as follows:

By the employment of a special mechanism for controlling the delivery of the nail-blanks to the elongating-rolls all danger of more than one nail-blank passing to the rolls at one time is obviated.

By constructing the large roll F in separate pieces the parts subject to wear may be readily taken out and their positions changed, or they may be repaired.

By providing the die-blocks with two recesses arranged in reversed order the life of the die is greatly prolonged without any material increase in the expense of construction, the tempering process being the same as that employed when a single die is made.

An advantage also results from the employment of a thicker and stronger body of steel, it being much less liable to distortion in the process of tempering and better able to stand the strain to which it is subjected in the operation of shaping the nail-blanks.

By the employment of a large and small roll, in connection with each other, the operation of rolling is more perfectly performed than when rolls of equal size are employed.

By a special construction of the point end of the recess of the large roll F the surplus metal in the blanks will pass through the rolls without being subjected to excessive pressure, and hence the same will not be rendered unfit for further use. Less power is also required to actuate the rolls, and they are subjected to less strain.

By making the face-plate $i^9$ removable the bar $i^{11}$ may be taken out when desired.

By means of the set-screw $i^{15}$ the bar $i^{11}$ may be adjusted readily in its proper vertical position.

By means of the fixed block H, loose block $h^6$, and spring $h^{10}$, the blade $h^{14}$ is provided with an elastic support which readily yields to permit the finger of the blade to follow the varying lines of the bottom of the recess upon which it rests.

By the employment of a revolving forwarding-ring a continuous movement is obtained for conveying the blanks from the rolls, successively, to the various mechanisms, for further acting upon them.

By means of the special construction employed the nails are properly conveyed to the desired points.

By means of a proper lubricating mechanism such portion of the nail as requires it is coated with lubricating material.

By means of the spring-studs $k^{12}$ proper provision is made for the elongation of the metal under the swaging action.

By means of the pivoted bar $o$ the length of the movement of the pawl-bar $o^3$ may be determined.

By the employment of the open-ended slots $p^{10}$ upon the plate $p^6$ a very simple and effective means is obtained for permitting the removal or adjustment of the swages or cutters, as the case may be.

By the employment of the arched spring $p^{19}$ great power of resistance is obtained with great durability. This spring is also exceedingly compact in form, so that little space is required by its use.

By means of the adjusting mechanism $p^{20}$, $p^{21}, p^{22}, p^{23}, p^{24}$, and $p^{25}$ provision is made for adjusting the length of the connecting-frame to cause the swages to exert the proper pressure.

By means of the journal-studs $r^{12}$, of the connecting-frame $r^8$ of the cutter-block and the blocks $r^{18}$ the angular position of the latter is compensated for.

By means of the ball-and-socket-joint $r^{10}$ $r^{15} r^{16}$ the slight amount of lateral movement is provided for.

By means of the independent plate S the cut nail is properly held against movement as the cutters are withdrawn.

By means of the adjusting-screw $u^{18}$ the amount of pressure exerted by the moving part of the nail-point-swaging mechanism may be adjusted.

By means of the special construction of the cutters shown and described in a part of the modifications the cutters may be turned end for end, and so extend the life of the cutters without materially increasing their cost.

We now beg to state that we do not limit ourselves to the precise construction shown nor to the precise elements used in the combinations.

If desired, the mechanism for controlling the delivery of the nail-blanks to the rolls may be employed with rolls of a different construction. The controlling mechanism also, and the rolls, may be employed in connection with a different forwarding mechanism. The forwarding mechanism may also be employed with different rolling mechanism and with different mechanisms for further acting on the nail. The swaging and cutting mechanisms also may be employed independently, if desired.

The special form of the recess in the rolls for the head of the blank may be varied, and also the recess of either roll be adapted to take the larger portion of the head of the nail-blank.

Having thus fully described our invention, what we claim as new, and desire to secure by Letters Patent, is as follows:

1. In combination with the cam $d'$ and the rod $e^2$, having the arm $e^3$, provided with stud $e^4$ and extension $e^5$, the shaft $b$, as described, the construction being such that the rod $e^2$ is held against revolution without interference with its freedom to move in a longitudinal direction.

2. In combination with the conductor $e$ and the rod $e^2$, having the finger $e^7$ and arm $e^3$, the spring $e^8$ and the cam $d'$, as described.

3. The conductor $e$, having the groove for the passage of the nail-blank, and the narrow slit $e'$, for the insertion of an implement, as and for the purpose described.

4. The large roll F, having a series of recesses, in combination with the small roll G, having a single recess, as described.

5. The roll F, consisting of the body portion $f$, round plate $f^2$, die-blocks $f^4 f^4$, and cover-plate $f^7$, as and for the purpose described.

6. In combination with the shaft $b$, having a bearing-shoulder, threaded portion, and nut, the roll F, consisting of the body portion $f$, cover-plates $f^2 f^7$, and die-blocks $f^4 f^4$, the width of the die-block exceeding the width of the body-block, as and for the purpose set forth.

7. The die-block $f^4$, having the two recesses $f^5 f^5$, arranged in opposite positions, as and for the purpose set forth.

8. In combination with the die-blocks $f^4$, having the recesses $f^5 f^5$, the body-block $f$, having the recesses $f' f'$, the recesses $f' f^5$ coinciding to form a continuous channel about the roll, as described.

9. In combination with the bar $i^{11}$, the block $i^8$ and the removable face-plate $i^9$, as described.

10. In combination with the supporting-block I, having the stud $i^{14}$, the bar $i^{11}$, having the finger $i^{12}$ at one end and the fork at the other, as and for the purpose described.

11. In combination with the roll G, having the recess $g$, the pivoted bar $i^{11}$, with finger $i^{12}$ and spring $i^{16}$, the spring being adjusted to cause the finger to bear upon the surface of the roll, as and for the purpose described.

12. In combination with the forked bar $i^{11}$, the set-screw $i^{15}$, for adjusting the same, as described.

13. In combination with the block $h'$, the serrated blade $h^{14}$, the block $h^6$, and the spring $h^{10}$, as described.

14. In combination with the block $h$, having the set-bolt $h^4$, the block $h^{12}$, the rear wall of which forms the front wall of the conductor, as described.

15. The combination of the die-block $f^4$, having a recess, $f^6$, with the finger $h^{15}$, and mechanism for causing the finger to enter the recess and disengage the head of the nail-blank, substantially as described.

16. The combination of the rolls F and G, bars $i^{11} h^{12}$, and plates $l^6$ and $l^{11}$ of a forwarding mechanism, the whole constructed and arranged substantially as described.

17. In combination with the bars $i^{11} h^{12}$, the flange $m^2$ and the plates $l^6 l^{11}$ of the forwarding-ring.

18. In combination with the bar $i^{11}$, the plates $l^6 l^{11}$ and the guide-plate N.

19. The combination of the rolls F and G and the disengaging mechanism, as described, base-ring K, having bearing-faces $k'$ and $k^2$, intermittently-moving forwarding-ring L, having plates $l^6$, and independent blocks $l^9$, having plates $l^{11}$, and springs $l^{14}$, the whole substantially as described.

20. The forwarding-ring L, having the plates $l^6$, with the independent blocks $l^9$, having plates $l^{11}$, and the springs $l^{14}$, the whole combined substantially as and for the purpose described.

21. In combination with the forwarding-ring L, having the plates $l^6$, independent blocks $l^9$, having plates $l^{11}$, and springs $l^{14}$, with a frictional surface arranged to operate the plates $l^{11}$, the whole substantially as described.

22. In combination with the lever O, the pawl-bar $o^3$, with ball-and-socket joint, and spring $o^4$.

23. In combination with the pawl-bar $o^3$, the lever O, and the cam $b^8$, the spring $o^5$, as described.

24. In combination with the projection $k^4$, the pivoted bar $k^5$ and the series of presser-bars $k^7$, as described.

25. The combination of the presser-bar $k^7$, having bearing-face $k^{10}$, spring $k^{11}$, bar $k^5$, plates $l^6$, independent blocks $l^9$, having plates $l^{11}$, and springs $l^{14}$, the whole substantially as described.

26. In combination with the presser-bar $k^7$, having a beveled edge, the plate $l^{11}$, having a beveled edge plate, $l^6$, as described.

27. In combination with the swage-block $p^4$, the plate $p^8$, with open slots, the set-screws $p^{11}$, block $p^9$, and the swages $p^5 p^6$, as described.

28. In combination with the swage-block $p^4$, the adjusting mechanism $p^{20}, p^{21}, p^{22}, p^{23}, p^{24}$, and $p^{25}$, as described.

29. In combination with the swage-block having the part $p'$, the arched spring $p^{19}$, as described.

30. In combination with the swaging mechanism, the spring-studs $k^{12}$, as and for the purpose described.

31. The spring-stud $k^{12}$, having the shank $k^{13}$, collar $k^{14}$, and spring $k^{17}$, supported by a plug, $k^{16}$, held in a recess, $k^{15}$, as described.

32. The cutters $r' r'$, held at an angle from the horizontal line and having inclined ends, as and for the purpose set forth.

33. In combination with the cutter-block, the connecting-frame having the ball-and-socket joint, as described.

34. In combination with the cutter-block, the connecting-frame having journal-studs $r^{12} r^{12}$ and the bearing-blocks $r^{18} r^{18}$, as described.

35. In combination with cutters $r' r'$, for reducing the point of the nail-blank to shape, an independent plate, S, for holding the nail as the cutters are withdrawn, and mechanism, substantially as described, for actuating the plate.

36. In combination with the cutters, the independent plate S and thetumbler $s^4$ for actuating the plate.

37. The tumbler $s^4$, having the shoulder $s^6$, in combination with the base-block $s'$, and cutter-block having the stop-block $r^7$, as described.

38. In combination with the tumbler $s^4$, having the shoulder $s^6$, the base-block $s'$, and the cutter-block having the stop-block $r^6$, as described.

39. The combination of the fixed cutter T with the auxiliary plate $t^2$, as described.

40. The combination, with the fixed cutter T and auxiliary plate $t^2$, of the clamping-plates and cotter-pins, as described.

41. The combination of the following elements: mechanism, substantially as described, for clamping the nail-blank during the action of cutting; mechanism, substantially as described, for cutting the blank, and mechanism, substantially as described, for holding the nail when the cutters are withdrawn.

42. The combination, with the cam $b^7$, of the wedge-bar $u'$, and the movable block $u^{10}$, held upon the base-block $u^4$, as described.

43. In combination with the auxiliary block $u^{16}$, carrying the swage-bar, the adjusting-screw $u^{18}$, as described.

44. In combination with the supporting-block $u^{20}$, the bolt $u^{17}$, and the clamping-plate $u^{21}$, as described.

45. In combination with the long anvil-bar $v^2$, of curved form, the long swage-bar $u^{22}$, as described.

46. In combination with the finger $m^3$, the spring-plate W, having the horizontal portion, as described.

47. The combination of the bearing-face $k^2$, spring-stud $k^{12}$, and conductor $e$, for conveying the nail-blanks from the rolls to the bearing-face $k^2$, substantially as described.

48. The combination of the plates $l^6\ l^{11}$ of the hereinbefore-described mechanism, with a lubricating mechanism consisting of a bath, $z$, and rollers $z^2\ z^3$, constructed and arranged substantially as and for the purpose set forth.

49. The combination of the block $j^4$, constructed and arranged as described, fixed cutter T, projection $T^6$, plates $l^6\ l^{11}$ of the forwarding mechanism described, and the cutters $r'$, the whole substantially as and for the purposes set forth.

50. The combination of the cutters $r'$, fixed cutter T, with the clip-discharging mechanism, consisting, principally, of a spindle, $y^6$, spring $y^7$, and spring-plate $y^{10}$, substantially as and for the purpose set forth.

51. The combination of the plates $l^6\ l^{11}$, spring $l^{14}$ of the forwarding mechanism, with the plate $i^{17}$, having projections $i^{19}$, and pivoted lever $i^{21}$, said lever having bearing-face $i^{22}$, and actuated by a spring, $i^{23}$, the whole constructed and arranged substantially as described, for the purpose set forth.

52. In a machine of substantially the described construction, the combination of the following elements: mechanism, substantially as described, for controlling the delivery of the nail-blanks to the rolls; mechanism, substantially as described, for rolling the same; mechanism, substantially as described, for forwarding the same; mechanism, substantially as described, for lubricating the same; mechanism, substantially as described, for swaging the blanks; mechanism, substantially as described, for cutting the blanks; mechanism, substantially as described, for discharging the clippings; mechanism, substantially as described, for swaging the points of the nails, and mechanism, substantially as described, for discharging the finished nail from the machine.

W. M. MOONEY.
HERBERT ESTES.

Witnesses:
  EDWARD HAIG,
  CHARLES G. L. SIMPSON.